(12) United States Patent
Wu et al.

(10) Patent No.: US 11,637,442 B2
(45) Date of Patent: Apr. 25, 2023

(54) WIRELESSLY CHARGED ELECTRONIC DEVICE, WIRELESS CHARGING METHOD, AND WIRELESS CHARGING SYSTEM

(71) Applicant: Huawei Digital Power Technologies Co., Ltd., Shenzhen (CN)

(72) Inventors: Baoshan Wu, Shenzhen (CN); Yunpeng Yang, Dongguan (CN); Chengliang Zhang, Dongguan (CN); Bing Cai, Dongguan (CN); Donghao Wu, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/535,356

(22) Filed: Nov. 24, 2021

(65) Prior Publication Data

US 2022/0085642 A1 Mar. 17, 2022

Related U.S. Application Data

(63) Continuation of application No. PCT/CN2020/090400, filed on May 15, 2020.

(30) Foreign Application Priority Data

Sep. 18, 2019 (CN) .......................... 201910882683.0

(51) Int. Cl.
*H02J 7/00* (2006.01)
*H02J 7/04* (2006.01)
*H02J 50/12* (2016.01)

(52) U.S. Cl.
CPC ............ *H02J 7/04* (2013.01); *H02J 7/00032* (2020.01); *H02J 7/00714* (2020.01);
(Continued)

(58) Field of Classification Search
CPC ......................................................... H02J 7/04
(Continued)

(56) References Cited

U.S. PATENT DOCUMENTS 9,608,472 B2 * 3/2017 Moshfeghi .............. H02J 50/20
2015/0311955 A1 * 10/2015 Lu ..................... H04W 52/0296
455/419

(Continued)

FOREIGN PATENT DOCUMENTS

CN 101965676 A 2/2011
CN 107231013 A 10/2017
(Continued)

*Primary Examiner* — Yalkew Fantu
(74) *Attorney, Agent, or Firm* — Leydig, Voit & Mayer, Ltd.

(57) ABSTRACT

A wirelessly charged electronic device, a wireless charging method, and a wireless charging system are disclosed. A charger of a receive end of the system includes an open-loop DC-DC (direct current-to-direct current) converter. When power of a transmit end is greater than a first preset threshold of the transmit end and required charging power is greater than a first preset threshold of a receive end, the open-loop DC-DC converter is controlled to work in a fast charging phase, specifically including: controlling the open-loop DC-DC converter to work in a constant current step-down phase to charge a battery at a constant current, or controlling the open-loop DC-DC converter to work in a constant voltage step-down phase to charge the battery at a constant voltage.

19 Claims, 30 Drawing Sheets

(52) U.S. Cl.
CPC ........ *H02J 7/007182* (2020.01); *H02J 50/12* (2016.02); *H02J 2207/20* (2020.01)

(58) Field of Classification Search
USPC ........................................................ 320/108
See application file for complete search history.

(56) References Cited

U.S. PATENT DOCUMENTS

| | | | |
|---|---|---|---|
| 2017/0229877 A1* | 8/2017 | Zhang | H02M 7/06 |
| 2018/0069409 A1* | 3/2018 | Tian | H02M 3/335 |
| 2019/0089190 A1 | 3/2019 | Yang et al. | |

FOREIGN PATENT DOCUMENTS

| | | | |
|---|---|---|---|
| CN | 108233453 | A | 6/2018 |
| CN | 207518335 | U | 6/2018 |
| CN | 109148990 | A | 1/2019 |
| CN | 110168855 | A | 8/2019 |
| CN | 110635546 | A | 12/2019 |
| EP | 3846275 | A1 | 7/2021 |
| WO | 2020042643 | A1 | 3/2020 |
| WO | 2020042644 | A1 | 3/2020 |

\* cited by examiner

WIRELESSLY CHARGED ELECTRONIC DEVICE, WIRELESS CHARGING METHOD, AND WIRELESS CHARGING SYSTEM

CROSS-REFERENCE TO RELATED APPLICATIONS

This application is a continuation of International Application No. PCT/CN2020/090400, filed on May 15, 2020, which claims priority to Chinese Patent Application No. 201910882683.0, filed on Sep. 18, 2019. The disclosures of the aforementioned applications are hereby incorporated by reference in their entireties.

TECHNICAL FIELD

This application relates to the field of terminal device technologies, and in particular, to a wirelessly charged electronic device, a wireless charging method, and a wireless charging system.

BACKGROUND

A portable electronic device has been widely used in recent years. In a conventional manner of charging an electronic device, a power cable needs to be frequently plugged and unplugged. However, a component is prone to wear due to plugging and unplugging in a charging process, causing poor safety, and also affecting aesthetic appearance of the electronic device.

Wireless charging is a new energy transmission manner. Compared with the conventional charging manner, the wireless charging can well resolve the foregoing problem. Nowadays, many electronic devices such as a mobile phone, a smartwatch, a Bluetooth headset, and an electric toothbrush can support the wireless charging. However, charging efficiency is low in a wireless charging system. How to improve wireless charging efficiency, especially internal efficiency of a terminal device, has become a current research hot topic.

SUMMARY

To resolve the foregoing technical problem in the conventional technology, this application provides a wirelessly charged electronic device, a wireless charging method, and a wireless charging system. In a wireless charging process, a wireless fast charging path is used, and working of a charger is fully controlled based on power of a transmit end and required charging power of a receive end in a wireless charging system, to improve wireless charging efficiency, improve working efficiency of the transmit end, and fully utilize a power capability of the transmit end.

A first aspect of this application provides a wirelessly charged electronic device, including a receive coil, a wireless electric energy receiver, a charger, a controller, and a battery.

The receive coil is configured to: receive an alternating magnetic field transmitted by a transmit coil, and convert the alternating magnetic field into an alternating current.

The wireless electric energy receiver is configured to convert the alternating current sent by the receive coil into a direct current.

An input end of the charger is connected to an output end of the wireless electric energy receiver, and an output end of the charger is connected to the battery and is configured to charge the battery after converting the direct current sent by the wireless electric energy receiver.

The charger includes at least an open-loop DC-DC (direct current-to-direct current) converter and a closed-loop DC-DC converter, and the open-loop DC-DC converter is connected to the closed-loop DC-DC converter in series or in parallel.

The controller is configured to: when power of a transmit end is greater than a first preset threshold of the transmit end and required charging power is greater than a first preset threshold of a receive end, control the open-loop DC-DC converter to work in a fast charging phase, including: controlling the open-loop DC-DC converter to work in a constant current step-down phase to charge the battery at a constant current, or controlling the open-loop DC-DC converter to work in a constant voltage step-down phase to charge the battery at a constant voltage.

When controlling the open-loop DC-DC converter to work in the fast charging phase, the controller controls the closed-loop DC-DC converter to work in a shoot through state or an open state. The open state means that the closed-loop DC-DC converter is prohibited from working.

In the technical solution provided in the first aspect of this application, for the constant current step-down phase, the controller can control, based on a control parameter at a power that can be provided by the transmit end, the open-loop DC-DC converter to perform constant current step-down to charge the battery of the receive end; and for the constant voltage step-down phase, the controller can control, based on a control parameter at a power that can be provided by the transmit end, the open-loop DC-DC converter to perform constant voltage step-down to charge the battery of the receive end. A wireless fast charging path of the device is used (that is, wireless charging rectifier output is used to directly charge the battery by using the open-loop DC-DC converter), so that a power capability of an adapter and a power capability of the transmit end can be identified and matched, and a proper charging curve can be selected, to improve a degree of cooperation between the receive end and the transmit end, improve wireless charging efficiency of the receive end, and improve working efficiency of the transmit end and fully utilize the power capability of the transmit end. In addition, in a system architecture, the wireless fast charging path is reliably and stably controlled by using the controller, so that wireless charging experience of a user can be improved.

Optionally, the open-loop DC-DC converter is connected to the closed-loop DC-DC converter in series, and the controller is configured to control the closed-loop DC-DC converter to work in the shoot through state.

Optionally, the charger includes one open-loop DC-DC converter and two closed-loop DC-DC converters, the closed-loop DC-DC converters are buck chargers, and the open-loop DC-DC converter is a switched capacitor charger, a load switch charger, or a flash charger.

The open-loop DC-DC converter is connected to the two closed-loop DC-DC converters in series.

Optionally, the open-loop DC-DC converter is connected to the closed-loop DC-DC converter in parallel, the controller is configured to prohibit the closed-loop DC-DC converter from working, the closed-loop DC-DC converter is a buck charger, and the open-loop DC-DC converter is a switched capacitor charger, a load switch charger, or a flash charger.

Optionally, in an implementation of the first aspect, the controller is specifically configured to: compare a charging parameter of the open-loop DC-DC converter with a target parameter to obtain a control parameter, and control, based on the control parameter, the open-loop DC-DC converter to work in the fast charging phase.

With reference to the first aspect, in a first possible implementation, when the open-loop DC-DC converter works in the constant current step-down phase, the charging parameter is a charging current, and the target parameter is a target current.

The controller is configured to: compare the charging current with the target current, and adjust the control parameter based on a comparison result, where the control parameter is an input voltage of the charger, a working frequency of a wireless charging system, or an input voltage of a wireless electric energy transmitter.

When the control parameter is the working frequency of the wireless charging system or the input voltage of the wireless electric energy transmitter, the controller is further configured to send the control parameter to the transmit end, where the transmit end includes the wireless electric energy transmitter and the transmit coil.

With reference to the first aspect, in a second possible implementation, the controller is further configured to: obtain a configured input voltage value of the wireless electric energy transmitter based on the required charging power, and send the configured input voltage value of the wireless electric energy transmitter to the transmit end, so that the input voltage of the wireless electric energy transmitter is regulated to the configured input voltage value of the wireless electric energy transmitter.

With reference to the first aspect, in a third possible implementation, when the input voltage of the wireless electric energy transmitter is of a graded type, the controller is specifically configured to: determine a grade of the input voltage of the wireless electric energy transmitter based on the required charging power, and use a voltage value at the grade as the configured input voltage value of the wireless electric energy transmitter.

With reference to the first aspect, in a fourth possible implementation, when the input voltage of the wireless electric energy transmitter is of a stepwise regulatable type, the controller is configured to: obtain a voltage coefficient corresponding to the required charging power, and obtain the configured input voltage value of the wireless electric energy transmitter based on the voltage coefficient and a charging voltage of the battery.

With reference to the first aspect, in a fifth possible implementation, the controller is specifically configured to: when determining that the charging current is less than a minimum value of an interval corresponding to the target current, increase the input voltage of the charger by a first preset voltage step; or when determining that the charging current is greater than a maximum value of the interval corresponding to the target current, decrease the input voltage of the charger by the first preset voltage step, until the charging current falls between the minimum value of the interval corresponding to the target current and the maximum value of the interval corresponding to the target current.

With reference to the first aspect, in a sixth possible implementation, the controller is specifically configured to: obtain a current difference between the target current and the charging current, regulate a configured input voltage value of the charger by multiplying the current difference by a preset current adjustment ratio and using a product as an input voltage regulation amount of the charger, and send a regulated configured input voltage value of the charger to the wireless electric energy receiver.

With reference to the first aspect, in a seventh possible implementation, the controller is specifically configured to: when determining that the charging current is less than a minimum value of the target current, increase the working frequency of the wireless charging system by a preset frequency step; or when determining that the charging current is greater than a maximum value of the target current, decrease the working frequency of the wireless charging system by the preset frequency step, until the charging current falls between the minimum value of the target current and the maximum value of the target current.

With reference to the first aspect, in an eighth possible implementation, the controller is specifically configured to: obtain a current difference between the target current and the charging current, modulate a working frequency setting value of the wireless charging system by multiplying the current difference by a preset current adjustment ratio and using a product as a working frequency modulation amount of the wireless charging system, and send a modulated working frequency setting value to the transmit end.

With reference to the first aspect, in a ninth possible implementation, the controller is specifically configured to: when determining that the charging current is less than a minimum value of the target current, increase a configured input voltage value of the wireless electric energy transmitter by a second preset voltage step; or when determining that the charging current is greater than a maximum value of the target current, decrease a configured input voltage value of the wireless electric energy transmitter by the second preset voltage step, until the charging current falls between the minimum value of the target current and the maximum value of the target current.

With reference to the first aspect, in a tenth possible implementation, the controller is specifically configured to: obtain a current difference between the target current and the charging current, regulate a configured input voltage value of the wireless electric energy transmitter by multiplying the current difference by a preset current adjustment ratio and using a product as an input voltage regulation amount of the wireless electric energy transmitter, and send the configured input voltage value of the wireless electric energy transmitter to the transmit end.

With reference to the first aspect, in an eleventh possible implementation, the controller is specifically configured to: obtain a current difference between the target current and the charging current, and regulate a configured input voltage value of the charger by multiplying the current difference by a preset current adjustment ratio and using a product as an input voltage regulation amount of the charger; obtain a voltage gain by using the input voltage of the wireless electric energy transmitter and a regulated configured input voltage value of the charger; and when determining that the voltage gain falls outside a preset gain range, regulate a configured input voltage value of the wireless electric energy transmitter, send a regulated configured input voltage value of the wireless electric energy transmitter to the transmit end, and send the regulated configured input voltage value of the charger to the wireless electric energy receiver.

With reference to the first aspect, in a twelfth possible implementation, the controller is specifically configured to: obtain a current difference between the target current and the charging current, and regulate a configured input voltage value of the wireless electric energy transmitter by multiplying the current difference by a preset current adjustment ratio and using a product as an input voltage regulation amount of the wireless electric energy transmitter; obtain a voltage gain by using the input voltage of the charger and a regulated configured input voltage value of the wireless electric energy transmitter; and when determining that the voltage gain falls outside a preset gain range, regulate a configured input voltage value of the charger, send a regulated configured input voltage value of the charger to the wireless electric energy receiver, and send the regulated configured input voltage value of the wireless electric energy transmitter to the transmit end.

With reference to the first aspect, in a thirteenth possible implementation, the controller is configured to: when determining that the charging current falls outside an interval corresponding to the target current, regulate a configured input voltage value of the charger, and obtain a gain by using a regulated configured input voltage value of the charger and the input voltage of the wireless electric energy transmitter; and when determining that the gain falls outside a preset gain range, regulate a configured input voltage value of the wireless electric energy transmitter, send a regulated configured input voltage value of the wireless electric energy transmitter to the transmit end, and send the regulated configured input voltage value of the charger to the wireless electric energy receiver.

With reference to the first aspect, in a fourteenth possible implementation, the controller is configured to: when determining that the charging current falls outside an interval corresponding to the target current, regulate a configured input voltage value of the wireless electric energy transmitter, and obtain a gain by using the input voltage of the charger and a regulated configured input voltage value of the wireless electric energy transmitter; and when determining that the gain falls outside a preset gain range, regulate a configured input voltage value of the charger, send the regulated configured input voltage value of the wireless electric energy transmitter to the transmit end, and send a regulated configured input voltage value of the charger to the wireless electric energy receiver.

Optionally, when the open-loop DC-DC converter works in the constant voltage step-down phase, the charging parameter is a charging voltage of the battery, and the target parameter is a target charging voltage.

The controller is configured to: compare the charging voltage of the battery with the target charging voltage, and adjust the control parameter based on a comparison result, where the control parameter is an input voltage of the charger, a working frequency of a wireless charging system, or an input voltage of a wireless electric energy transmitter.

When the control parameter is the working frequency of the wireless charging system or the input voltage of the wireless electric energy transmitter, the controller is further configured to send the control parameter to the transmit end, where the transmit end includes the wireless electric energy transmitter and the transmit coil.

With reference to the first aspect, in a fifteenth possible implementation, the controller is further configured to: obtain a configured input voltage value of the wireless electric energy transmitter based on the required charging power, and send the configured input voltage value of the wireless electric energy transmitter to the transmit end, so that the input voltage of the wireless electric energy transmitter is regulated to the configured input voltage value of the wireless electric energy transmitter.

With reference to the first aspect, in a sixteenth possible implementation, when the input voltage of the wireless electric energy transmitter is of a graded type, the controller is specifically configured to: determine a grade of the input voltage of the wireless electric energy transmitter based on the required charging power, and use a voltage value at the grade as the configured input voltage value.

With reference to the first aspect, in a seventeenth possible implementation, when the input voltage of the wireless electric energy transmitter is of a stepwise regulatable type, the controller is configured to: obtain a voltage coefficient corresponding to the required charging power, and obtain the configured input voltage value of the wireless electric energy transmitter based on the voltage coefficient and the charging voltage of the battery.

With reference to the first aspect, in an eighteenth possible implementation, the controller is specifically configured to: obtain a voltage difference between the target charging voltage and the charging voltage of the battery, regulate a configured input voltage value of the charger by multiplying the voltage difference by a preset voltage regulation ratio and using a product as an input voltage regulation amount of the charger, and send a regulated configured input voltage value of the charger to the wireless electric energy receiver.

With reference to the first aspect, in a nineteenth possible implementation, the controller is specifically configured to: obtain a voltage difference between the target charging voltage and the charging voltage of the battery, modulate a working frequency setting value of the wireless charging system by multiplying the voltage difference by a preset voltage regulation ratio and using a product as a working frequency modulation amount of the wireless charging system, and send a modulated working frequency setting value to the transmit end.

With reference to the first aspect, in a twentieth possible implementation, the controller is specifically configured to: obtain a voltage difference between the target charging voltage and the charging voltage of the battery, regulate a configured input voltage value of the wireless electric energy transmitter by multiplying the voltage difference by a preset voltage regulation ratio and using a product as an input voltage regulation amount of the wireless electric energy transmitter, and send a regulated configured input voltage value of the wireless electric energy transmitter to the transmit end.

With reference to the first aspect, in a twenty-first possible implementation, the controller is specifically configured to: obtain a voltage difference between the target charging voltage and the charging voltage of the battery, and regulate a configured input voltage value of the charger by multiplying the voltage difference by a preset voltage regulation ratio and using a product as an input voltage regulation amount of the charger; obtain a voltage gain by using the input voltage of the wireless electric energy transmitter and a regulated configured input voltage value of the charger; and when determining that the voltage gain falls outside a preset gain range, regulate a configured input voltage value of the wireless electric energy transmitter, send a regulated configured input voltage value of the wireless electric energy transmitter to the transmit end, and send the regulated configured input voltage value of the charger to the wireless electric energy receiver.

With reference to the first aspect, in a twenty-second possible implementation, the controller is specifically configured to: obtain a voltage difference between the target charging voltage and the charging voltage of the battery, and regulate a configured input voltage value of the wireless electric energy transmitter by multiplying the voltage difference by a preset voltage regulation ratio and using a product as an input voltage regulation amount of the wireless electric energy transmitter; obtain a voltage gain by using the input voltage of the charger and a regulated configured input voltage value of the wireless electric energy transmitter; and when determining that the voltage gain falls outside a preset gain range, regulate a configured input voltage value of the charger, send a regulated configured input voltage value of the charger to the wireless electric energy receiver, and send the regulated configured input voltage value of the wireless electric energy transmitter to the wireless electric energy transmit end.

With reference to the first aspect, optionally, the device further includes a step-down DC-DC circuit connected between the wireless electric energy receiver and the input end of the charger.

The controller is further configured to: when the power of the transmit end is greater than the first preset threshold of the transmit end and the required charging power is greater than the first preset threshold of the receive end, control the step-down DC-DC circuit to work in a shoot through state; or when the power of the transmit end is greater than a second preset threshold of the transmit end and the required charging power is greater than a second preset threshold of the receive end, control the step-down DC-DC circuit to work in a step-down state.

Optionally, the closed-loop DC-DC converter is a buck charger, and the open-loop DC-DC converter is a switched capacitor charger, a load switch charger, or a flash charger.

Optionally, the charger includes one open-loop DC-DC converter and two closed-loop DC-DC converters.

The open-loop DC-DC converter is connected to the two closed-loop DC-DC converters in series.

A second aspect of this application provides a wireless charging method, applied to wirelessly charging an electronic device and including:

controlling a receive coil to receive an alternating magnetic field transmitted by a transmit coil, and convert the alternating magnetic field into an alternating current;

controlling a wireless electric energy receiver to convert the alternating current sent by the receive coil into a direct current;

controlling a charger to charge a battery after converting the direct current sent by the wireless electric energy receiver; and when power of a transmit end is greater than a first preset threshold of the transmit end and required charging power is greater than a first preset threshold of a receive end, controlling an open-loop DC-DC converter to work in a fast charging phase, including: controlling the open-loop DC-DC converter to charge the battery at a constant current, or charge the battery at a constant voltage.

If the open-loop DC-DC converter is connected to a closed-loop DC-DC converter in series, the closed-loop DC-DC converter is controlled to work in a shoot through state; or if the open-loop DC-DC converter is controlled to a closed-loop DC-DC converter in parallel, the closed-loop DC-DC converter is prohibited from working.

With reference to the second aspect, the controlling an open-loop DC-DC converter to work in a fast charging phase may specifically include:

comparing a charging parameter of the open-loop DC-DC converter with a target parameter to obtain a control parameter, and controlling, based on the control parameter, the open-loop DC-DC converter to work in the fast charging phase.

With reference to the second aspect, in a first possible implementation, when the open-loop DC-DC converter works in a constant current step-down phase, the charging parameter is a charging current, and the target parameter is a target current;

the comparing a charging parameter of the open-loop DC-DC converter with a target parameter to obtain a control parameter specifically includes:

comparing the charging current with the target current, and adjusting the control parameter based on a comparison result, where the control parameter is an input voltage of the charger, a working frequency of a wireless charging system, or an input voltage of a wireless electric energy transmitter; and when the control parameter is the working frequency of the wireless charging system or the input voltage of the wireless electric energy transmitter, the method further includes: sending the control parameter to the transmit end, where the transmit end includes the wireless electric energy transmitter and the transmit coil.

With reference to the second aspect, in a second possible implementation, the method further includes: obtaining a configured input voltage value of the wireless electric energy transmitter based on the required charging power, and sending the configured input voltage value of the wireless electric energy transmitter to the transmit end, so that the input voltage of the wireless electric energy transmitter is regulated to the configured input voltage value of the wireless electric energy transmitter.

With reference to the second aspect, in a third possible implementation, when the input voltage of the wireless electric energy transmitter is of a stepwise regulatable type, the method further includes: obtaining a voltage coefficient corresponding to the required charging power, and obtaining the configured input voltage value of the wireless electric energy transmitter based on the voltage coefficient and a charging voltage of the battery.

With reference to the second aspect, in a fourth possible implementation, the comparing the charging current with the target current, and adjusting the control parameter based on a comparison result specifically includes:

when determining that the charging current is less than a minimum value of an interval corresponding to the target current, increasing the input voltage of the charger by a first preset voltage step; or when determining that the charging current is greater than a maximum value of the interval corresponding to the target current, decreasing the input voltage of the charger by the first preset voltage step, until the charging current falls between the minimum value of the interval corresponding to the target current and the maximum value of the interval corresponding to the target current.

With reference to the second aspect, in a fifth possible implementation, the comparing the charging current with the target current, and adjusting the control parameter based on a comparison result specifically includes:

obtaining a current difference between the target current and the charging current, regulating a configured input voltage value of the charger by multiplying the current difference by a preset current adjustment ratio and using a product as an input voltage regulation amount of the charger, and sending a regulated configured input voltage value of the charger to the wireless electric energy receiver.

With reference to the second aspect, in a sixth possible implementation, the comparing the charging current with the target current, and adjusting the control parameter based on a comparison result specifically includes:

when determining that the charging current is less than a minimum value of an interval corresponding to the target current, increasing the working frequency of the wireless charging system by a preset frequency step; or when determining that the charging current is greater than a maximum value of the interval corresponding to the target current, decreasing the working frequency of the wireless charging system by the preset frequency step, until the charging current falls between the minimum value of the interval corresponding to the target current and the maximum value of the interval corresponding to the target current.

With reference to the second aspect, in a seventh possible implementation, the comparing the charging current with the target current, and adjusting the control parameter based on a comparison result specifically includes:

obtaining a current difference between the target current and the charging current, modulating a working frequency setting value of the wireless charging system by multiplying the current difference by a preset current adjustment ratio and using a product as a working frequency modulation amount of the wireless charging system, and sending a modulated working frequency setting value to the transmit end.

With reference to the second aspect, in an eighth possible implementation, the comparing the charging current with the target current, and adjusting the control parameter based on a comparison result specifically includes:

when determining that the charging current is less than a minimum value of an interval corresponding to the target current, increasing a configured input voltage value of the wireless electric energy transmitter by a second preset voltage step; or when determining that the charging current is greater than a maximum value of the interval corresponding to the target current, decreasing a configured input voltage value of the wireless electric energy transmitter by the second preset voltage step, until the charging current falls between the minimum value of the interval corresponding to the target current and the maximum value of the interval corresponding to the target current.

With reference to the second aspect, in a ninth possible implementation, the comparing the charging current with the target current, and adjusting the control parameter based on a comparison result specifically includes:

obtaining a current difference between the target current and the charging current, regulating a configured input voltage value of the wireless electric energy transmitter by multiplying the current difference by a preset current adjustment ratio and using a product as an input voltage regulation amount of the wireless electric energy transmitter, and sending a regulated configured input voltage value of the wireless electric energy transmitter to the transmit end.

With reference to the second aspect, in a tenth possible implementation, the comparing the charging current with the target current, and adjusting the control parameter based on a comparison result specifically includes:

obtaining a current difference between the target current and the charging current, and regulating a configured input voltage value of the charger by multiplying the current difference by a preset current adjustment ratio and using a product as an input voltage regulation amount of the charger; obtaining a voltage gain by using the input voltage of the wireless electric energy transmitter and a regulated configured input voltage value of the charger; and when determining that the voltage gain falls outside a preset gain range, regulating a configured input voltage value of the wireless electric energy transmitter, sending a regulated configured input voltage value of the wireless electric energy transmitter to the transmit end, and sending the regulated configured input voltage value of the charger to the wireless electric energy receiver.

With reference to the second aspect, in an eleventh possible implementation, the comparing the charging current with the target current, and adjusting the control parameter based on a comparison result specifically includes:

obtaining a current difference between the target current and the charging current, and regulating a configured input voltage value of the wireless electric energy transmitter by multiplying the current difference by a preset current adjustment ratio and using a product as an input voltage regulation amount of the wireless electric energy transmitter; obtaining a voltage gain by using the input voltage of the charger and a regulated configured input voltage value of the wireless electric energy transmitter; and when determining that the voltage gain falls outside a preset gain range, regulating a configured input voltage value of the charger, sending a regulated configured input voltage value of the charger to the wireless electric energy receiver, and send the regulated configured input voltage value of the wireless electric energy transmitter to the transmit end.

With reference to the second aspect, in a twelfth possible implementation, the comparing the charging current with the target current, and adjusting the control parameter based on a comparison result specifically includes:

when determining that the charging current falls outside an interval corresponding to the target current, regulating a configured input voltage value of the charger, and obtaining a gain by using a regulated configured input voltage value of the charger and the input voltage of the wireless electric energy transmitter; and when determining that the gain falls outside a preset gain range, regulating a configured input voltage value of the wireless electric energy transmitter, sending a regulated configured input voltage value of the wireless electric energy transmitter to the transmit end, and sending the regulated configured input voltage value of the charger to the wireless electric energy receiver.

With reference to the second aspect, in a thirteenth possible implementation, the comparing the charging current with the target current, and adjusting the control parameter based on a comparison result specifically includes:

when determining that the charging current falls outside an interval corresponding to the target current, regulating a configured input voltage value of the wireless electric energy transmitter, and obtaining a gain by using the input voltage of the charger and a regulated configured input voltage value of the wireless electric energy transmitter; and when determining that the gain falls outside a preset gain range, regulating a configured input voltage value of the charger, sending the regulated configured input voltage value of the wireless electric energy transmitter to the transmit end, and sending a regulated configured input voltage value of the charger to the wireless electric energy receiver.

With reference to the second aspect, in a fourteenth possible implementation, when the open-loop DC-DC converter works in a constant voltage step-down phase, the charging parameter is a charging voltage of the battery, and the target parameter is a target charging voltage;

the comparing a charging parameter of the open-loop DC-DC converter with a target parameter to obtain a control parameter specifically includes:

comparing the charging voltage of the battery with the target charging voltage, and adjusting the control parameter based on a comparison result, where the control parameter is an input voltage of the charger, a working frequency of a wireless charging system, or an input voltage of a wireless electric energy transmitter; and when the control parameter is the working frequency of the wireless charging system or the input voltage of the wireless electric energy transmitter, the method further includes: sending the control parameter to the transmit end.

With reference to the second aspect, in a fifteenth possible implementation, the comparing the charging voltage of the battery with the target charging voltage, and adjusting the control parameter based on a comparison result specifically includes:

obtaining a configured input voltage value of the wireless electric energy transmitter based on the required charging power, and sending the configured input voltage value of the wireless electric energy transmitter to the transmit end, so that the input voltage of the wireless electric energy transmitter is regulated to the configured input voltage value of the wireless electric energy transmitter.

With reference to the second aspect, in a sixteenth possible implementation, the method further includes: obtaining a configured input voltage value of the wireless electric energy transmitter based on the required charging power, and sending the configured input voltage value of the wireless electric energy transmitter to the transmit end, so that the input voltage of the wireless electric energy transmitter is regulated to the configured input voltage value of the wireless electric energy transmitter.

With reference to the second aspect, in a seventeenth possible implementation, the method further includes: when the input voltage of the wireless electric energy transmitter is of a graded type, determining a grade of the input voltage of the wireless electric energy transmitter based on the required charging power, and using a voltage value at the grade as the configured input voltage value.

With reference to the second aspect, in an eighteenth possible implementation, the method further includes: when the input voltage of the wireless electric energy transmitter is of a stepwise regulatable type, obtaining a voltage coefficient corresponding to the required charging power, and obtaining the configured input voltage value of the wireless electric energy transmitter based on the voltage coefficient and the charging voltage of the battery.

With reference to the second aspect, in a nineteenth possible implementation, the comparing the charging voltage of the battery with the target charging voltage, and adjusting the control parameter based on a comparison result specifically includes:

obtaining a voltage difference between the target charging voltage and the charging voltage of the battery, regulating a configured input voltage value of the charger by multiplying the voltage difference by a preset voltage regulation ratio and using a product as an input voltage regulation amount of the charger, and sending a regulated configured input voltage value of the charger to the wireless electric energy receiver.

With reference to the second aspect, in a twentieth possible implementation, the comparing the charging voltage of the battery with the target charging voltage, and adjusting the control parameter based on a comparison result specifically includes:

obtaining a voltage difference between the target charging voltage and the charging voltage of the battery, modulating a working frequency setting value of the wireless charging system by multiplying the voltage difference by a preset voltage regulation ratio and using a product as a working frequency modulation amount of the wireless charging system, and sending a modulated working frequency setting value to the transmit end.

With reference to the second aspect, in a twenty-first possible implementation, the comparing the charging voltage of the battery with the target charging voltage, and adjusting the control parameter based on a comparison result specifically includes:

obtaining a voltage difference between the target charging voltage and the charging voltage of the battery, regulating a configured input voltage value of the wireless electric energy transmitter by multiplying the voltage difference by a preset voltage regulation ratio and using a product as an input voltage regulation amount of the wireless electric energy transmitter, and sending a regulated configured input voltage value of the wireless electric energy transmitter to the transmit end.

With reference to the second aspect, in a twenty-second possible implementation, the comparing the charging voltage of the battery with the target charging voltage, and adjusting the control parameter based on a comparison result specifically includes:

obtaining a voltage difference between the target charging voltage and the charging voltage of the battery, and regulating a configured input voltage value of the charger by multiplying the voltage difference by a preset voltage regulation ratio and using a product as an input voltage regulation amount of the charger; obtaining a voltage gain by using the input voltage of the wireless electric energy transmitter and a regulated configured input voltage value of the charger; and when determining that the voltage gain falls outside a preset gain range, regulating a configured input voltage value of the wireless electric energy transmitter, sending a regulated configured input voltage value of the wireless electric energy transmitter to the transmit end, and sending the regulated configured input voltage value of the charger to the wireless electric energy receiver.

With reference to the second aspect, in a twenty-third possible implementation, the comparing the charging voltage of the battery with the target charging voltage, and adjusting the control parameter based on a comparison result specifically includes:

obtaining a voltage difference between the target charging voltage and the charging voltage of the battery, and regulating a configured input voltage value of the wireless electric energy transmitter by multiplying the voltage difference by a preset voltage regulation ratio and using a product as an input voltage regulation amount of the wireless electric energy transmitter; obtaining a voltage gain by using the input voltage of the charger and a regulated configured input voltage value of the wireless electric energy transmitter; and when determining that the voltage gain falls outside a preset gain range, regulating a configured input voltage value of the charger, sending a regulated configured input voltage value of the charger to the wireless electric energy receiver, and sending the regulated configured input voltage value of the wireless electric energy transmitter to the wireless electric energy transmit end.

A third aspect of this application provides a wireless charging system, including an adapter, a transmit end, and the electronic device provided in the first aspect of this application, where the transmit end includes a wireless electric energy transmitter, a transmit coil, and a transmit end controller;

the adapter is configured to convert an alternating current received from an alternating current power supply into a direct current;

the wireless electric energy transmitter is configured to: invert the direct current sent by the adapter into an alternating current, and send the alternating current to the transmit coil;

the transmit coil is configured to transmit, in a form of an alternating magnetic field, the alternating current sent by the wireless electric energy transmitter; and the transmit end controller is configured to: obtain power of the transmit end, and send the power of the transmit end to a controller of the electronic device.

With reference to the third aspect, in a first possible implementation, the transmit end controller is further configured to control an output voltage of the adapter based on a configured input voltage value that is of the wireless electric energy transmitter and that is sent by the controller of the electronic device, so that an input voltage of the wireless electric energy transmitter reaches the configured input voltage value of the wireless electric energy transmitter.

With reference to the third aspect, in a second possible implementation, the transmit end controller is further configured to control, based on a working frequency setting value sent by the controller of the electronic device, the wireless charging system to work at the working frequency setting value.

With reference to the third aspect, in a third possible implementation, the controller of the electronic device is further configured to communicate with the transmit end controller to obtain a regulatable type of an input voltage of the wireless electric energy transmitter, where the regulatable type of the input voltage of the wireless electric energy transmitter includes a graded voltage regulation type and a stepwise regulatable type.

Compared with the conventional technology, this application has at least the following advantages:

In this application, the charger of the receive end of the wireless charging system includes the open-loop DC-DC converter. When the power of the transmit end is greater than the first preset threshold of the transmit end and the required charging power is greater than the first preset threshold of the receive end, the open-loop DC-DC converter is controlled to work in the fast charging phase, specifically including: controlling the open-loop DC-DC converter to work in the constant current step-down phase to charge the battery at the constant current, or controlling the open-loop DC-DC converter to work in the constant voltage step-down phase to charge the battery at the constant voltage. In the technical solutions of this application, charging is effectively controlled based on a power capability of the transmit end, to improve wireless charging efficiency of the receive end, and improve working efficiency of the transmit end and fully utilize the power capability of the transmit end, so that charging stability is also improved.

BRIEF DESCRIPTION OF DRAWINGS

To describe the technical solutions in the embodiments of this application more clearly, the following briefly describes the accompanying drawings required for describing the embodiments or the prior art. Clearly, the accompanying drawings in the following description show some embodiments of this application, and a person of ordinary skill in the art may still derive other drawings from these accompanying drawings without creative efforts.

DESCRIPTION OF EMBODIMENTS

Figure 1:
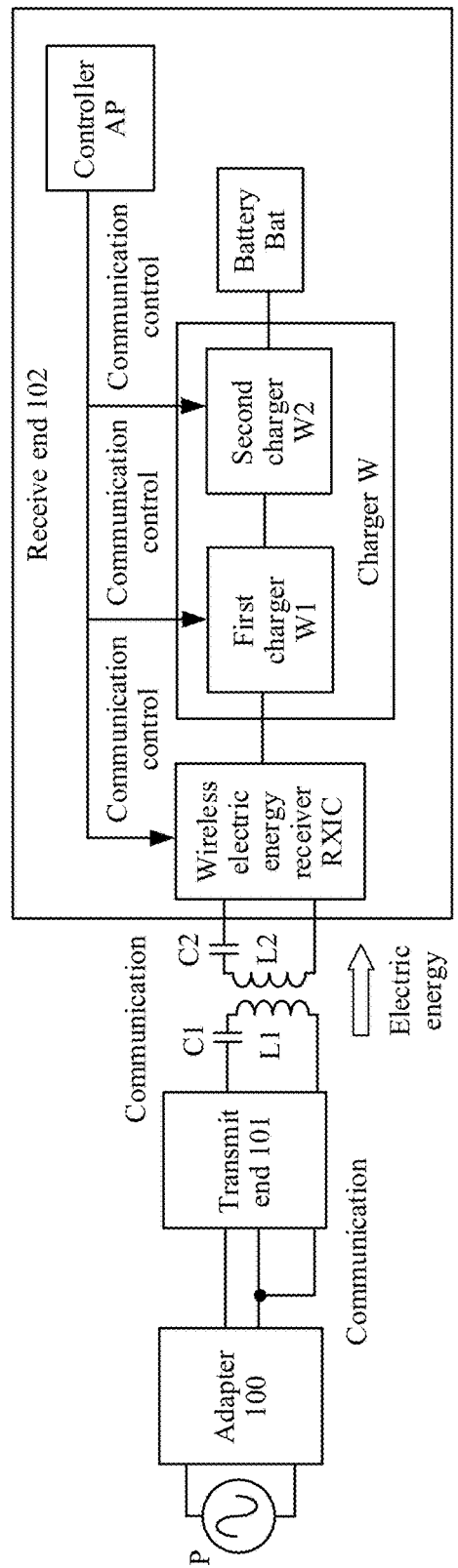
FIG. 1 is a schematic diagram of architecture of a wireless charging system according to Device Embodiment 1 of this application.

A wireless charging technology has been applied to many electronic devices, but improving wireless charging efficiency is a difficulty that is not easy to break through for the technology. Currently, this problem may be resolved by improving a hardware architecture of a receive end in a wireless charging system.

The wireless charging system is used as a complete system, and in a process of wirelessly charging the receive end by using a transmit end, charging efficiency, charging power, and a charging rate are related to the hardware architecture of the receive end.

To resolve the foregoing problem of low charging efficiency, low charging power, and a low charging rate, the present disclosure provides a receive end hardware architecture with a wireless fast charging path to implement a wireless fast charging system architecture, to improve wireless charging power. The wireless fast charging system architecture can provide the wireless fast charging path (that is, use wireless charging rectifier output to directly charge a battery by using an open-loop DC-DC converter), so that a wireless charging system can wirelessly charge an electronic device at higher charging power.

Charging performance (stability) of the wireless charging system with the wireless fast charging path further has a close relationship with cooperation between a receive end and a transmit end.

First, the close relationship is represented as stable and reliable control of the wireless fast charging path.

Second, the close relationship is represented as how to identify a power capability of an adapter and a power capability of the transmit end, and select a proper charging curve, to improve working efficiency of the transmit end and fully utilize the power capability of the transmit end.

For example, during actual wireless charging, a user may charge the receive end by using different adapters and different transmit ends. If the receive end with the wireless fast charging path can match only one type of transmit end and one type of adapter to implement wireless charging at higher power, there is a possibility that the receive end can implement efficient charging only in a use scenario of the transmit end and the adapter. However, because the receive end does not match another type of transmit end or another type of adapter, when the user charges the receive end by using another type of transmit end and another type of adapter, charging efficiency is low, affecting user experience.

To resolve the foregoing problem, this application provides a wirelessly charged electronic device, a wireless charging method, and a wireless charging system. For an entire wireless charging system, as a charged electronic device, a wirelessly charged electronic device is a wireless electric energy receive end. To facilitate understanding of technical solutions of this application, the following specifically describes, with reference to embodiments and accompanying drawings, the technical solutions provided in this application.

The wireless charging system provided in the embodiments of this application includes a power supply, an adapter, a transmit end, and a receive end. The receive end includes a charger, a controller, a receive coil, a battery, and the like. The charger has a plurality of implementations. The following separately describes the plurality of implementations by using a plurality of embodiments.

Device Embodiment 1

FIG. 1 is a schematic diagram of architecture of a wireless charging system according to an embodiment of this application. An architecture of a receive end may be seen from the figure.

As shown in FIG. 1, the wireless charging system includes a power supply P, an adapter 100, a transmit end 101, and a receive end 102. The receive end 102 is a wirelessly charged electronic device provided in this embodiment of this application. As an example, the electronic device 102 may be an electronic device that can be wirelessly charged, such as a mobile phone, a tablet computer, a notebook computer, a Bluetooth headset, a smartwatch, or an electric toothbrush.

The transmit end 101 and the receive end 102 each have a coil. A coil of the transmit end 101 is referred to as a transmit coil L1, and a coil of the receive end 102 is referred to as a receive coil L2. The transmit coil L1 and a first resonant capacitor C1 jointly constitute a first resonant network of the transmit end 101. The receive coil L2 and a second resonant capacitor C2 jointly constitute a second resonant network of the receive end 102.

The adapter 100 transmits, to the transmit end 101, electric energy provided by the power supply P, and electromagnetic induction can be performed between the transmit coil L1 of the transmit end 101 and the receive coil L2 of the receive end 102. The receive coil L2 of the receive end 102 is configured to: receive an alternating magnetic field transmitted by the transmit coil L1, and convert the alternating magnetic field into an alternating current.

As shown in FIG. 1, the receive end 102 further includes a wireless electric energy receiver RXIC, a charger W, a controller AP, and a battery Bat. The wireless electric energy receiver RXIC, the charger W, the battery Bat, and the controller AP may be jointly assembled in an integrated electronic device 102; or may be physically separated from each other, and each work as a separate electronic device.

The wireless electric energy receiver RXIC is configured to convert the alternating current sent by the receive coil L2 into a direct current.

The charger W includes at least an open-loop DC-DC converter and a closed-loop DC-DC converter. A connection form of converters inside the charger W is not limited herein.

In the electronic device shown in FIG. 1, the charger W of the receive end 102 may include two chargers connected to each other in series: a first charger W1 and a second charger W2. The first charger W1 includes at least one closed-loop DC-DC converter, and the second charger W2 includes at least one open-loop DC-DC converter. When the charger W works in a step-down mode, at least one of the first charger W1 and the second charger W2 works in the step-down mode to step down a high-voltage direct current to a low-voltage direct current, and a charger that does not work in the step-down mode works in a shoot through mode to provide a direct connection function.

When controlling the open-loop DC-DC converter to work in a fast charging phase, the controller AP controls the closed-loop DC-DC converter to work in a shoot through state or an open state. The open state means that the closed-loop DC-DC converter is prohibited from working. For a structure that is of the charger W and that is shown in FIG. 1, the controller AP is specifically configured to: when controlling the open-loop DC-DC converter to work in the fast charging phase, control the closed-loop DC-DC converter to work in the shoot through state.

Figure 2A:
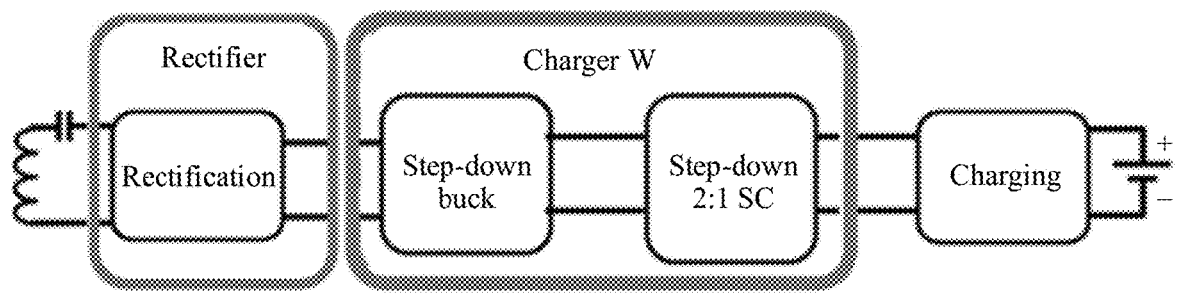
FIG. 2A is a schematic diagram of architecture of a receive end according to a device embodiment of this application.
Figure 2B:
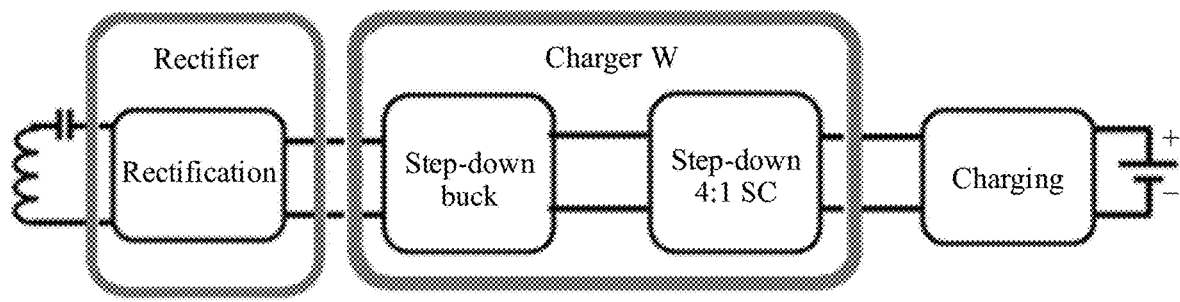
FIG. 2B is a schematic diagram of architecture of another receive end according to a device embodiment of this application.
Figure 2C:
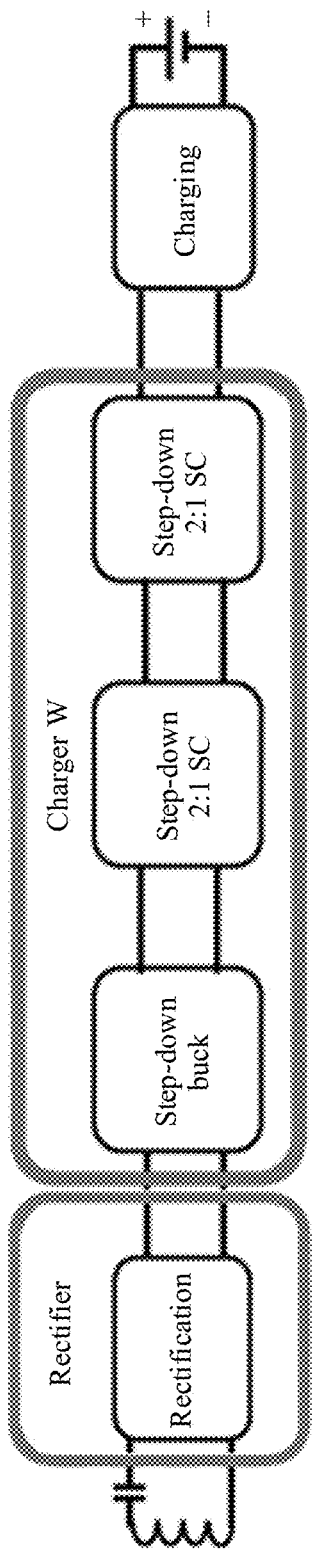
FIG. 2C is a schematic diagram of architecture of still another receive end according to a device embodiment of this application.

In this embodiment, the charger W of the receive end 102 shown in FIG. 1 has a plurality of optional serial-connection implementations. Refer to FIG. 2A to FIG. 2C. FIG. 2A to FIG. 2C respectively provide three architectures of the receive end.

The three architectures each include a plurality of parts such as a resonant topology, rectification, a charger W, charging, and a battery. The rectification part may be implemented by the wireless electric energy receiver RXIC of the receive end 102, and may specifically include a rectifier circuit or include a rectifier circuit and a linear regulator. A working mode of the rectifier circuit is a semi-synchronous rectification mode or a fully-synchronous rectification mode. When the rectification part includes a rectifier circuit and a linear regulator, the linear regulator is specifically configured to perform linear voltage regulation on a direct current obtained by the rectifier circuit through rectification, to improve stability of the entire wireless charging system.

In FIG. 2A, a charger W includes a buck step-down circuit and a 2:1 switched capacitor step-down circuit that are connected in series. In FIG. 2B, a charger W includes a buck step-down circuit and a 4:1 switched capacitor step-down circuit that are connected in series. In FIG. 2C, a charger W includes a buck step-down circuit and two 2:1 switched capacitor step-down circuits that are connected in series.

It should be noted that, in this embodiment of this application, the open-loop DC-DC converter connected in series in the charger W may be a 2:1 switched capacitor, a 3:1 switched capacitor, or a 4:1 switched capacitor, and a stage quantity of the open-loop DC-DC converter is also not limited. For example, if the open-loop DC-DC converter is a 4:1 switched capacitor, the open-loop DC-DC converter may be specifically one 4:1 switched capacitor, or two 2:1 switched capacitors connected in series; or if the open-loop DC-DC converter is a 6:1 switched capacitor, the open-loop DC-DC converter may be specifically three 2:1 switched capacitors connected in series, or two 3:1 switched capacitors connected in series.

Device Embodiment 2

Figure 3:
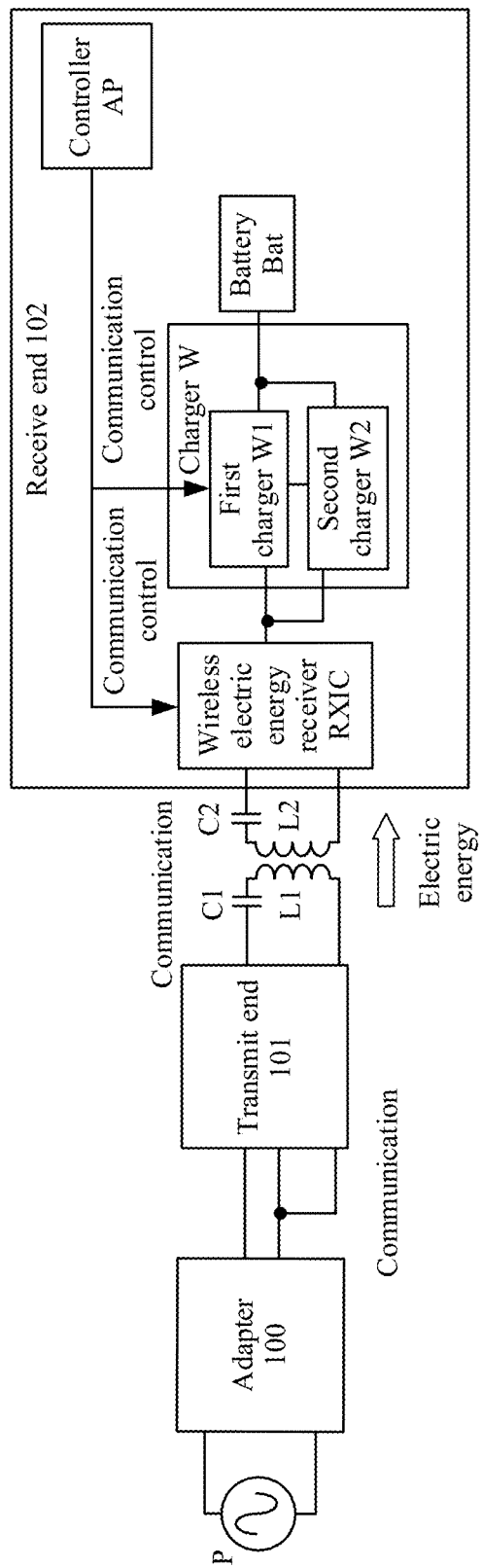
FIG. 3 is a schematic diagram of architecture of a wireless charging system according to Device Embodiment 2 of this application.

FIG. 3 is a schematic diagram of architecture of a wireless charging system according to this embodiment.

As shown in FIG. 3, in the system, a charger W of a receive end 102 includes two chargers connected in parallel: a first charger W1 and a second charger W2. The first charger W1 includes at least one closed-loop DC-DC converter, and the second charger W2 includes at least one open-loop DC-DC converter. When the first charger W1 works in a step-down mode, the second charger W2 is prohibited from working; or when the second charger W2 works in a step-down mode, the first charger W1 is prohibited from working.

When controlling the open-loop DC-DC converter to work in a fast charging phase, a controller AP controls the closed-loop DC-DC converter to work in a shoot through state or an open state. The open state means that the closed-loop DC-DC converter is prohibited from working. For a structure that is of the charger W and that is shown in FIG. 3, the controller AP is specifically configured to: when controlling the open-loop DC-DC converter to work in the fast charging phase, control the closed-loop DC-DC converter to work in the open state.

In an actual application, in electronic devices (namely, the receive ends 102) shown in FIG. 1 and FIG. 3, working modes of the first charger W1 and the second charger W2 are both controlled by the controller AP.

The closed-loop DC-DC converter may be specifically a buck charger (Buck Charger). Because the buck charger includes a switching transistor, when the closed-loop DC-DC converter is used for step-down, an output voltage of the buck charger may be regulated by controlling a duty cycle of a pulse signal of the switching transistor, so that the output voltage of the buck charger is continuously regulatable. When the output voltage of the buck charger is continuously controllable, wireless charging stability of the receive end 102 may be correspondingly improved.

The open-loop DC-DC converter may be specifically a switched capacitor charger (SC), a load switch charger, a flash charger, or the like. For the SC charger, because an essential principle of the SC charger is a charge pump, the SC charger has a high step-down multiple, and has high energy conversion efficiency, which can reach more than 97%.

In the wireless charging system shown in FIG. 3, an input end of the charger W of the receive end 102 is connected to an output end of a wireless electric energy receiver RXIC, and an output end of the charger W is connected to a battery Bat and is configured to charge the battery Bat after converting a direct current sent by the wireless electric energy receiver RXIC.

In an actual application, a transmit end 101 may perform in-band communication or out-of-band communication with the receive end 102. The in-band communication means that energy and information are simultaneously transmitted, and the out-of-band communication means that energy and information are separately transmitted. In a Qi standard developed by a wireless power consortium (WPC), any communication manner in which energy and information are transmitted together through modulation belongs to the in-band communication. For example, the out-of-band communication may be performed by using Bluetooth. This is not specifically limited in this embodiment. During specific implementation, a controller (not shown in FIG. 3) of the transmit end 101 performs in-band communication or out-of-band communication with the controller AP of the receive end 101.

The transmit end 101 may send power of the transmit end to the controller AP of the receive end 102 in an in-band communication or out-of-band communication manner. The controller AP may also learn required charging power of the receive end 102. The controller AP may be configured to: compare the power of the transmit end with a first preset threshold of the transmit end, and compare the required charging power of the receive end 102 with a first preset threshold of the receive end. In an actual application, the controller AP more accurately learns, based on comparison results of the comparison processes, charging power that can be provided by the transmit end 101 and charging power actually required by the receive end 102, and determines a specific charging phase such as a precharging phase, a constant current step-down phase, or a constant voltage step-down phase on this basis, so that the controller AP can make, with reference to the charging phase, a control policy for improving matching between the transmit end 101 and the receive end 102.

Both the first preset threshold of the transmit end and the first preset threshold of the receive end are preset. When the power of the transmit end 101 is greater than the first preset threshold of the transmit end and the required charging power of the receive end 102 is greater than the first preset threshold of the receive end, it indicates that the transmit end 101 can supply fast charging to the receive end 102. A specific fast charging phase may be a constant current step-down phase, or may be a constant voltage step-down phase. In this embodiment of this application, the controller AP controls the open-loop DC-DC converter to work in the constant current step-down phase or controls the open-loop DC-DC converter to work in the constant voltage step-down phase.

As a possible implementation, the controller AP compares a charging parameter of the open-loop DC-DC converter with a target parameter to obtain a control parameter. The charging parameter of the open-loop DC-DC converter may be specifically a charging parameter of the battery Bat, for example, a charging current, or a charging voltage of the battery. For the constant current step-down phase, the controller AP needs to compare the charging current with a target current used as the target parameter, to obtain the control parameter; and for the constant voltage step-down phase, the controller AP needs to compare the charging voltage of the battery with a target charging voltage used as the target parameter, to obtain the control parameter. The controller AP controls, based on the control parameter, the open-loop DC-DC converter to decrease voltage in a corresponding charging phase.

In the technical solution provided in this embodiment of this application, for the constant current step-down phase, the controller AP can control, based on the control parameter at the power that can be provided by the transmit end 101, the open-loop DC-DC converter to perform constant current step-down to charge the battery Bat of the receive end 102; and for the constant voltage step-down phase, the controller AP can control, based on the control parameter at the power that can be provided by the transmit end 101, the open-loop DC-DC converter to perform constant voltage step-down to charge the battery Bat of the receive end 102. It can be learned that, in the technical solution of this application, a wireless fast charging path of the structure shown in FIG. 1 or FIG. 3 is used (that is, wireless charging rectifier output is used to directly charge the battery by using the open-loop DC-DC converter), so that a power capability of the adapter 100 and a power capability of the transmit end 101 can be identified and matched, and a proper charging curve can be selected, to improve working efficiency of the transmit end 101, and improve a degree of cooperation between the receive end 102 and the transmit end 101, thereby effectively improving wireless charging efficiency of the receive end 102. In addition, in a system architecture, the wireless fast charging path is reliably and stably controlled by using the controller AP, so that wireless charging experience of a user can be improved.

For the structure that is of the charger W and that is shown in FIG. 1, if the open-loop DC-DC converter in the second charger W2 is connected to the closed-loop DC-DC converter in the first charger W1 in series, the controller AP specifically controls the closed-loop DC-DC converter to work in the shoot through state, so that only the open-loop DC-DC converter decreases voltage under the action of the control parameter. For the structure that is of the charger W and that is shown in FIG. 3, if the open-loop DC-DC converter in the second charger W2 is connected to the closed-loop DC-DC converter in the first charger W1 in parallel, the controller AP prohibits the closed-loop DC-DC converter from working, so that only the open-loop DC-DC converter decreases voltage under the action of the control parameter.

The following describes a control policy made by the controller AP for the first charger W1 and the second charger W2 when a wirelessly charged electronic device (namely, the receive end 102) shown in FIG. 3 cooperates with the transmit end 101 in actual working.

For the receive end 102 shown in FIG. 3, the transmit end 101 corresponding to the receive end 102 has a plurality of possible power output capabilities. For example, the power of the transmit end is classified based on two grades: a first power threshold of the transmit end and a second power threshold of the transmit end. The second power threshold of the transmit end is greater than the first power threshold of the transmit end. In this application, the greater second power threshold of the transmit end is referred to as the first preset threshold of the transmit end.

(1) When the power of the transmit end 101 that cooperates with the receive end 102 shown in FIG. 3 is less than the first power threshold of the transmit end, a process of charging the battery Bat sequentially includes two phases, that is, a constant current step-down phase and a constant voltage step-down phase. In each of the two charging phases, the closed-loop DC-DC converter is used to decrease voltage, that is, during charging, the controller AP controls the first charger W1 to work, and prohibits the second charger W2 from working.

Figure 4A:
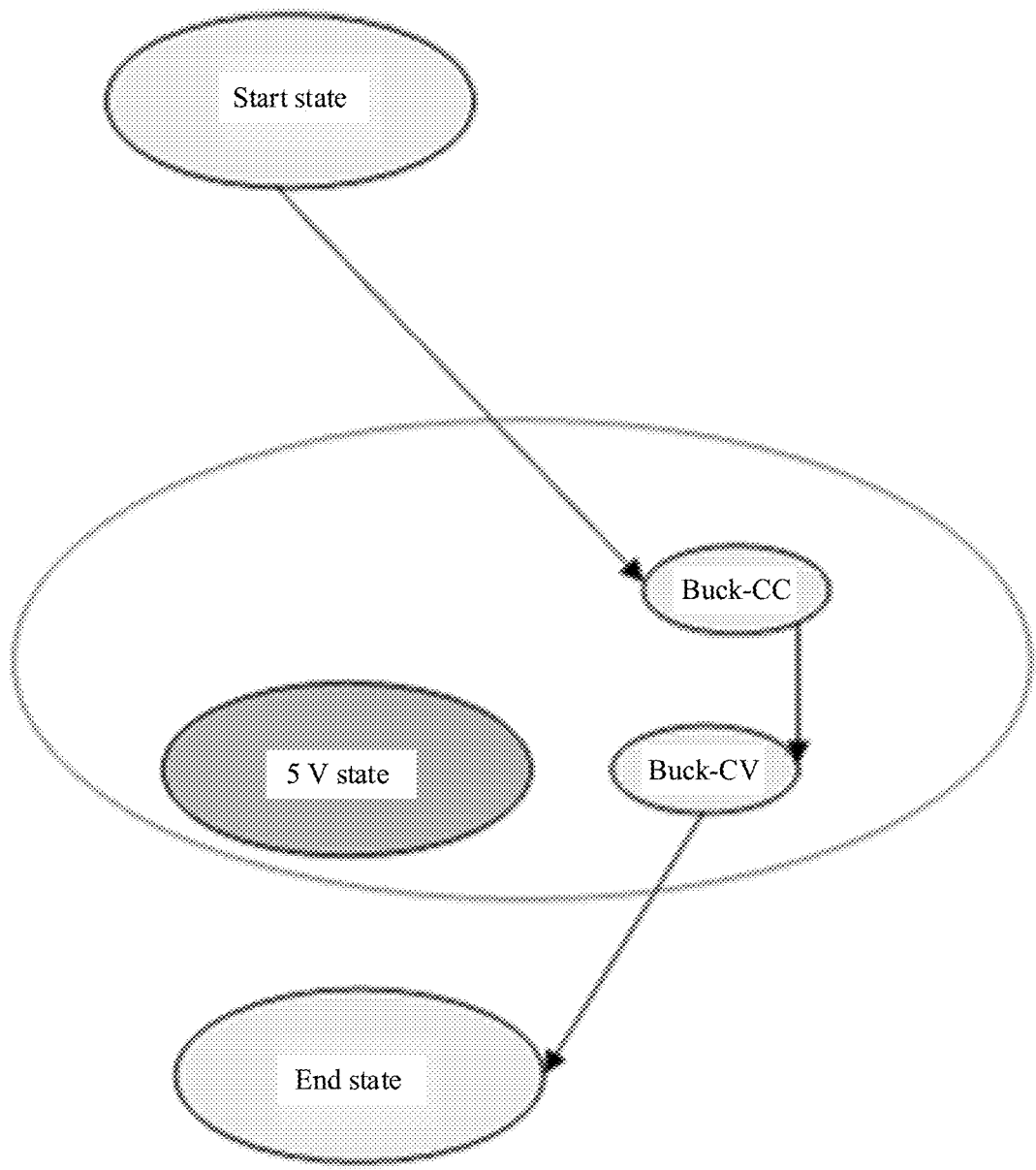
FIG. 4A is a state diagram corresponding to a charging process according to an embodiment of this application.
Figure 4B:
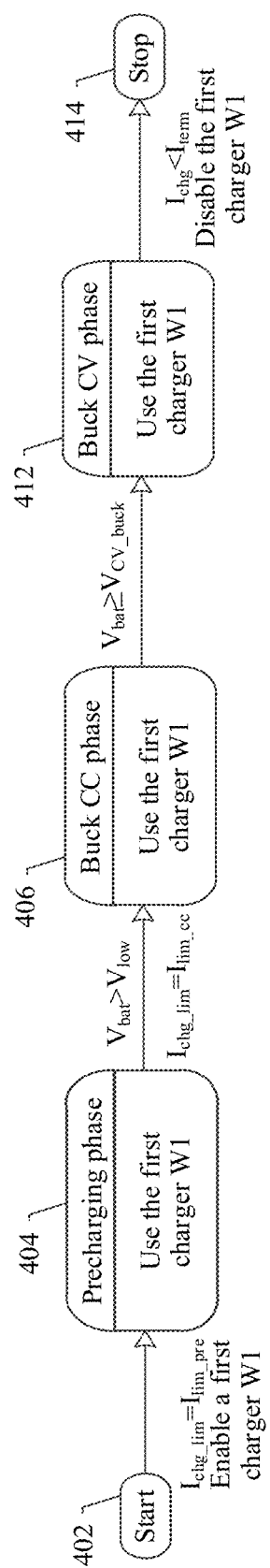
FIG. 4B is a schematic switching condition diagram that is of phases of a wireless charging process and that corresponds to FIG. 4A.

FIG. 4A is a state diagram corresponding to a charging process according to an embodiment of this application, and FIG. 4B is a schematic switching condition diagram that is of phases of a wireless charging process and that corresponds to FIG. 4A.

FIG. 4A shows a process of wirelessly charging the battery of the receive end when the power of the transmit end is less than the first power threshold of the transmit end. A 5 V state is entered from an initial state. When the 5 V state is entered, first, a constant current step-down phase in which the first charger W1 is responsible for step-down is entered, and then a constant voltage step-down phase in which the first charger W1 is responsible for step-down is entered. Finally, an end state is entered from the 5 V state, and the charging ends.

Referring to FIG. 4B, after a start state 402, a charging current limit ($I_{chg\_lim}$) of the battery Bat is set to be equal to a precharging current limit ($I_{lim\_pre}$), and the first charger W1 is enabled.

A state 404 corresponds to a precharging phase. In this phase, the first charger W1 performs precharging, and the charging current limit ($I_{chg\_lim}$) of the battery Bat is set to be equal to a constant current limit ($I_{lim\_cc}$). The first charger W1 is used for precharging until the charging voltage ($V_{bat}$) of the battery Bat exceeds a first voltage threshold ($V_{low}$), and $V_{low}$ may also be referred to as a precharging voltage threshold.

A state 406 corresponds to the constant current step-down phase in which the first charger W1 is responsible for step-down ("buck CC phase," for short). In this phase, the charging current ($I_{chg}$) of the battery Bat remains unchanged, and the charging voltage ($V_{bat}$) of the battery Bat gradually increases.

As shown in FIG. 4B, if the charging voltage ($V_{bat}$) of the battery Bat exceeds a third voltage threshold ($V_{cv\_buck}$), it is also possible to directly jump from the state 406 to a state 412.

The state 412 corresponds to the constant voltage step-down phase in which the first charger W1 is responsible for step-down ("buck CV phase," for short). In this phase, the first charger W1 charges the battery Bat, and simultaneously the charging voltage ($V_{bat}$) of the battery Bat is kept approximately constant, until the charging current ($I_{chg}$) of the battery Bat falls below an end charging current threshold ($I_{term}$). In this case, the first charger W1 is disabled, and the charging stops in a state 414. In this case, the battery is fully charged.

In the foregoing description, $I_{lim\_pre}$ is a current limit that is set for precharging. As an example, $I_{lim\_pre}$=120 mA. $I_{lim\_cc}$ is a current limit that is set for constant current step-down charging. As an example, $I_{lim\_cc}$ falls between 1 A and 2 A. $I_{term}$ is a limit that is set for end of charging. As an example, $I_{term}$=10 mA.

(2) When the power of the transmit end 101 that cooperates with the receive end 102 shown in FIG. 3 is greater than the second power threshold of the transmit end, the receive end 102 has a plurality of possible types of required charging power. For example, the required charging power of the receive end 102 is classified based on two grades: a first power threshold of the receive end and a second power threshold of the receive end. The second power threshold of the receive end is greater than the first power threshold of the receive end. In this application, the greater second power threshold of the receive end is referred to as the first preset threshold of the receive end.

If the required charging power of the receive end 102 is less than the first power threshold of the receive end, the controller AP controls the first charger W1 to decrease voltage and prohibits the second charger W2 from working. That the required charging power is less than the first power threshold of the receive end may correspond to a start charging phase of the battery Bat or a trickle phase in which the battery Bat is to be fully charged.

If the required charging power of the receive end 102 is greater than the second power threshold of the receive end, the controller AP switches to the second charger W2 to decrease voltage and prohibits the first charger W1 from working. That the required charging power is greater than the second power threshold of the receive end may correspond to the fast charging phase of the battery Bat. In this case, the battery Bat needs to be fast charged at high power.

Figure 5A:
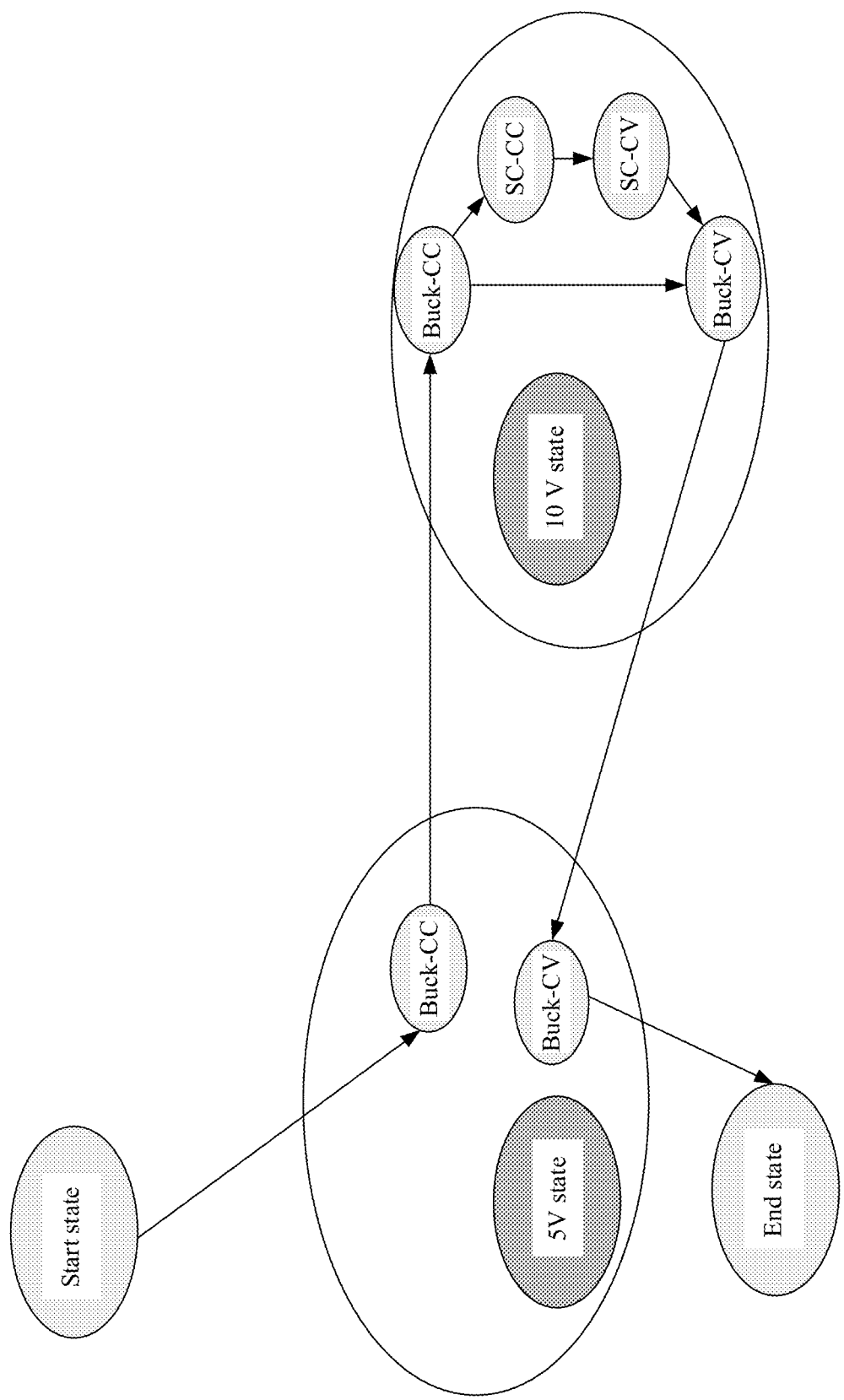
FIG. 5A is a state diagram corresponding to another charging process according to an embodiment of this application.
Figure 5B:
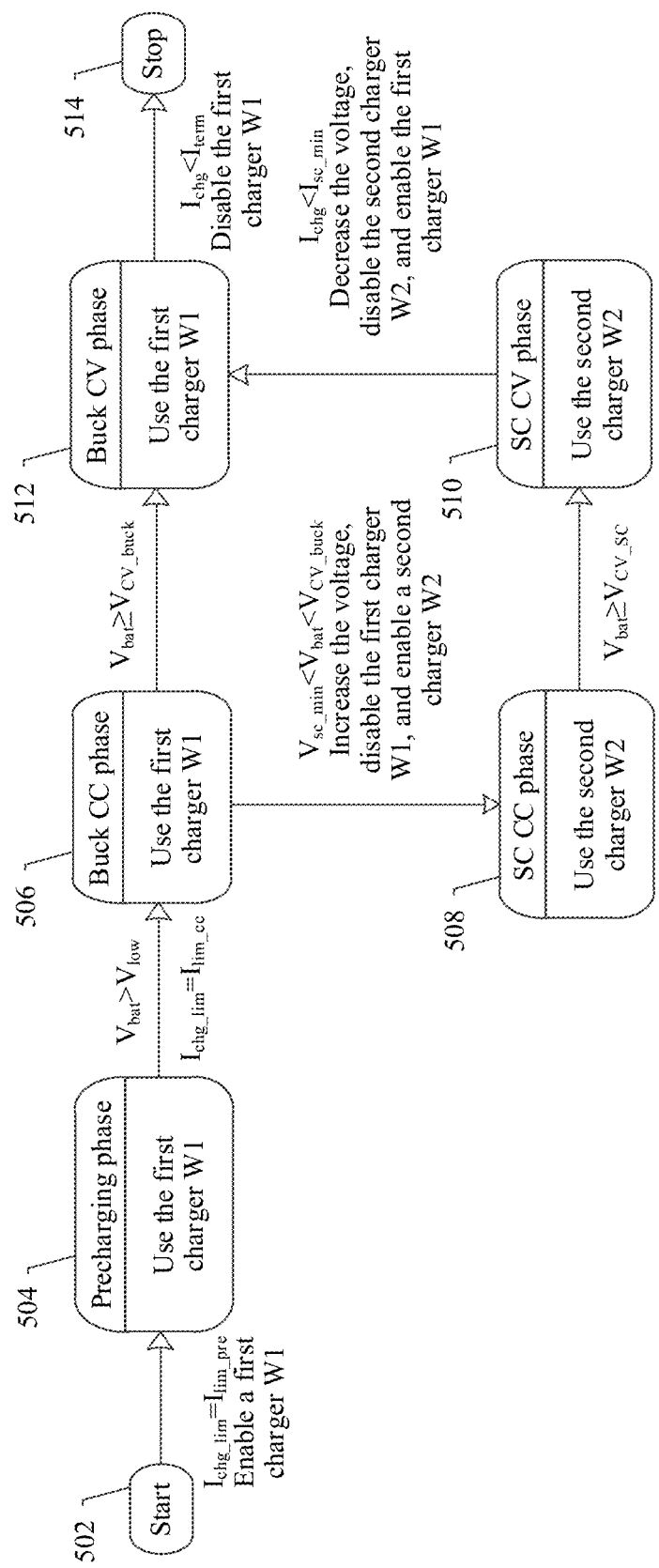
FIG. 5B is a schematic switching condition diagram that is of phases of a wireless charging process and that corresponds to FIG. 5A.

FIG. 5A is a state diagram corresponding to another charging process according to an embodiment of this application, and FIG. 5B is a schematic switching condition diagram that is of phases of a wireless charging process and that corresponds to FIG. 5A.

FIG. 5A shows a process of wirelessly charging the battery of the receive end when the power of the transmit end is greater than the second power threshold of the transmit end. A 5 V state is entered from a start state. After the 5 V state is entered, a constant current step-down phase in which the first charger W1 is responsible for step-down is entered. Then, a 10 V state is entered, step-down of the first charger W1 is switched to step-down of the second charger W2, and this case is still in a constant current step-down phase. Then, the second charger W2 still performs direct current step-down, but a constant voltage step-down phase is entered. Then, step-down of the second charger W2 is switched to step-down of the first charger W1, and constant voltage step-down is kept. Then, the 5 V state is entered from the 10 V state, and the first charger W1 is kept performing step-down working. Finally, an end state is entered from the 5 V state, and the charging ends.

Referring to FIG. 5B, after a start state 502, a charging current limit ($I_{chg\_lim}$) of the battery Bat is set to be equal to a precharging current limit ($I_{lim\_pre}$), and the first charger W1 is enabled.

A state 504 corresponds to a precharging phase. In this phase, the first charger W1 performs precharging, and the charging current limit ($I_{chg\_lim}$) of the battery Bat is set to be equal to a constant current limit ($I_{lim\_cc}$). The first charger W1 is used for precharging until the charging voltage ($V_{bat}$) of the battery Bat exceeds a first voltage threshold ($V_{low}$), and $V_{low}$ may also be referred to as a precharging voltage threshold.

A state 506 corresponds to the constant current step-down phase in which the first charger W1 is responsible for step-down ("buck CC phase," for short). In this phase, the charging current ($I_{chg}$) of the battery Bat remains unchanged, and the charging voltage ($V_{bat}$) of the battery Bat gradually increases. When the charging voltage ($V_{bat}$) of the battery Bat exceeds a second voltage threshold ($V_{sc\_min}$) but is less than a third voltage threshold ($V_{cv\_buck}$), the first charger W1 is disabled, the second charger W2 is controlled to be enabled, and a state 508 occurs.

The state 508 corresponds to the constant current step-down phase in which the second charger W2 is responsible for step-down ("SC CC phase," for short). In this phase, the second charger W2 is used to charge the battery Bat, and simultaneously the charging current ($I_{chg}$) of the battery Bat is kept approximately constant, until the charging voltage ($V_{bat}$) of the battery Bat reaches another voltage threshold, that is, a fourth voltage threshold ($V_{cv\_sc}$). In this case, the state changes to a state 510.

The state 510 corresponds to the constant voltage step-down phase in which the second charger W2 is responsible for step-down ("SC CV phase," for short). In this phase, the second charger W2 is used to charge the battery Bat, and simultaneously the charging voltage ($V_{bat}$) of the battery Bat is kept approximately constant, until the charging current ($I_{chg}$) of the battery Bat falls below a current threshold ($I_{sc\_min}$). In this case, the second charger W2 is disabled, the first charger W1 is enabled, and the state changes to a state 512.

As shown in FIG. 5B, if the charging voltage ($V_{bat}$) of the battery Bat exceeds the third voltage threshold ($V_{cv\_buck}$), it is also possible to directly jump from the state 506 to a state 512. As an example, this case may occur if the battery is approximately fully charged when the battery starts to be charged.

The state 512 corresponds to a constant voltage step-down phase in which the first charger W1 is responsible for step-down ("buck CV phase," for short). In this phase, the first charger W1 charges the battery Bat, and simultaneously the charging voltage ($V_{bat}$) of the battery Bat is kept approximately constant, until the charging current ($I_{chg}$) of the battery Bat falls below an end charging current threshold ($I_{term}$). In this case, the first charger W1 is disabled, and the charging stops in a state 514. In this case, the battery is fully charged.

With reference to the foregoing description and FIG. 5A and FIG. 5B, it can be learned that for the receive end 102 shown in FIG. 3, when the power of the transmit end 101 is greater than the second power threshold of the transmit end (namely, the first preset threshold of the transmit end) and the required charging power of the receive end 102 is greater than the second power threshold of the receive end (namely, the first preset threshold of the receive end), the second charger W2 has an opportunity to be controlled by the controller AP in the constant current step-down phase and the constant voltage step-down phase, to perform direct current step-down working.

In the wireless charging system, the receive end has a plurality of possible implementation structures. For example, a step-down DC-DC circuit may be further included between the wireless electric energy receiver and the charger of the receive end. A receive end to which one stage of step-down DC-DC circuit is added may have a higher and more complex requirement for charging power. This is described below with reference to embodiments and accompanying drawings.

Device Embodiment 3

Figure 6:
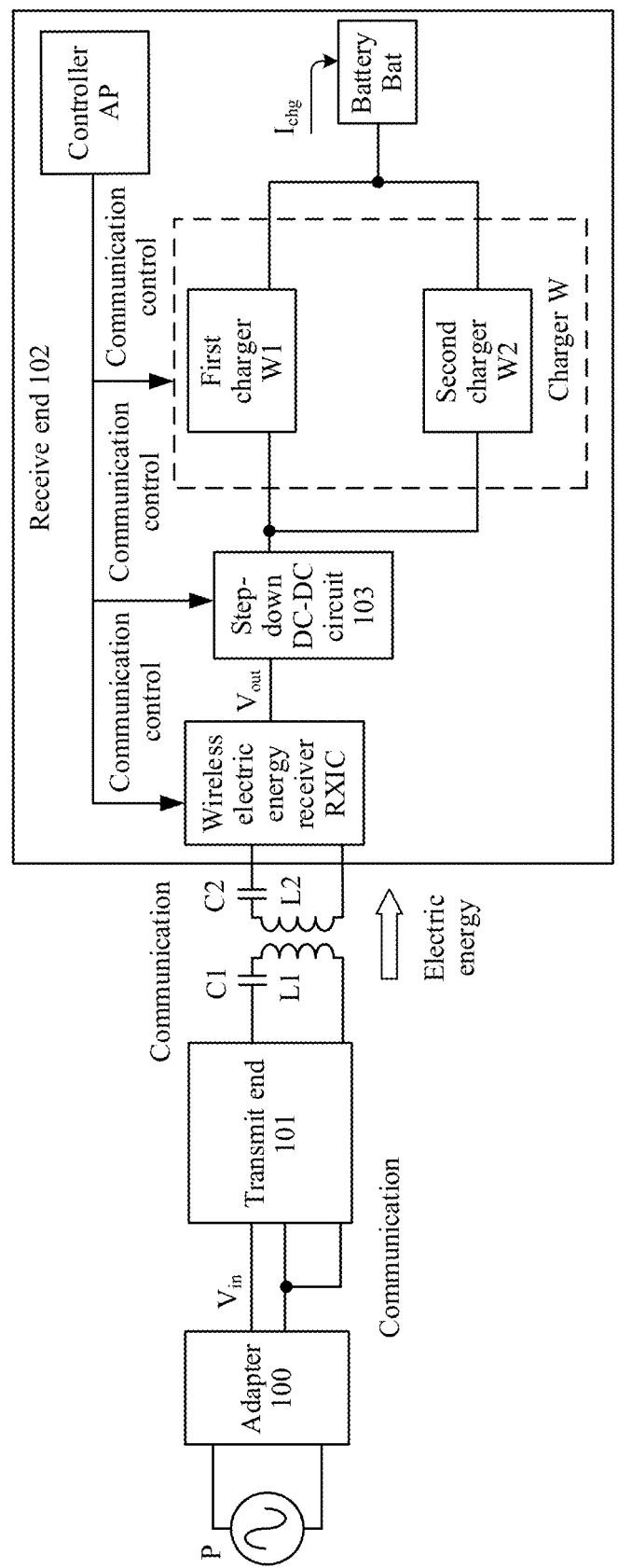
FIG. 6 is a schematic diagram of architecture of a wireless charging system according to Device Embodiment 3 of this application.

FIG. 6 is a schematic diagram of architecture of a wireless charging system according to this embodiment.

As shown in FIG. 6, the wireless charging system includes a power supply P, an adapter 100, a transmit end 101, and a receive end 102. Compared with that shown in FIG. 3, the receive end 102 shown in FIG. 6 further includes a step-down DC-DC circuit 103 between a wireless electric energy receiver RXIC and an input end of a charger W.

The charger W specifically includes a first charger W1 and a second charger W2. The first charger W1 includes at least one closed-loop DC-DC converter, and the second charger W2 includes at least one open-loop DC-DC converter. In the receive end 102, a receive coil L2 is coupled to a transmit coil L1 of the transmit end 101 to receive alternating current electric energy sent by the transmit coil L1 of the transmit end 101, to implement transmission of the energy from the transmit end 101 to the receive end 102. The wireless electric energy receiver RXIC is connected to a second resonant network (including a second resonant capacitor C2 and the receive coil L2) of the receive end 102 and rectifies an alternating current. A direct current obtained after the rectification is converted by the step-down DC-DC circuit 103, and then a direct current obtained after the conversion is input to the charger W.

Under control of a controller AP, only one of the first charger W1 and the second charger W2 that are connected in parallel in the charger W is configured to perform step-down conversion on the direct current provided by the step-down DC-DC circuit 103, and the other charger is prohibited by the controller AP from working. The charger that decreases voltage inputs a stepped-down direct current into a battery Bat, to complete wireless charging of the battery Bat.

For the receive end 102 shown in FIG. 6, the transmit end 101 corresponding to the receive end 102 has a plurality of possible power output capabilities. For example, power of the transmit end is classified based on three grades: a first power threshold of the transmit end, a second power threshold of the transmit end, and a third power threshold of the transmit end. The second power threshold of the transmit end is greater than the first power threshold of the transmit end, and the third power threshold of the transmit end is greater than the second power threshold of the transmit end. In this application, the highest third power threshold of the transmit end is referred to as a second preset threshold of the transmit end, and the second power threshold of the transmit end is referred to as a first preset threshold of the transmit end.

(1) When the power of the transmit end 101 that cooperates with the receive end 102 shown in FIG. 6 is less than the first power threshold of the transmit end, a process of charging the battery Bat sequentially includes two phases, that is, a constant current step-down phase and a constant voltage step-down phase. In each of the two charging phases, the closed-loop DC-DC converter is used to decrease voltage, that is, during charging, the controller AP controls the first charger W1 to work, and prohibits the second charger W2 from working. In addition, the controller AP further controls the step-down DC-DC circuit 103 to work in a shoot through state.

For the charging process, refer to the state diagram shown in FIG. 4A and the schematic switching condition diagram shown in FIG. 4B. The charging states shown in FIG. 4A and the switching conditions shown in FIG. 4B are applicable to device structures (for example, the structures that are of the receive ends 102 and that are shown in FIG. 1, FIG. 2A to FIG. 2C, and FIG. 3) described in Device Embodiment 1 and Device Embodiment 2, and further applicable to a device structure (for example, a structure that is of the receive end 102 and that is shown in FIG. 6) described in Device Embodiment 3.

(2) When the power of the transmit end 101 that cooperates with the receive end 102 shown in FIG. 6 is greater than the second power threshold of the transmit end and is less than the third power threshold of the transmit end, the receive end 102 has a plurality of possible types of required charging power. For example, required charging power of the receive end 102 is classified based on three grades: a first power threshold of the receive end, a second power threshold of the receive end, and a third power threshold of the receive end. The second power threshold of the receive end is greater than the first power threshold of the receive end, and the third power threshold of the receive end is greater than the second power threshold of the receive end. In this application, the highest third power threshold of the receive end is referred to as a second preset threshold of the receive end, and the second power threshold of the receive end is referred to as a first preset threshold of the receive end.

If the required charging power of the receive end 102 is less than the first power threshold of the receive end, the controller AP controls the first charger W1 to decrease voltage, prohibits the second charger W2 from working, and controls the step-down DC-DC circuit 103 to work in a shoot through state. That the required charging power is less than the first power threshold of the receive end may correspond to a start charging phase of the battery Bat or a trickle phase in which the battery Bat is to be fully charged.

If the required charging power of the receive end 102 is greater than the second power threshold of the receive end and is less than the third power threshold of the receive end, the controller AP switches to the second charger W2 to decrease voltage, prohibits the first charger W1 from working, and controls the step-down DC-DC circuit 103 to work in a shoot through state. That the required charging power is greater than the second power threshold of the receive end and is less than the third power threshold of the receive end may correspond to a first fast charging phase of the battery Bat. In this case, the battery Bat needs to be fast charged at high power.

For the charging process, refer to the state diagram shown in FIG. 5A and the schematic switching condition diagram shown in FIG. 5B. The charging states shown in FIG. 5A and the switching conditions shown in FIG. 5B are applicable to device structures (for example, the structures that are of the receive ends 102 and that are shown in FIG. 1, FIG. 2A to FIG. 2C, and FIG. 3) described in Device Embodiment 1 and Device Embodiment 2, and further applicable to a device structure (for example, a structure that is of the receive end 102 and that is shown in FIG. 6) described in Device Embodiment 3.

(3) When the power of the transmit end 101 that cooperates with the receive end 102 shown in FIG. 6 is greater than the third power threshold of the transmit end, the receive end 102 has a plurality of possible types of required charging power. For example, required charging power of the receive end 102 is classified based on three grades: a first power threshold of the receive end, a second power threshold of the receive end, and a third power threshold of the receive end.

If the required charging power of the receive end 102 is less than the first power threshold of the receive end, the controller AP controls the first charger W1 to decrease voltage, prohibits the second charger W2 from working, and controls the step-down DC-DC circuit 103 to work in a shoot through state. That the required charging power is less than the first power threshold of the receive end may correspond to a start charging phase of the battery Bat or a trickle phase in which the battery Bat is to be fully charged.

If the required charging power of the receive end 102 is greater than the second power threshold of the receive end and is less than the third power threshold of the receive end, the controller AP switches to the second charger W2 to decrease voltage, prohibits the first charger W1 from working, and controls the step-down DC-DC circuit 103 to work in the shoot through state. That the required charging power is greater than the second power threshold of the receive end and is less than the third power threshold of the receive end may correspond to a first fast charging phase of the battery Bat. In this case, the battery Bat needs to be fast charged at high power.

If the required charging power of the receive end 102 is greater than the third power threshold of the receive end, the controller AP controls the second charger W2 to decrease voltage, prohibits the first charger W1 from working, and controls the step-down DC-DC circuit 103 to decrease voltage. That the required charging power is greater than the third power threshold of the receive end may correspond to a second fast charging phase of the battery Bat. In this case, the battery Bat needs to be fast charged at higher power than the first fast charging phase.

Figure 7:
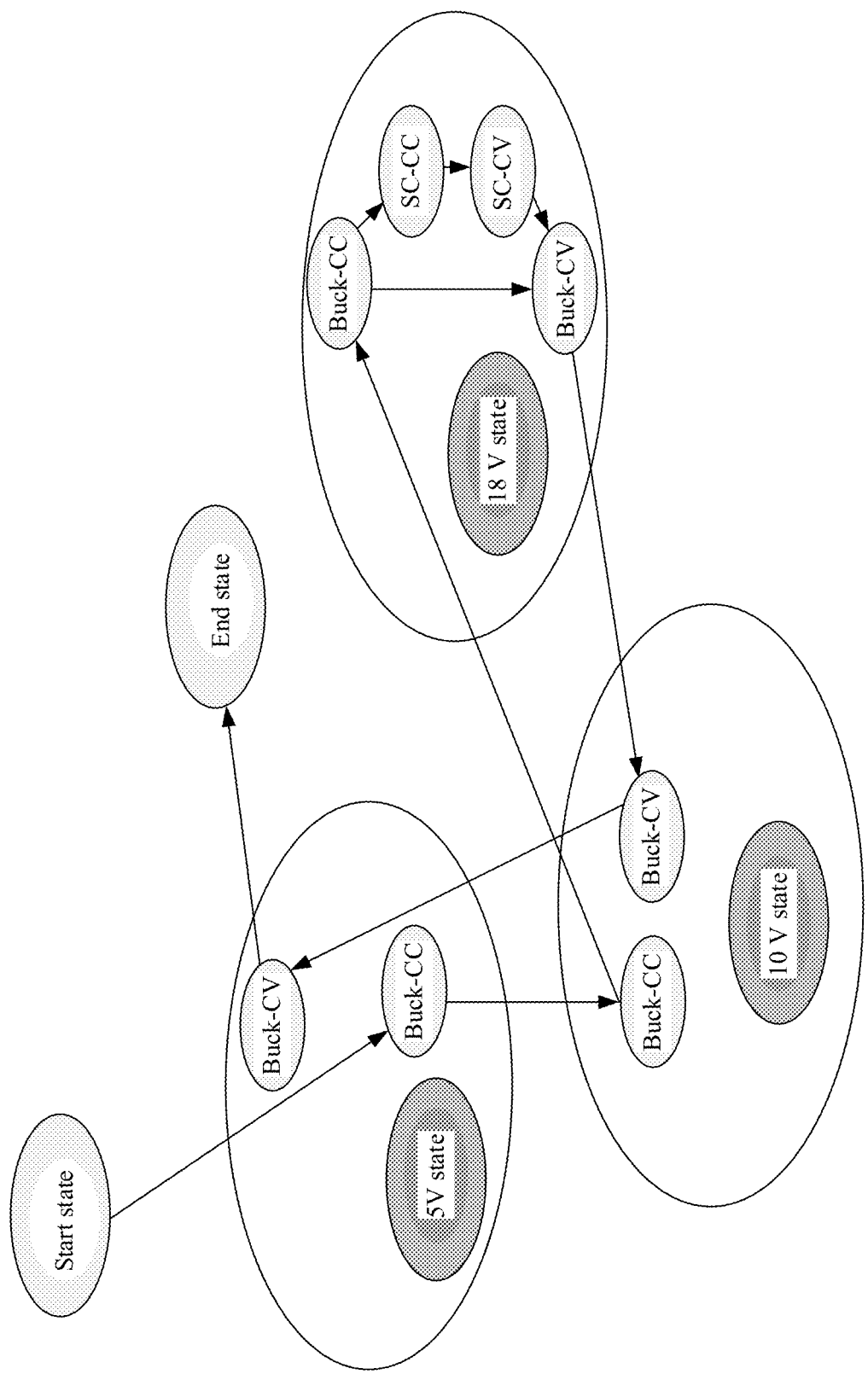
FIG. 7 is a state diagram corresponding to still another charging process according to an embodiment of this application.

FIG. 7 is a state diagram corresponding to still another charging process according to an embodiment of this application.

FIG. 7 shows a process of wirelessly charging the battery of the receive end when the power of the transmit end is greater than the third power threshold of the transmit end. A 5 V state is entered from a start state. After the 5 V state is entered, a constant current step-down phase in which the first charger W1 is responsible for step-down is entered. Then, a 10 V state is entered, and the first charger is still responsible for constant current step-down. Then, an 18 V state is entered, step-down of the first charger W1 is gradually switched to step-down of the second charger W2, and this case is still in a constant current step-down phase. Then, in the 18 V state, the second charger W2 still performs direct current step-down, but a constant voltage step-down phase is entered. Then, step-down of the second charger W2 is switched to step-down of the first charger W1, and constant voltage step-down is kept. Then, the 10 V state is entered from the 18 V state, and the first charger W1 is kept performing constant voltage step-down working. Then, the 5 V state is entered, and the first charger W1 is kept performing constant voltage step-down working. Finally, an end state is entered from the 5 V state, and the charging ends.

With reference to the foregoing description and FIG. 5A, it can be learned that for the receive end 102 shown in FIG. 6, when the power of the transmit end 101 is greater than the second power threshold of the transmit end (namely, the first preset threshold of the transmit end) and the required charging power of the receive end 102 is greater than the second power threshold of the receive end (namely, the first preset threshold of the receive end) and is less than the third power threshold of the receive end (namely, the second preset threshold of the receive end), the second charger W2 has an opportunity to be controlled by the controller AP in the constant current step-down phase and the constant voltage step-down phase, to perform direct current step-down working.

With reference to the foregoing description and FIG. 7, it can be learned that for the receive end 102 shown in FIG. 6, when the power of the transmit end 101 is greater than the third power threshold of the transmit end (namely, the second preset threshold of the transmit end) and the required charging power of the receive end 102 is greater than the second power threshold of the receive end (including two cases: the required charging power of the receive end 102 is greater than the second power threshold of the receive end and is less than the third power threshold of the receive end; and the required charging power of the receive end 102 is greater than the third power threshold of the receive end), the second charger W2 has an opportunity to be controlled by the controller AP in the constant current step-down phase and the constant voltage step-down phase, to perform direct current step-down working.

In the receive end 102 provided in this embodiment, the controller AP is further configured to: when the power of the transmit end is greater than the first preset threshold of the transmit end (namely, the second power threshold of the transmit end) and the required charging power is greater than the first preset threshold of the receive end (namely, the second power threshold of the receive end), that is, when the controller AP controls the second charger W2 to decrease voltage, compare a charging parameter of the open-loop DC-DC converter in the second charger W2 with a target parameter to obtain a control parameter, and control, based on the control parameter, the open-loop DC-DC converter to work in the constant current step-down phase or the constant voltage step-down phase; and prohibit the closed-loop DC-DC converter in the first charger W1 from working.

In this embodiment of this application, as a possible implementation, the first power threshold of the transmit end is equal to the first power threshold of the receive end, the second power threshold of the transmit end is equal to the second power threshold of the receive end, and the third power threshold of the transmit end is equal to the third power threshold of the receive end. In addition, the power of the transmit end is greater than or equal to the required charging power of the receive end.

In a process of wirelessly charging each of the receive ends shown in the foregoing Device Embodiment 1, Device Embodiment 2, and Device Embodiment 3, a controller of the receive end may use a plurality of control policies to actually control an open-loop DC-DC converter that works in a constant current step-down phase. In addition, the controller of the receive end may also use a plurality of control policies to actually control the open-loop DC-DC converter that works in a constant voltage step-down phase. The following first briefly describes a plurality of control policies.

In the following description, $V_{in}$ represents an input voltage of a wireless electric energy transmitter of a transmit end 101 in a wireless charging system, $V_{in\_set}$ represents a configured input voltage value of the wireless electric energy transmitter, $V_{out}$ represents an input voltage of a charger W of a receive end 102 in the wireless charging system, $V_{out\_set}$ represents a configured input voltage value of the charger W, $V_{bat}$ represents a charging voltage of a battery Bat of the receive end 102, $f_s$ represents a working frequency of the wireless charging system, and $f_{s\_set}$ represents a working frequency setting value of the wireless charging system.

If an adapter 100 is directly connected to the wireless electric energy transmitter of the transmit end 101, $V_{in}$ is also a voltage directly output by the adapter to the wireless electric energy transmitter; or if a DC-DC circuit is further connected between the adapter 100 and the wireless electric energy transmitter for direct current conversion, $V_{in}$ is also a voltage output by the DC-DC circuit to the wireless electric energy transmitter.

First control policy: $V_{in}$ grading+frequency modulation.

Specifically, requirements of a spatial position, a battery voltage change, and a load change are met through frequency modulation and phase shift, to implement output of a system in a constant current step-down phase or a constant voltage step-down phase in which an open-loop DC-DC converter decreases voltage. Required charging power of a receive end 102 is implemented through $V_{in}$ grading.

Second control policy: $V_{in}$ stepwise regulation+frequency modulation.

Specifically, an input voltage $V_{in}$ of a wireless electric energy transmitter is regulated based on a charging voltage $V_{bat}$ of a battery Bat. Simultaneously, a wireless charging system works in a frequency modulation mode, and requirements of a spatial position and a load change are met through frequency modulation and phase shift, to implement output of the system in a constant current step-down phase or a constant voltage step-down phase in which an open-loop DC-DC converter decreases voltage.

Third control policy: $V_{in}$ regulation+constant frequency

Specifically, a wireless charging system works in a constant frequency mode, and requirements of a battery voltage, a spatial position, and a load change are met through yin regulation, to implement output of the system in a constant current step-down phase or a constant voltage step-down phase in which the open-loop DC-DC converter decreases voltage.

As described above, the controller AP can be configured to: compare the charging parameter of the open-loop DC-DC converter with the target parameter to obtain the control parameter, and control, based on the control parameter, the open-loop DC-DC converter to work in the constant current step-down phase or the constant voltage step-down phase. For ease of understanding, the following separately describes, with reference to embodiments and accompanying drawings from different charging phases, namely, the constant current step-down phase and the constant voltage step-down phase, a plurality of different implementations in which the controller AP in the wirelessly charged electronic device (the receive end 102) provided in the embodiments of this application controls the open-loop DC-DC converter that decreases voltage.

First part: Control of a constant current step-down phase ("control of an SC CC phase," for short).

Content used by a controller AP for comparison includes a charging parameter and a target parameter. In the constant current step-down phase, the charging parameter includes a charging current of a battery Bat, and the target parameter includes a target current. The charging current is represented by $I_{chg}$, and the target current is represented by $I_{target}$.

As a possible implementation, the target current may be a middle value of an interval corresponding to the target current. For example, a maximum value of the interval corresponding to the target current is $I_{thr\_high}$, a minimum value of the interval corresponding to the target current is $I_{thr\_low}$, and the target current is $I_{target}=(I_{thr\_high}+I_{thr\_low})/2$.

The controller AP is specifically configured to: compare the charging current $I_{chg}$ with the target current $I_{target}$, and adjust a control parameter based on a comparison result. During control in the constant current step-down phase, the control parameter may be an input voltage $V_{out}$ of a charger W, a working frequency $f_s$ of a wireless charging system, or an input voltage $V_{in}$ of a wireless electric energy transmitter.

In an actual application, when the control parameter is the working frequency $f_s$ of the wireless charging system or the input voltage $V_{in}$ of the wireless electric energy transmitter, the controller AP is further configured to send the control parameter to a transmit end 101. The wireless electric energy transmitter may send the control parameters to an adapter 100 or a DC-DC circuit (referred to as a previous-stage DC-DC circuit of the wireless electric energy transmitter in the following) between the adapter 100 and the wireless electric energy transmitter, thereby facilitating regulation of $V_{in}$ to regulate $V_{out}$.

Device Embodiment 4

This embodiment mainly describes a first specific implementation in which a controller of a receive end uses a first control policy (Vin grading+frequency modulation) when an open-loop DC-DC converter decreases voltage in a constant current step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a graded type. That is, $V_{in}$ can work in one of a limited quantity of grades, and $V_{in}$ cannot be regulated when working in a fixed grade. The controller AP is specifically configured to: determine a grade of the input voltage of the wireless electric energy transmitter based on the required charging power, and use a voltage value at the grade as the configured input voltage value of the wireless electric energy transmitter.

Figure 8:
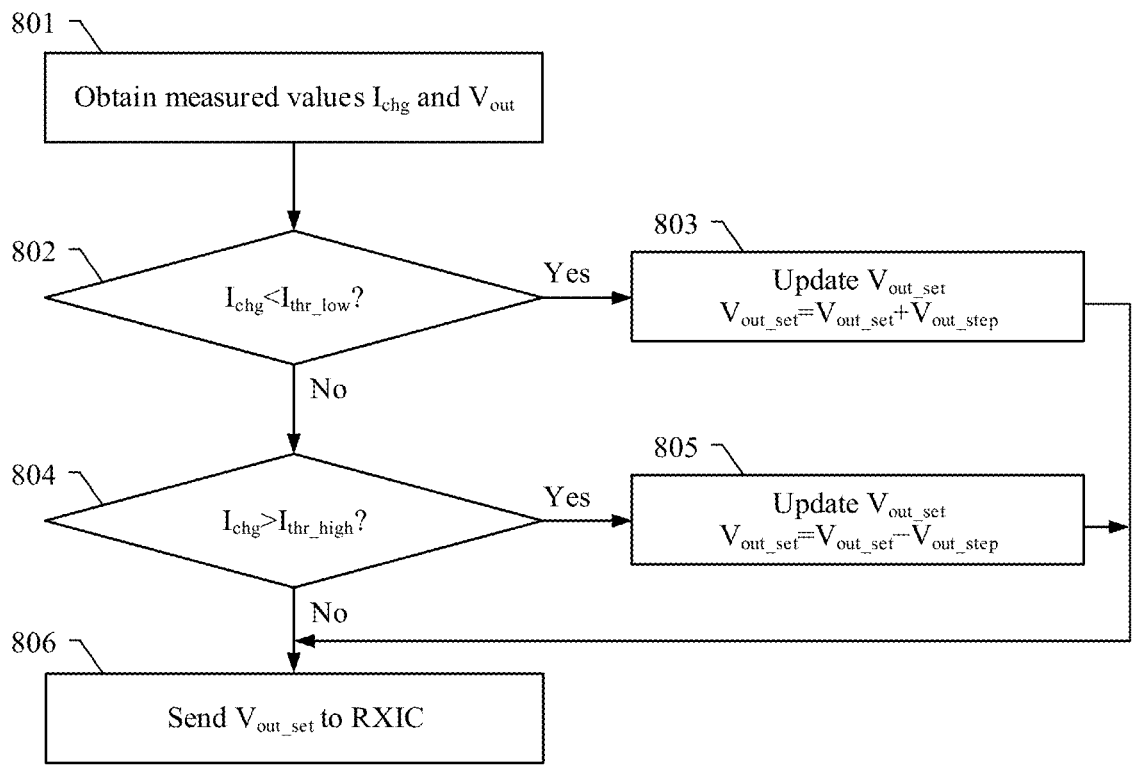
FIG. 8 is a diagram of a $V_{in}$ grading+frequency modulation or $V_{in}$ regulation+constant frequency control policy that is of an SC CC phase and that corresponds to a device architecture according to Device Embodiments 1 to 3 of this application.

FIG. 8 is a diagram of a $V_{in}$ grading+frequency modulation control policy that is of an SC CC phase and that corresponds to a device architecture according to Device Embodiments 1 to 3 of this application.

The control implementation block diagram shown in FIG. 8 mainly includes the following steps:

Step 801: A controller AP obtains a charging current $I_{chg}$ of a battery Bat and an input voltage $V_{out}$ of a charger W that are obtained through measurement.

Step 802: The controller AP compares the charging current $I_{chg}$ with a minimum value $I_{thr\_low}$ of an interval corresponding to a target current, to determine whether $I_{chg}$ is less than $I_{thr\_low}$; and if yes, enters step 803; or if $I_{chg}$ is greater than or equal to $I_{thr\_low}$, enters step 804.

Step 803: Increase the input voltage $V_{out}$ of the charger W by a first preset voltage step $V_{out\_step}$, that is, update $V_{out\_set}$. Before the updating, the input voltage $V_{out}$ is a measured value, and after the updating, the input voltage $V_{out}$ is a value obtained by adding $V_{out\_step}$ to measured $V_{out}$. $V_{out\_set}$ is obtained through updating. After the updating, step 806 is entered.

Step 804: The controller AP compares the charging current $I_{chg}$ with a maximum value $I_{thr\_high}$ of the interval corresponding to the target current, to determine whether $I_{chg}$ is greater than $I_{thr\_high}$; and if yes, enters step 805; or if $I_{chg}$ is less than or equal to $I_{thr\_high}$, enters step 806.

Step 805: Decrease the input voltage $V_{out}$ of the charger W by the first preset voltage step $V_{out\_step}$, that is, update $V_{out\_set}$. Before the updating, the input voltage $V_{out}$ is a measured value, and after the updating, the input voltage $V_{out}$ is a value obtained by subtracting $V_{out\_step}$ from measured $V_{out}$. $V_{out\_set}$ is obtained through updating. After the updating, step 806 is entered.

In an actual application, the charging current $I_{chg}$ can be controlled by updating $V_{out\_set}$. After step 806 is entered after the foregoing steps, it indicates that the charging current $I_{chg}$ falls within the interval corresponding to the target current, in other words, falls between the minimum value $I_{thr\_low}$ of the interval corresponding to the target current and the maximum value $I_{thr\_high}$ of the interval corresponding to the target current. In this case, a requirement of the charging current $I_{chg}$ is met, and the controller AP may send $V_{out\_set}$ to a wireless electric energy receiver RXIC. If $V_{out\_set}$ is updated in step 803 or step 805, the controller AP specifically sends updated $V_{out\_set}$ to RXIC in step 806.

A control parameter in this embodiment includes the input voltage $V_{out}$ of the charger W. After the controller AP sends $V_{out\_set}$ to RXIC, a transmit end 101 can provide, with reference to graded $V_{in\_set}$ by modulating a working frequency of a system, power that matches power required by a receive end 102, to implement adaption and matching between the transmit end 101 and the receive end 102.

Device Embodiment 5

This embodiment mainly describes a second specific implementation in which a controller of a receive end uses a first control policy (Vin grading+frequency modulation) when an open-loop DC-DC converter decreases voltage in a constant current step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a graded type. The controller AP is specifically configured to: determine a grade of the input voltage of the wireless electric energy transmitter based on the required charging power, and use a voltage value at the grade as the configured input voltage value of the wireless electric energy transmitter.

Figure 9:
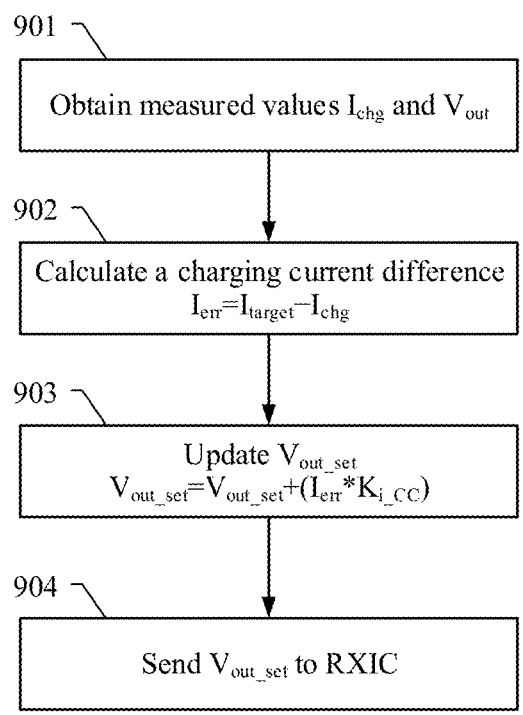
FIG. 9 is a diagram of a $V_{in}$ grading+frequency modulation or $V_{in}$ regulation+constant frequency control policy that is of an SC CC phase and that corresponds to a device architecture according to Device Embodiments 1 to 3 of this application.

FIG. 9 is a diagram of a $V_{in}$ grading+frequency modulation control policy that is of an SC CC phase and that corresponds to a device architecture according to Device Embodiments 1 to 3 of this application.

The control implementation block diagram shown in FIG. 9 mainly includes the following steps:

Step 901: A controller AP obtains a charging current $I_{chg}$ of a battery Bat and an input voltage $V_{out}$ of a charger W that are obtained through measurement.

Step 902: The controller AP obtains a current difference $I_{err}$ between a target current $I_{target}$ and the charging current $I_{chg}$.

Step 903: The controller AP regulates a configured input voltage value $V_{out\_set}$ of the charger by multiplying the current difference $I_{err}$ by a preset current adjustment ratio $K_{i\_cc}$ and using a product ($I_{err}*K_{i\_cc}$) as an input voltage regulation amount of the charger. Specifically, $V_{out\_set}$ is added to the input voltage regulation amount ($I_{err}*K_{i\_cc}$), to update $V_{out\_set}$ to obtain regulated (namely, updated) $V_{out\_set}$.

Step 904: Send the regulated configured input voltage value $V_{out\_set}$ of the charger to a wireless electric energy receiver.

A control parameter in this embodiment includes the input voltage $V_{out}$ of the charger W. After the controller AP sends $V_{out\_set}$ to RXIC, a transmit end 101 can provide, with reference to graded $V_{in\_set}$ by modulating a working frequency of a system, power that matches power required by a receive end 102, to implement adaption and matching between the transmit end 101 and the receive end 102.

It should be noted that, when $V_{out\_set}$ is regulated in step 903, the preset current adjustment ratio $K_{i\_cc}$ in the input voltage regulation amount of the charger is related to a wireless charging system architecture, power of the transmit end 101, and required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cc}$ is a preset current adjustment ratio used in step 903 when power of a transmit end 101 is greater than a second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end; and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset current adjustment ratio used in step 903 when the required charging power of the receive end 102 is greater than the second power threshold of the receive end and is less than the third power threshold of the receive end is $K_{i\_cc}=K_{i\_cc}1$; and a preset current adjustment ratio used in step 903 when the required charging power of the receive end 102 is greater than the third power threshold of the receive end is $K_{i\_cc}=K_{i\_cc}2$. $K_{i\_cc}1$ is not equal to $K_{i\_cc}2$.

Device Embodiment 6

This embodiment mainly describes a third specific implementation in which a controller of a receive end uses a first control policy (Vin grading+frequency modulation) when an open-loop DC-DC converter decreases voltage in a constant current step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a graded type. The controller AP is specifically configured to: determine a grade of the input voltage of the wireless electric energy transmitter based on the required charging power, and use a voltage value at the grade as the configured input voltage value.

Figure 10:
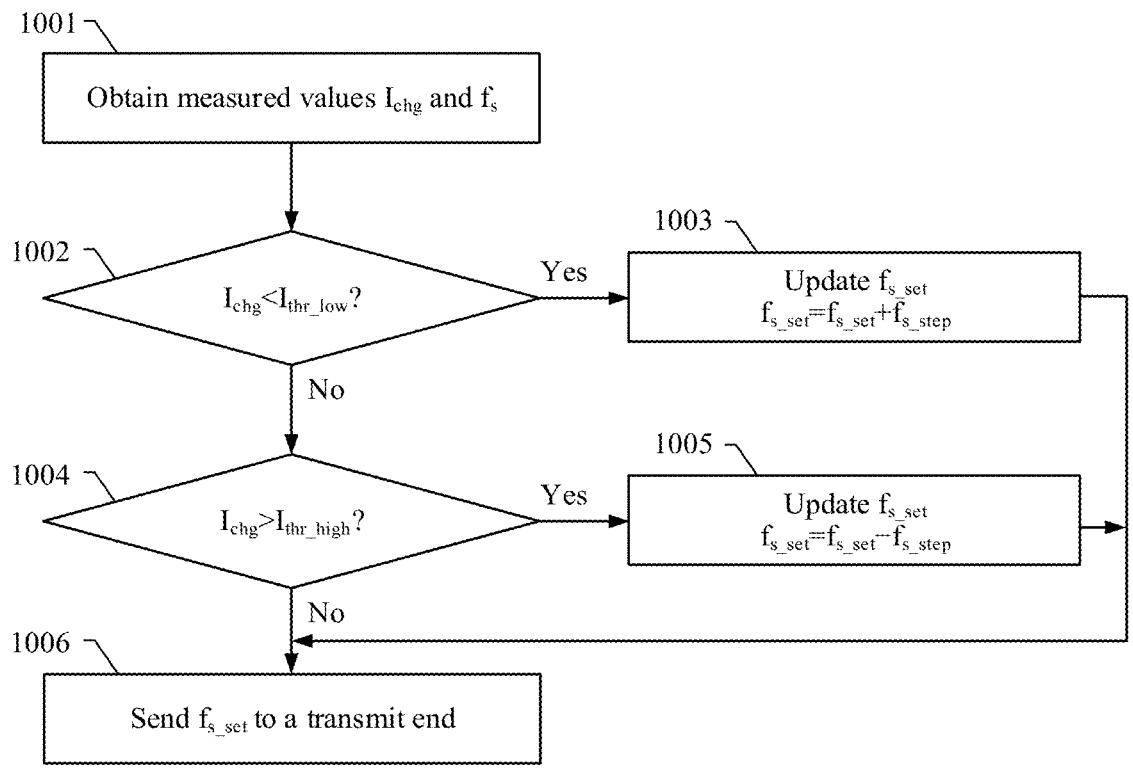
FIG. 10 is a diagram of a $V_{in}$ grading+frequency modulation control policy that is of an SC CC phase and that corresponds to a device architecture according to Device Embodiments 1 to 3 of this application.

FIG. 10 is a diagram of a $V_{in}$ grading+frequency modulation control policy that is of an SC CC phase and that corresponds to a device architecture according to Device Embodiments 1 to 3 of this application.

The control implementation block diagram shown in FIG. 10 mainly includes the following steps:

Step 1001: A controller AP obtains a charging current $I_{chg}$ of a battery Bat and a working frequency $f_s$ of a wireless charging system that are obtained through measurement.

Step 1002: The controller AP compares the charging current $I_{chg}$ with a minimum value $I_{thr\_low}$ of an interval corresponding to a target current, to determine whether $I_{chg}$ is less than $I_{thr\_low}$; and if yes, enters step 1003; or if $I_{chg}$ is greater than or equal to $I_{thr\_low}$, enters step 1004.

Step 1003: Increase the working frequency $f_s$ of the wireless charging system by a preset frequency step $f_{s\_step}$, that is, update $f_{s\_set}$. Before the updating, $f_s$ is a measured value, and after the updating, $f_s$ is a value obtained by adding $f_{s\_step}$ to measured $f_s$. $f_{s\_set}$ is obtained through updating. After the updating, step 1006 is entered.

Step 1004: The controller AP compares the charging current $I_{chg}$ with a maximum value $I_{thr\_high}$ of the interval corresponding to the target current, to determine whether $I_{chg}$ is greater than $I_{thr\_high}$; and if yes, enters step 1005; or if $I_{chg}$ is less than or equal to $I_{thr\_high}$, enters step 1006.

Step 1005: Decrease the working frequency $f_s$ of the wireless charging system by step, the preset frequency step $f_{s\_that}$ is, update $f_{s\_set}$. Before the updating, $f_s$ is a measured value, and after the updating, $f_s$ is a value obtained by subtracting $f_{s\_step}$ from measured $f_s$. $f_{s\_set}$ is obtained through updating. After the updating, step 1006 is entered.

In an actual application, the working frequency of the wireless charging system can be modulated by updating $f_{s\_set}$ to regulate $V_{out}$ to control the charging current $I_{chg}$. After step 1006 is entered after the foregoing steps, it indicates that the charging current $I_{chg}$ falls within the interval corresponding to the target current, in other words, falls between the minimum value $I_{thr\_low}$ of the interval corresponding to the target current and the maximum value $I_{thr\_high}$ of the interval corresponding to the target current. In this case, a requirement of the charging current $I_{chg}$ is met.

Step 1006: The controller AP sends $f_{s\_set}$ to a wireless electric energy transmitter of a transmit end 101. This step may be specifically implemented through in-band communication, or may be implemented through out-of-band communication.

A control parameter in this embodiment includes the working frequency $f_s$ of the wireless charging system. For the transmit end 101, the transmit end 101 may modulate the working frequency of the system to $f_{s\_set}$ with reference to graded $V_{in\_set}$ and based on $f_{s\_set}$ to regulate $V_{out}$. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

Device Embodiment 7

This embodiment mainly describes a fourth specific implementation in which a controller of a receive end uses a first control policy (Vin grading+frequency modulation) when an open-loop DC-DC converter decreases voltage in a constant current step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a graded type. The controller AP is specifically configured to: determine a grade of the input voltage of the wireless electric energy transmitter based on the required charging power, and use a voltage value at the grade as the configured input voltage value of the wireless electric energy transmitter.

Figure 11:
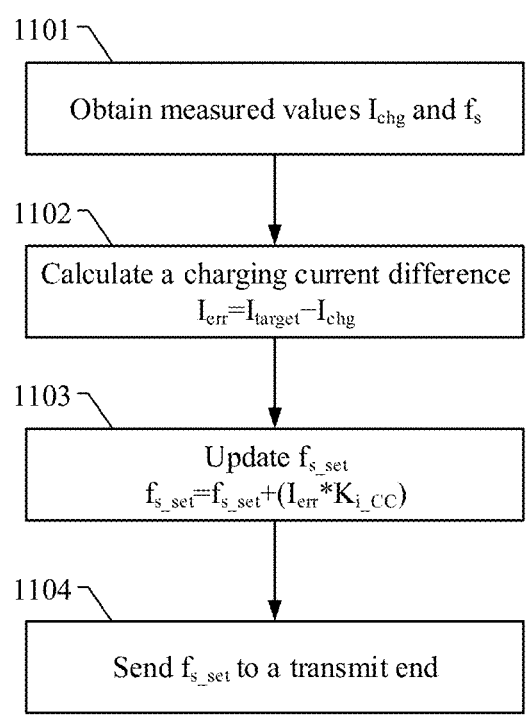
FIG. 11 is a diagram of a $V_{in}$ grading+frequency modulation control policy that is of an SC CC phase and that corresponds to a device architecture according to Device Embodiments 1 to 3 of this application.

FIG. 11 is a diagram of a $V_{in}$ grading+frequency modulation control policy that is of an SC CC phase and that corresponds to a device architecture according to Device Embodiments 1 to 3 of this application.

The control implementation block diagram shown in FIG. 11 mainly includes the following steps:

Step 1101: A controller AP obtains a charging current $I_{chg}$ of a battery Bat and a working frequency $f_s$ of a wireless charging system that are obtained through measurement.

Step 1102: The controller AP obtains a current difference $I_{err}$ between a target current $I_{target}$ and the charging current $I_{chg}$.

Step 1103: The controller AP modulates a working frequency setting value of the wireless charging system by multiplying the current difference $I_{err}$ by a preset current adjustment ratio $K_{i\_cc}$ and using a product ($I_{err}*K_{i\_cc}$) as a working frequency modulation amount of the wireless charging system.

Specifically, the frequency value obtained in step 1101 is added to the working frequency modulation amount ($I_{err}*K_{i\_cc}$), to update $f_{s\_set}$ to obtain modulated (namely, updated) $f_{s\_set}$.

Step 1104: Send the modulated working frequency setting value $f_{s\_set}$ to a wireless electric energy transmitter.

This step may be specifically implemented through in-band communication, or may be implemented through out-of-band communication.

A control parameter in this embodiment includes the working frequency $f_s$ of the wireless charging system. For a transmit end 101, the transmit end 101 may modulate the working frequency of the system to $f_{s\_set}$ with reference to graded $V_{in\_set}$ and based on $f_{s\_set}$, to regulate $V_{out}$. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that, when $f_{s\_set}$ is regulated in step 1103, the preset current adjustment ratio $K_{i\_cc}$ in the working frequency modulation amount of the wireless charging system is related to a wireless charging system architecture, power of the transmit end 101, and required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cc}$ is a preset current adjustment ratio used in step 1103 when power of a transmit end 101 is greater than a second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end; and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset current adjustment ratio used in step 1103 when the required charging power of the receive end 102 is greater than the second power threshold of the receive end and is less than the third power threshold of the receive end is $K_{i\_cc}=K_{i\_cc}1$; and a preset current adjustment ratio used in step 1103 when the required charging power of the receive end 102 is greater than the third power threshold of the receive end is $K_{i\_cc}=K_{i\_cc}2$. $K_{i\_cc}1$ is not equal to $K_{i\_cc}2$.

Device Embodiment 8

This embodiment mainly describes a first specific implementation in which a controller of a receive end uses a second control policy (Vin stepwise regulation+frequency modulation) when an open-loop DC-DC converter decreases voltage in a constant current step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a stepwise regulatable type. The controller AP is configured to obtain a voltage coefficient K corresponding to the required charging power, and obtain the configured input voltage value $V_{in\_set}$ of the wireless electric energy transmitter based on the voltage coefficient K and a charging voltage $V_{bat}$ of a battery.

Figure 12:
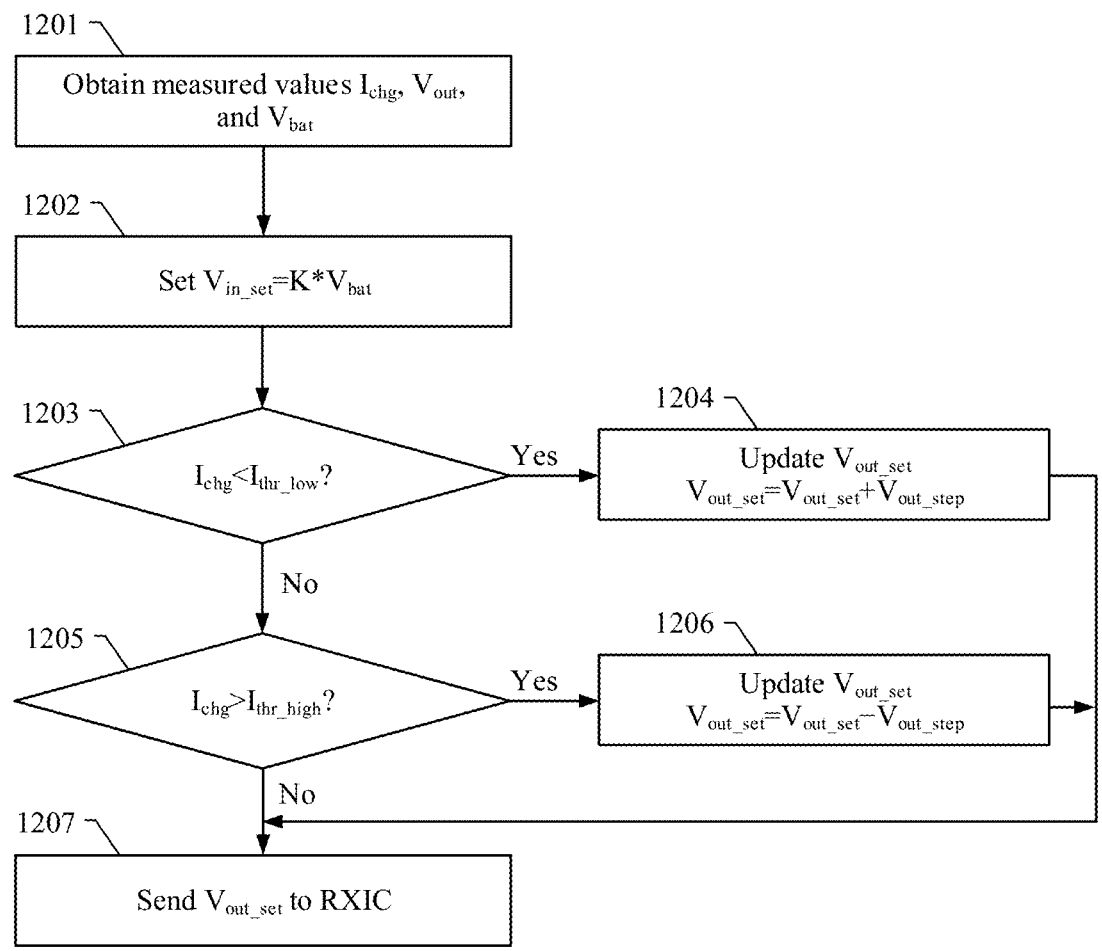
FIG. 12 is a diagram of a $V_{in}$ stepwise regulation+frequency modulation control policy that is of an SC CC phase and that corresponds to a device architecture according to Device Embodiments 1 to 3 of this application.

FIG. 12 is a diagram of a $V_{in}$ stepwise regulation+ frequency modulation control policy that is of an SC CC phase and that corresponds to a device architecture according to Device Embodiments 1 to 3 of this application.

The control implementation block diagram shown in FIG. 12 mainly includes the following steps:

Step 1201: A controller AP obtains a charging current $I_{chg}$ of a battery Bat, an input voltage $V_{out}$ of a charger W, and a charging voltage $V_{bat}$ of the battery that are obtained through measurement.

Step 1202: Set a configured input voltage value $V_{in\_set}$ of a wireless electric energy transmitter by using a voltage coefficient K corresponding to required charging power of a receive end 102 and the charging voltage $V_{bat}$ of the battery.

Specifically, $V_{in\_set}=K*V_{bat}$.

Step 1203: The controller AP compares the charging current $I_{chg}$ with a minimum value $I_{thr\_low}$ of an interval corresponding to a target current, to determine whether $I_{chg}$ is less than $I_{thr\_low}$; and if yes, enters step 1204; or if $I_{chg}$ is greater than or equal to $I_{thr\_low}$, enters step 1205.

Step 1204: Increase the input voltage $V_{out}$ of the charger W by a first preset voltage step $V_{out\_step}$, that is, update $V_{out\_set}$. Before the updating, the input voltage $V_{out}$ is a measured value, and after the updating, the input voltage $V_{out}$ is a value obtained by adding $V_{out\_step}$ to measured $V_{out}$. $V_{out\_set}$ is obtained through updating. After the updating, step 1207 is entered.

Step 1205: The controller AP compares the charging current $I_{chg}$ with a maximum value $I_{thr\_high}$ of the interval corresponding to the target current, to determine whether $I_{chg}$ is greater than $I_{thr\_high}$; and if yes, enters step 1206; or if $I_{chg}$ is less than or equal to $I_{thr\_high}$, enters step 1207.

Step 1206: Decrease the input voltage $V_{out}$ of the charger W by the first preset voltage step $V_{out\_step}$, that is, update $V_{out\_set}$. Before the updating, the input voltage $V_{out}$ is a measured value, and after the updating, the input voltage $V_{out}$ is a value obtained by subtracting $V_{out\_step}$ from measured $V_{out}$. $V_{out\_set}$ is obtained through updating. After the updating, step 1207 is entered.

In an actual application, the charging current $I_{chg}$ can be controlled by updating $V_{out\_set}$. After step 1207 is entered after the foregoing steps, it indicates that the charging current $I_{chg}$ falls within the interval corresponding to the target current, in other words, falls between the minimum value $I_{thr\_low}$ of the interval corresponding to the target current and the maximum value $I_{thr\_high}$ of the interval corresponding to the target current. In this case, a requirement of the charging current $I_{chg}$ is met, and the controller AP may send $V_{out\_set}$ to a wireless electric energy receiver RXIC. If $V_{out\_set}$ is updated in step 1204 or step 1206, the controller AP specifically sends updated $V_{out\_set}$ to RXIC in step 1207.

A control parameter in this embodiment includes the input voltage $V_{out}$ of the charger W. After the controller AP sends $V_{out\_set}$ to RXIC, with reference to $V_{in\_set}$ stepwise regulated based on the voltage coefficient K, a transmit end 101 can provide, by modulating a working frequency of a system, power that matches the power required by the receive end 102, to implement adaption and matching between the transmit end 101 and the receive end 102.

Device Embodiment 9

This embodiment mainly describes a second specific implementation in which a controller of a receive end uses a second control policy (Vin stepwise regulation+frequency modulation) when an open-loop DC-DC converter decreases voltage in a constant current step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a stepwise regulatable type. The controller AP is configured to obtain a voltage coefficient K corresponding to the required charging power, and obtain the configured input voltage value $V_{in\_set}$ of the wireless electric energy transmitter based on the voltage coefficient K and a charging voltage $V_{bat}$ of a battery.

Figure 13:
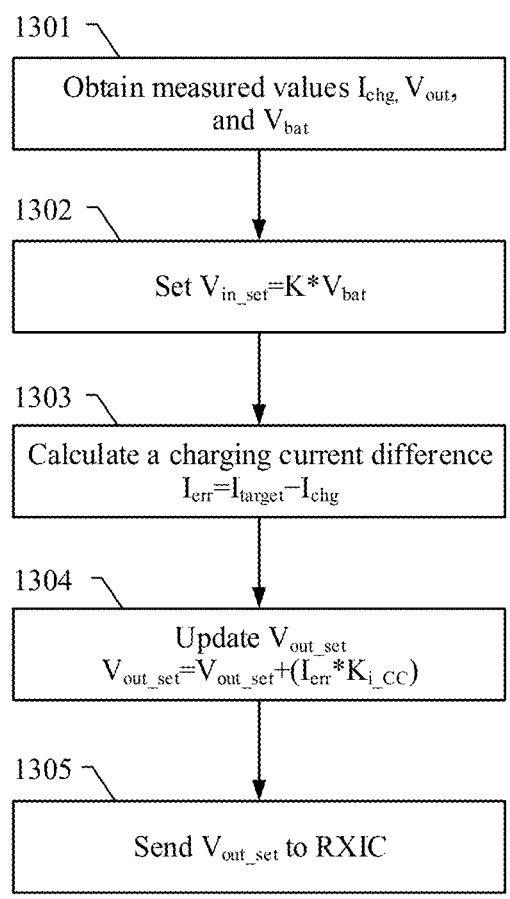
FIG. 13 is a diagram of a $V_{in}$ stepwise regulation+frequency modulation control policy that is of an SC CC phase and that corresponds to a device architecture according to Device Embodiments 1 to 3 of this application.

FIG. 13 is a diagram of a $V_{in}$ stepwise regulation+ frequency modulation control policy that is of an SC CC phase and that corresponds to a device architecture according to Device Embodiments 1 to 3 of this application.

The control implementation block diagram shown in FIG. 13 mainly includes the following steps:

Step 1301: A controller AP obtains a charging current $I_{chg}$ of a battery Bat, an input voltage $V_{out}$ of a charger W, and a charging voltage $V_{bat}$ of the battery that are obtained through measurement.

Step 1302: Set a configured input voltage value $V_{in\_set}$ of a wireless electric energy transmitter by using a voltage coefficient K corresponding to required charging power of a receive end 102 and the charging voltage $V_{bat}$ of the battery. Specifically, $V_{in\_set} = K * V_{bat}$.

Step 1303: The controller AP obtains a current difference $I_{err}$ between a target current $I_{target}$ and the charging current $I_{chg}$.

Step 1304: The controller AP regulates a configured input voltage value $V_{out\_set}$ of the charger by multiplying the current difference $I_{err}$ by a preset current adjustment ratio $K_{i\_cc}$ and using a product $(I_{err} * K_{i\_cc})$ as an input voltage regulation amount of the charger. Specifically, $V_{out\_set}$ is added to the input voltage regulation amount $(I_{err} * K_{i\_cc})$, to update $V_{out\_set}$ to obtain regulated (namely, updated) $V_{out\_set}$.

Step 1305: Send the regulated configured input voltage value $V_{out\_set}$ of the charger to a wireless electric energy receiver RXIC.

A control parameter in this embodiment includes the input voltage $V_{out}$ of the charger W. After the controller AP sends $V_{out\_set}$ to RXIC, with reference to $V_{in\_set}$ stepwise regulated based on the voltage coefficient K, a transmit end 101 can provide, by modulating a working frequency of a system, power that matches the power required by the receive end 102, to implement adaption and matching between the transmit end 101 and the receive end 102.

It should be noted that, when $V_{out\_set}$ is regulated in step 1304, the preset current adjustment ratio $K_{i\_cc}$ in the input voltage regulation amount of the charger is related to a wireless charging system architecture, power of the transmit end 101, and the required charging power of the receive end 102; and the voltage coefficient K is also related to the wireless charging system architecture, the power of the transmit end 101, and the required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cc}$ is a preset current adjustment ratio used in step 1304 when power of a transmit end 101 is greater than a second power threshold of the transmit end and the required charging power of the receive end 102 is greater than the second power threshold of the receive end, and the voltage coefficient K is a voltage coefficient used in step 1302 when the power of the transmit end 101 is greater than the second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end;

and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset current adjustment ratio used in step 1304 and a voltage coefficient used in step 1302 when the required charging power of the receive end 102 is greater than the second power threshold of the receive end and is less than the third power threshold of the receive end are $K_{i\_cc}=K_{i\_cc}1$ and $K=K1$; and a preset current adjustment ratio used in step 1304 and a voltage coefficient used in step 1302 when the required charging power of the receive end 102 is greater than the third power threshold of the receive end are $K_{i\_cc}=K_{i\_cc}2$ and $K=K2$. $K_{i\_cc}1$ is not equal to $K_{i\_cc}2$, and K1 is not equal to K2.

Device Embodiment 10

This embodiment mainly describes a third specific implementation in which a controller of a receive end uses a second control policy (Vin stepwise regulation+frequency modulation) when an open-loop DC-DC converter decreases voltage in a constant current step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a stepwise regulatable type. The controller AP is configured to obtain a voltage coefficient K corresponding to the required charging power, and obtain the configured input voltage value $V_{in\_set}$ of the wireless electric energy transmitter based on the voltage coefficient K and a charging voltage $V_{bat}$ of a battery.

Figure 14:
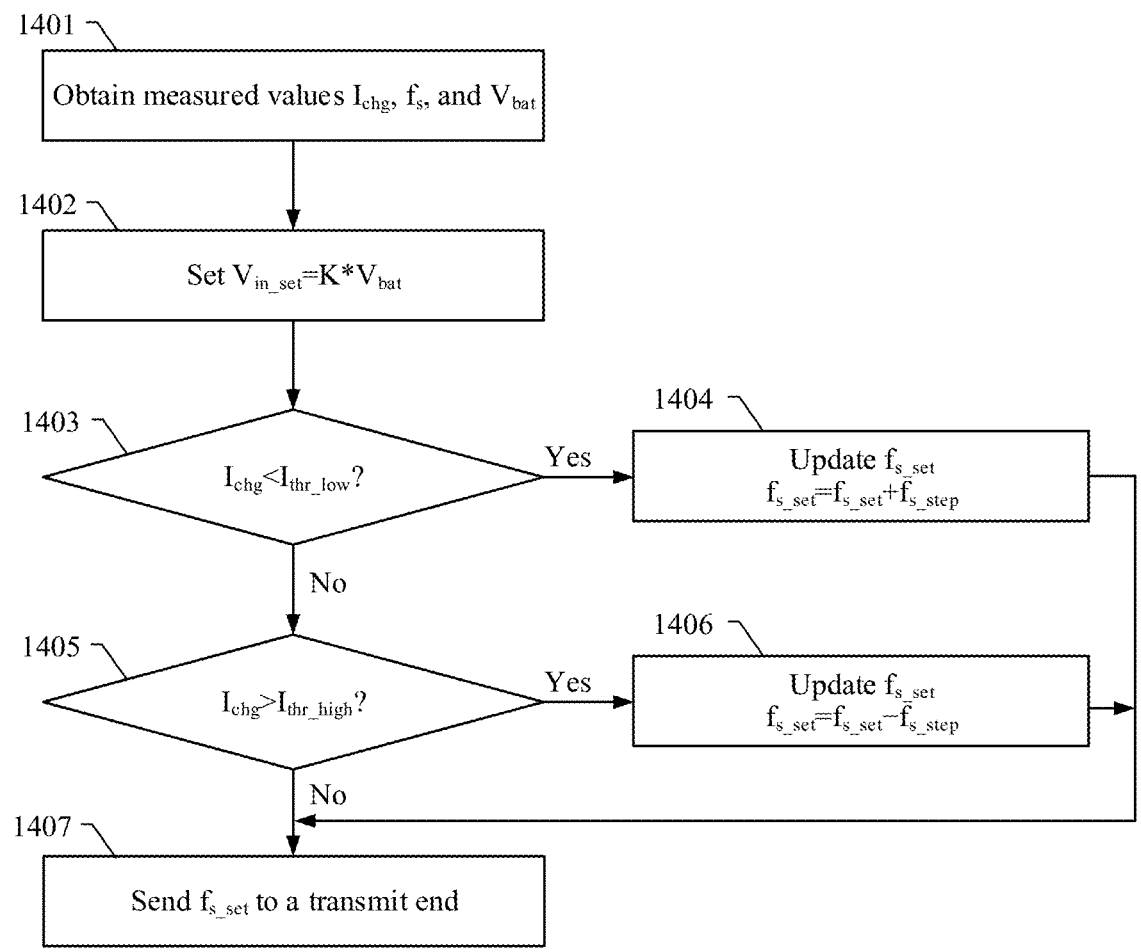
FIG. 14 is a diagram of a $V_{in}$ stepwise regulation+frequency modulation control policy that is of an SC CC phase and that corresponds to a device architecture according to Device Embodiments 1 to 3 of this application.

FIG. 14 is a diagram of a $V_{in}$ stepwise regulation+ frequency modulation control policy that is of an SC CC phase and that corresponds to a device architecture according to Device Embodiments 1 to 3 of this application.

The control implementation block diagram shown in FIG. 14 mainly includes the following steps:

Step 1401: A controller AP obtains a charging current $I_{chg}$ of a battery Bat, a working frequency $f_s$ of a wireless charging system, and a charging voltage $V_{bat}$ of the battery that are obtained through measurement.

Step 1402: Set a configured input voltage value $V_{in\_set}$ of a wireless electric energy transmitter by using a voltage coefficient K corresponding to required charging power of a receive end 102 and the charging voltage $V_{bat}$ of the battery. Specifically, $V_{in\_set}=K*V_{bat}$.

Step 1403: The controller AP compares the charging current $I_{chg}$ with a minimum value $I_{thr\_low}$ of an interval corresponding to a target current, to determine whether $I_{chg}$ is less than $I_{thr\_low}$; and if yes, enters step 1404; or if $I_{chg}$ is greater than or equal to $I_{thr\_low}$, enters step 1405.

Step 1404: Increase the working frequency $f_s$ of the wireless charging system by a preset frequency step $f_{s\_step}$, that is, update $f_{s\_set}$. Before the updating, $f_s$ is a measured value, and after the updating, $f_s$ is a value obtained by adding $f_{s\_step}$ to measured $f_s$. $f_{s\_set}$ is obtained through updating. After the updating, step 1407 is entered.

Step 1405: The controller AP compares the charging current $I_{chg}$ with a maximum value $I_{thr\_high}$ of the interval corresponding to the target current, to determine whether $I_{chg}$ is greater than $I_{thr\_high}$; and if yes, enters step 1406; or if $I_{chg}$ is less than or equal to $I_{thr\_high}$, enters step 1407.

Step 1406: Decrease the working frequency $f_s$ of the wireless charging system by the preset frequency step $f_{s\_step}$, that is, update $f_{s\_set}$. Before the updating, $f_s$ is a measured value, and after the updating, $f_s$ is a value obtained by subtracting $f_{s\_step}$ from measured $f_s$. $f_{s\_set}$ is obtained through updating. After the updating, step 1407 is entered.

In an actual application, the working frequency of the wireless charging system can be modulated by updating $f_{s\_set}$, to regulate $V_{out}$ to control the charging current $I_{chg}$. After step 1407 is entered after the foregoing steps, it indicates that the charging current $I_{chg}$ falls within the interval corresponding to the target current, in other words, falls between the minimum value $I_{thr\_low}$ of the interval corresponding to the target current and the maximum value $I_{thr\_high}$ of the interval corresponding to the target current. In this case, a requirement of the charging current $I_{chg}$ is met.

Step 1407: The controller AP sends $f_{s\_set}$ to a wireless electric energy transmitter of a transmit end 101. This step may be specifically implemented through in-band communication, or may be implemented through out-of-band communication.

A control parameter in this embodiment includes the working frequency $f_s$ of the wireless charging system. For the transmit end 101, the transmit end 101 may modulate the working frequency of the system to $f_{s\_set}$ with reference to stepwise regulated $V_{in\_set}$ and based on $f_{s\_set}$, to regulate $V_{out}$. In this embodiment, the entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

Device Embodiment 11

This embodiment mainly describes a fourth specific implementation in which a controller of a receive end uses a second control policy (Vin stepwise regulation+frequency modulation) when an open-loop DC-DC converter decreases voltage in a constant current step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a stepwise regulatable type. The controller AP is configured to obtain a voltage coefficient K corresponding to the required charging power, and obtain the configured input voltage value $V_{in\_set}$ of the wireless electric energy transmitter based on the voltage coefficient K and a charging voltage $V_{bat}$ of a battery.

Figure 15:
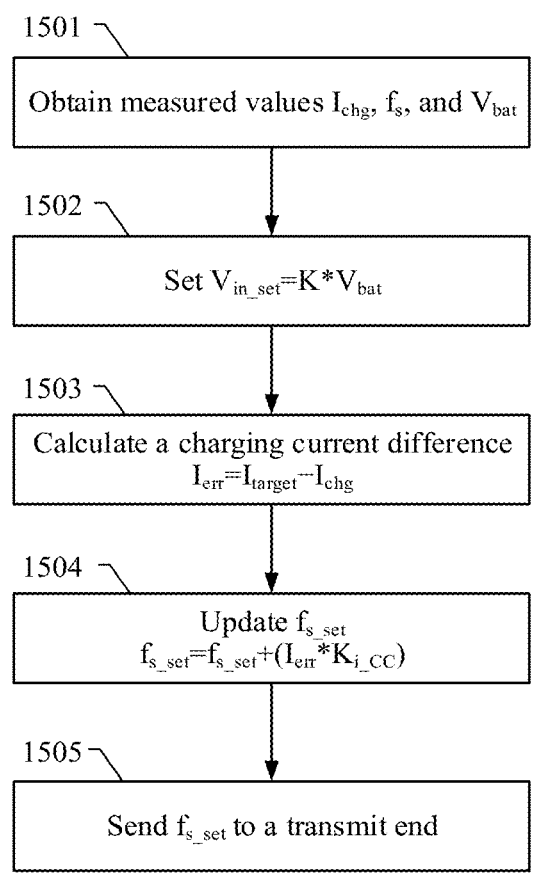
FIG. 15 is a diagram of a $V_{in}$ stepwise regulation+frequency modulation control policy that is of an SC CC phase and that corresponds to a device architecture according to Device Embodiments 1 to 3 of this application.

FIG. 15 is a diagram of a $V_{in}$ stepwise regulation+ frequency modulation control policy that is of an SC CC phase and that corresponds to a device architecture according to Device Embodiments 1 to 3 of this application.

The control implementation block diagram shown in FIG. 15 mainly includes the following steps:

Step 1501: A controller AP obtains a charging current $I_{chg}$ of a battery Bat, a working frequency $f_s$ of a wireless charging system, and a charging voltage $V_{bat}$ of the battery that are obtained through measurement.

Step 1502: Set a configured input voltage value $V_{in\_set}$ of a wireless electric energy transmitter by using a voltage coefficient K corresponding to required charging power of a receive end 102 and the charging voltage $V_{bat}$ of the battery.

Specifically, $V_{in\_set}=K*V_{bat}$.

Step 1503: The controller AP obtains a current difference $I_{err}$ between a target current $I_{target}$ and the charging current $I_{chg}$.

Step 1504: The controller AP modulates a working frequency setting value of the wireless charging system by multiplying the current difference $I_{err}$ by a preset current adjustment ratio $K_{i\_cc}$ and using a product ($I_{err}*K_{i\_cc}$) as a working frequency modulation amount of the wireless charging system.

Specifically, the frequency value obtained in step 1501 is added to the working frequency modulation amount ($I_{err}*K_{i\_cc}$), to update $f_{s\_set}$ to obtain modulated (namely, updated) $f_{s\_set}$.

Step 1505: Send the modulated working frequency setting value $f_{s\_set}$ to a wireless electric energy transmitter.

This step may be specifically implemented through in-band communication, or may be implemented through out-of-band communication.

A control parameter in this embodiment includes the working frequency $f_s$ of the wireless charging system. For a transmit end 101, the transmit end 101 may modulate the working frequency of the system to $f_{s\_set}$ with reference to stepwise regulated $V_{in\_set}$ and based on $f_{s\_set}$, to regulate $V_{out}$. In this embodiment, the entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that, when $f_{s\_set}$ is regulated in step 1504, the preset current adjustment ratio $K_{i\_cc}$ in the working frequency modulation amount of the wireless charging system is related to a wireless charging system architecture, power of the transmit end 101, and the required charging power of the receive end 102; and the voltage coefficient K is also related to the wireless charging system architecture, the power of the transmit end 101, and the required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cc}$ is a preset current adjustment ratio used in step 1504 when the power of the transmit end 101 is greater than a second power threshold of the transmit end and the required charging power of the receive end 102 is greater than the second power threshold of the receive end, and the voltage coefficient K is a voltage coefficient used in step 1502 when the power of the transmit end 101 is greater than the second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end; and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset current adjustment ratio used in step 1504 and a voltage coefficient used in step 1502 when the required charging power of the receive end 102 is greater than the second power threshold of the receive end and is less than the third power threshold of the receive end are $K_{i\_cc}=K_{i\_cc}1$ and K=K1; and a preset current adjustment ratio used in step 1504 and a voltage coefficient used in step 1502 when the required charging power of the receive end 102 is greater than the third power threshold of the receive end are $K_{i\_cc}=K_{i\_cc}2$ and K=K2. $K_{i\_cc}1$ is not equal to $K_{i\_cc}2$, and K1 is not equal to K2.

Device Embodiment 12

This embodiment mainly describes a first specific implementation in which a controller of a receive end uses a third control policy (Vin regulation+constant frequency) when an open-loop DC-DC converter decreases voltage in a constant current step-down phase.

A control parameter in this embodiment includes an input voltage $V_{out}$ of a charger W. For the control policy in this embodiment, refer to FIG. 8. After performing related operations as shown in FIG. 8, the controller AP finally specifically sends updated $V_{out\_set}$ to RXIC.

Compared with the foregoing Device Embodiment 4, a difference in this embodiment lies in that in this embodiment, after the controller AP sends $V_{out\_set}$ to the wireless electric energy receiver RXIC, a transmit end 101 mainly regulates an input voltage $V_{in}$ of a wireless electric energy transmitter to control and adjust a charging current of a battery. However, in Device Embodiment 4, the transmit end 101 mainly modulates the working frequency $f_s$ of the wireless charging system to control and adjust the charging current of the battery.

Device Embodiment 13

This embodiment mainly describes a second specific implementation in which a controller of a receive end uses a third control policy (Vin regulation+constant frequency) when an open-loop DC-DC converter decreases voltage in a constant current step-down phase.

A control parameter in this embodiment includes an input voltage $V_{out}$ of a charger W. For the control policy in this embodiment, refer to FIG. 9. After performing related operations as shown in FIG. 9, the controller AP finally specifically sends updated $V_{out\_set}$ to RXIC.

Compared with the foregoing Device Embodiment 5, a difference in this embodiment lies in that in this embodiment, after the controller AP sends $V_{out\_set}$ to the wireless electric energy receiver RXIC, a transmit end 101 mainly regulates an input voltage $V_{in}$ of a wireless electric energy transmitter to control and adjust a charging current of a battery. However, in Device Embodiment 5, the transmit end 101 mainly modulates the working frequency $f_s$ of the wireless charging system to control and adjust the charging current of the battery.

Device Embodiment 14

This embodiment mainly describes a third specific implementation in which a controller of a receive end uses a third control policy ($V_{in}$ regulation+constant frequency) when an open-loop DC-DC converter decreases voltage in a constant current step-down phase.

A control parameter in this embodiment includes an input voltage $V_{in}$ of a wireless electric energy transmitter.

Figure 16:
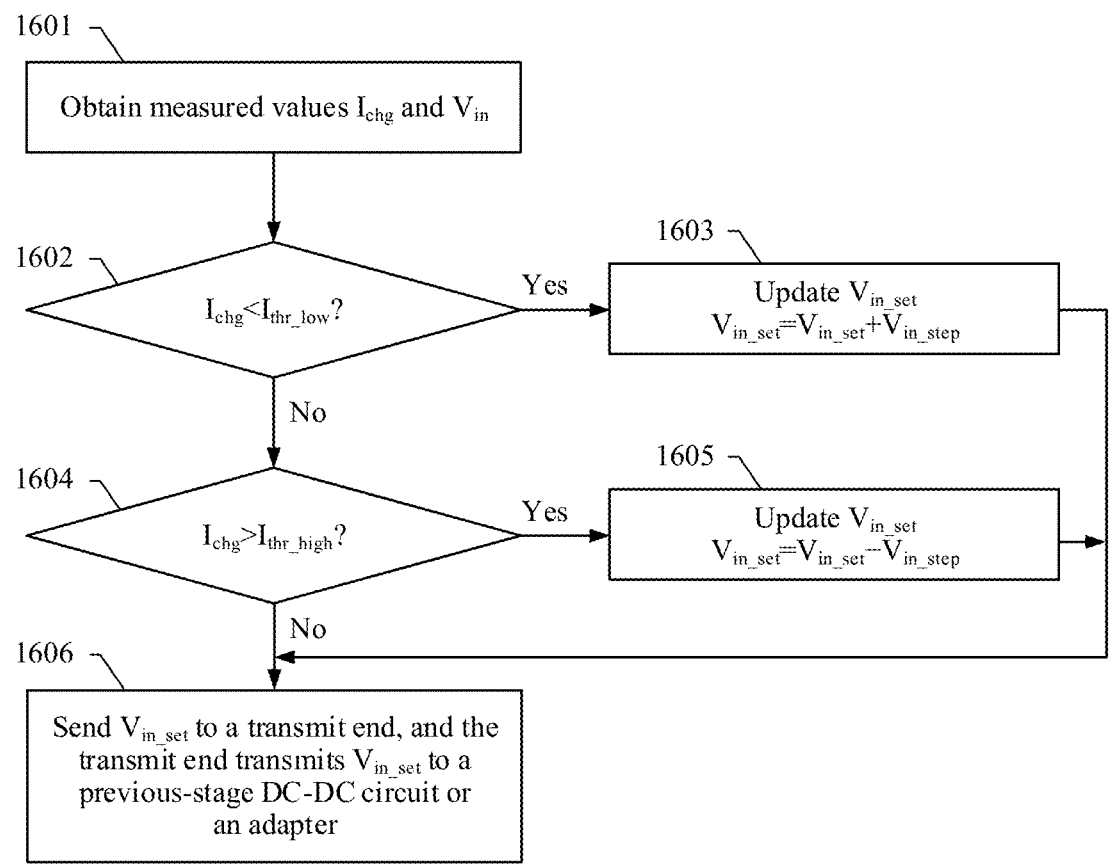
FIG. 16 is a diagram of a $V_{in}$ regulation+constant frequency control policy that is of an SC CC phase and that corresponds to a device architecture according to Device Embodiments 1 to 3 of this application.

FIG. 16 is a diagram of a $V_{in}$ regulation+constant frequency control policy that is of an SC CC phase and that corresponds to a device architecture according to Device Embodiments 1 to 3 of this application.

The control implementation block diagram shown in FIG. 16 mainly includes the following steps:

Step 1601: A controller AP obtains a charging current $I_{chg}$ of a battery Bat and an input voltage $V_{in}$ of a wireless electric energy transmitter that are obtained through measurement.

Step 1602: The controller AP compares the charging current $I_{chg}$ with a minimum value $I_{thr\_low}$ of an interval corresponding to a target current, to determine whether $I_{chg}$ is less than $I_{thr\_low}$; and if yes, enters step 1603; or if $I_{chg}$ is greater than or equal to $I_{thr\_low}$, enters step 1604.

Step 1603: Increase a configured input voltage value $V_{in\_set}$ of the wireless electric energy transmitter by a second preset voltage step $V_{in\_step}$, that is, update $V_{in\_set}$. Before the updating, $V_{in\_set}$ is a measured value, and after the updating, $V_{in\_set}$ is a value obtained by adding $V_{in\_step}$ to measured $V_{in\_set}$. $V_{in\_set}$ is obtained through updating. After the updating, step 1606 is entered.

Step 1604: The controller AP compares the charging current $I_{chg}$ with a maximum value $I_{thr\_high}$ of the interval corresponding to the target current, to determine whether $I_{chg}$ is greater than $I_{thr\_high}$; and if yes, enters step 1605; or if $I_{chg}$ is less than or equal to $I_{thr\_high}$, enters step 1606.

Step 1605: Decrease a configured input voltage value $V_{in\_set}$ of the wireless electric energy transmitter by the second preset voltage step $V_{in\_step}$, that is, update $V_{in\_set}$. Before the updating, $V_{in\_set}$ is a measured value, and after the updating, $V_{in\_set}$ is a value obtained by subtracting $V_{in\_step}$ from measured $V_{in\_set}$. $V_{in\_set}$ is obtained through updating. After the updating, step 1606 is entered.

In an actual application, an input voltage $V_{out}$ of a charger W can be controlled by updating $V_{in\_set}$. After step 1606 is entered after the foregoing steps, it indicates that the charging current $I_{chg}$ falls within the interval corresponding to the target current, in other words, falls between the minimum value $I_{thr\_low}$ of the interval corresponding to the target current and the maximum value $I_{thr\_high}$ of the interval corresponding to the target current. In this case, a requirement of the charging current $I_{chg}$ is met, and the controller AP may send $V_{in\_set}$ to a transmit end 101, and the transmit end 101 transmits $V_{in\_set}$ to a previous-stage DC-DC circuit or an adapter 100, to regulate $V_{in}$.

In an entire wireless charging system, $V_{out}$ can be further regulated by regulating $V_{in}$. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

Device Embodiment 15

This embodiment mainly describes a fourth specific implementation in which a controller of a receive end uses a third control policy (Vin regulation+constant frequency) when an open-loop DC-DC converter decreases voltage in a constant current step-down phase.

A control parameter in this embodiment includes an input voltage $V_{in}$ of a wireless electric energy transmitter.

Figure 17:
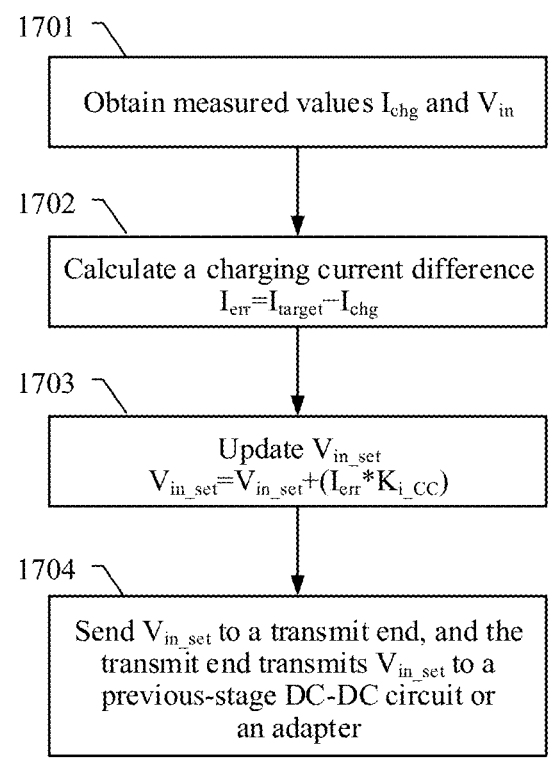
FIG. 17 is a diagram of a $V_{in}$ regulation+constant frequency control policy that is of an SC CC phase and that corresponds to a device architecture according to Device Embodiments 1 to 3 of this application.

FIG. 17 is a diagram of a $V_{in}$ regulation+constant frequency control policy that is of an SC CC phase and that corresponds to a device architecture according to Device Embodiments 1 to 3 of this application.

The control implementation block diagram shown in FIG. 17 mainly includes the following steps:

Step 1701: A controller AP obtains a charging current $I_{chg}$ of a battery Bat and an input voltage $V_{in}$ of a wireless electric energy transmitter that are obtained through measurement.

Step 1702: The controller AP obtains a current difference $I_{err}$ between a target current $I_{target}$ and the charging current $I_{chg}$.

Step 1703: The controller AP regulates a configured input voltage value $V_{in\_set}$ of the wireless electric energy transmitter by multiplying the current difference $I_{err}$ by a preset current adjustment ratio $K_{i\_cc}$ and using a product ($I_{err}*K_{i\_cc}$) as an input voltage regulation amount of the wireless electric energy transmitter. Specifically, $V_{in\_set}$ is added to the input voltage regulation amount ($I_{err}*K_{i\_cc}$) of the wireless electric energy transmitter, to update $V_{in\_set}$ to obtain regulated (namely, updated) $V_{in\_set}$.

Step 1704: The controller AP may send $V_{in\_set}$ to a transmit end, and the transmit end 101 transmits $V_{in\_set}$ to a previous-stage DC-DC circuit or an adapter 100, to regulate $V_{in}$.

In an entire wireless charging system, $V_{out}$ can be further regulated by regulating $V_{in}$. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that, when $V_{in\_set}$ is regulated in step 1703, the preset current adjustment ratio $K_{i\_cc}$ in the input voltage regulation amount of the wireless electric energy transmitter is related to a wireless charging system architecture, power of the transmit end 101, and required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cc}$ is a preset current adjustment ratio used in step 1703 when power of a transmit end 101 is greater than a second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end; and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset current adjustment ratio used in step 1703 when the required charging power of the receive end 102 is greater than the second power threshold of the receive end and is less than the third power threshold of the receive end is $K_{i\_cc}=K_{i\_cc}1$; and a preset current adjustment ratio used in step 1703 when the required charging power of the receive end 102 is greater than the third power threshold of the receive end is $K_{i\_cc}=K_{i\_cc}2$. $K_{i\_cc}1$ is not equal to $K_{i\_cc}2$.

Device Embodiment 16

This embodiment mainly describes a fifth specific implementation in which a controller of a receive end uses a third control policy (Vin regulation+constant frequency) when an open-loop DC-DC converter decreases voltage in a constant current step-down phase.

A control parameter in this embodiment includes an input voltage $V_{in}$ of a wireless electric energy transmitter.

Figure 18:
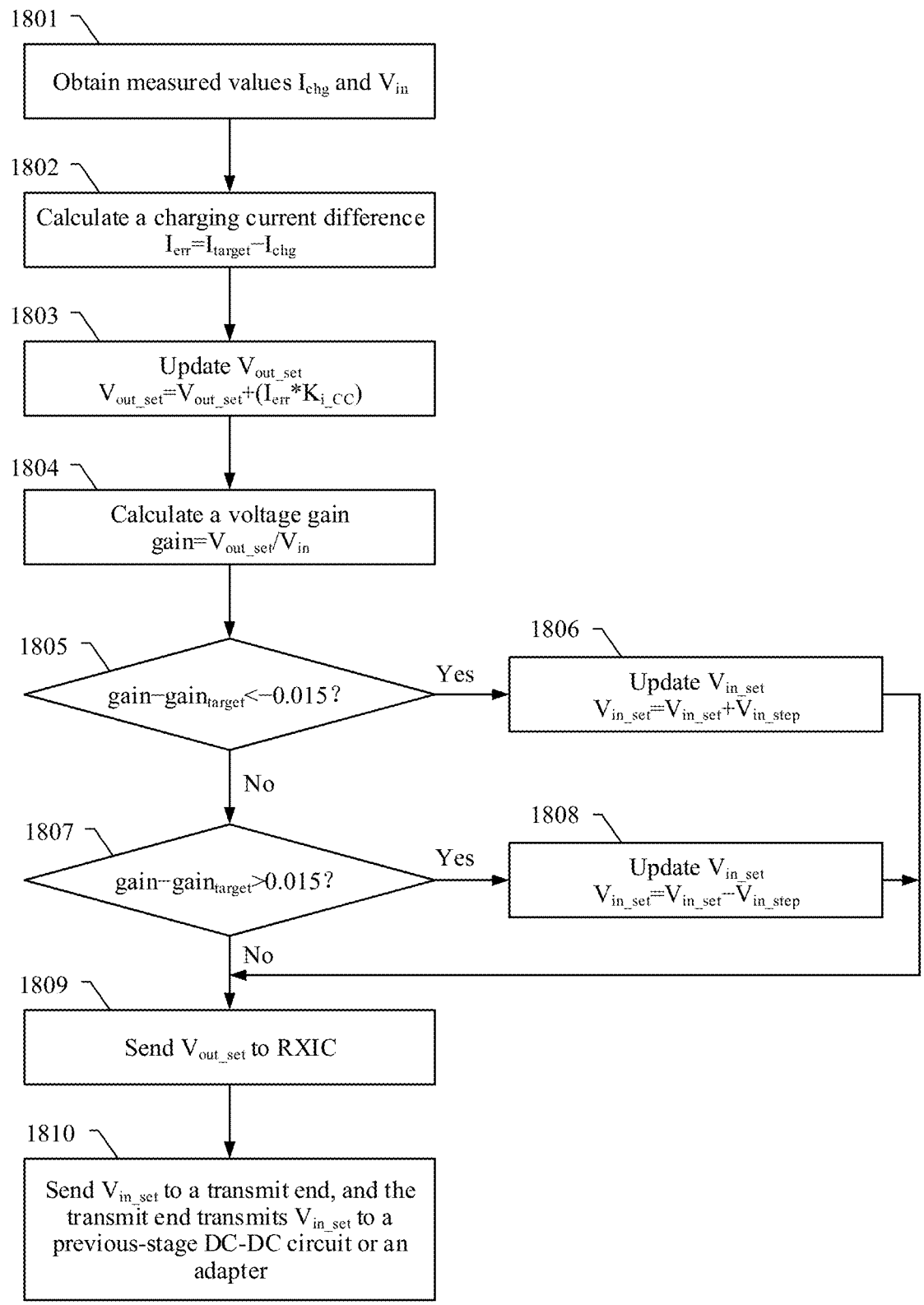
FIG. 18 is a diagram of a $V_{in}$ regulation+constant frequency control policy that is of an SC CC phase and that corresponds to a device architecture according to Device Embodiments 1 to 3 of this application.

FIG. 18 is a diagram of a $V_{in}$ regulation+constant frequency control policy that is of an SC CC phase and that corresponds to a device architecture according to Device Embodiments 1 to 3 of this application.

The control implementation block diagram shown in FIG. 18 mainly includes the following steps:

Step 1801: A controller AP obtains a charging current $I_{chg}$ of a battery Bat and an input voltage $V_{in}$ of a wireless electric energy transmitter that are obtained through measurement.

Step 1802: The controller AP obtains a current difference $I_{err}$ between a target current $I_{target}$ and the charging current $I_{chg}$.

Step 1803: The controller AP regulates a configured input voltage value $V_{out\_set}$ of a charger by multiplying the current difference $I_{err}$ by a preset current adjustment ratio $K_{i\_cc}$ and using a product ($I_{err}*K_{i\_cc}$) as an input voltage regulation amount of the charger. Specifically, $V_{out\_set}$ is added to the input voltage regulation amount ($I_{err}*K_{i\_cc}$), to update $V_{out\_set}$ to obtain regulated (namely, updated) $V_{out\_set}$.

Step 1804: The controller obtains a voltage gain gain by using the input voltage $V_{in}$ of the wireless electric energy transmitter and the regulated configured input voltage value $V_{out\_set}$ of the charger.

Specifically, gain=$V_{out\_set}/V_{in}$.

The following process is described in steps 1805 to 1808:

When it is determined that the voltage gain gain falls outside a preset gain range (in FIG. 18, as an example, the preset gain range is [$gain_{target}$−0.015, $gain_{target}$+0.015]), a configured input voltage value $V_{in\_set}$ of the wireless electric energy transmitter is regulated.

In this embodiment, the target gain $gain_{target}$ may be a system gain of a fixed frequency of a wireless charging system at a corresponding space location and load. After the regulation in steps 1805 to 1808, the voltage gain gain can approach to the target gain $gain_{target}$, to help keep the wireless charging system working at the fixed frequency.

Specifically, according to steps 1805 and 1806, if it is determined, in step 1805, that a difference between the voltage gain gain and the target gain $gain_{target}$ is less than −0.015, step 1806 is performed, that is, the configured input voltage value $V_{in\_set}$ of the wireless electric energy transmitter is increased by a second preset voltage step $V_{in\_step}$, to update $V_{in\_set}$.

Specifically, according to steps 1807 and 1808, if it is determined, in step 1807, that a difference between the voltage gain gain and the target gain $gain_{target}$ is greater than 0.015, step 1808 is performed, that is, the configured input voltage value $V_{in\_set}$ of the wireless electric energy transmitter is decreased by the second preset voltage step $V_{in\_step}$, to up date V in_set.

Then, step 1809 and step 1810 are performed.

Step 1809: The controller AP sends the regulated configured input voltage value $V_{out\_set}$ of the charger to a wireless electric energy receiver RXIC.

Step 1810: The controller AP sends an updated configured input voltage value $V_{in\_set}$ of the wireless electric energy transmitter to a transmit end 101, and the transmit end 101 sends $V_{in\_set}$ to a previous-stage DC-DC circuit or an adapter 100.

The wireless electric energy transmitter transmits $V_{in\_set}$ to the previous-stage DC-DC circuit or the adapter 100, to regulate $V_{in}$. In the entire wireless charging system, $V_{out}$ can be further regulated by regulating yin. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that in this embodiment, a relative execution sequence of step 1809 and step 1810 is not limited, and a relative execution sequence of step 1805 and step 1807 is also not limited.

Device Embodiment 17

This embodiment mainly describes a sixth specific implementation in which a controller of a receive end uses a third control policy ($V_{in}$ regulation+constant frequency) when an open-loop DC-DC converter decreases voltage in a constant current step-down phase.

A control parameter in this embodiment includes an input voltage $V_{in}$ of a wireless electric energy transmitter.

Figure 19:
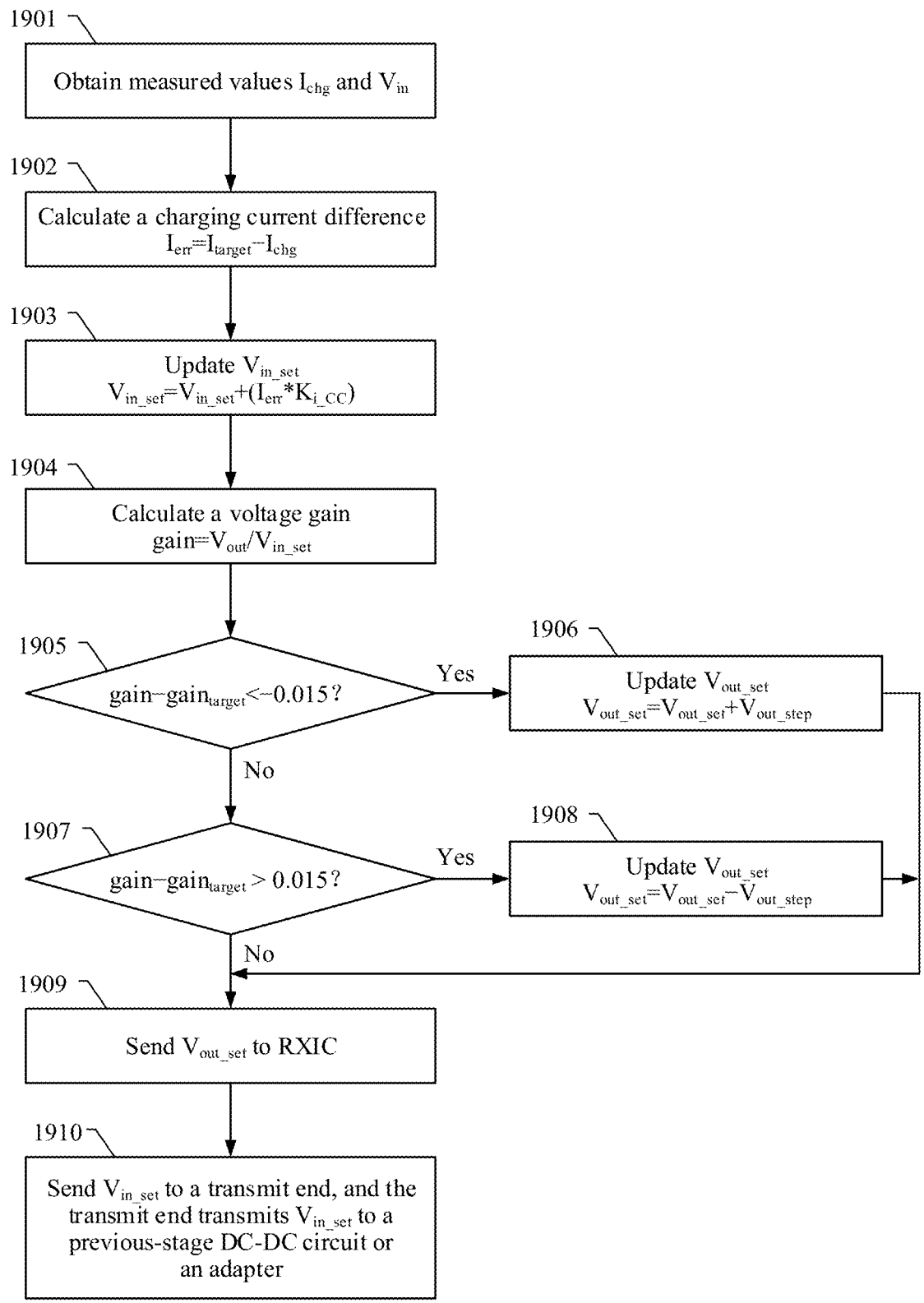
FIG. 19 is a diagram of a $V_{in}$ regulation+constant frequency control policy that is of an SC CC phase and that corresponds to a device architecture according to Device Embodiments 1 to 3 of this application.

FIG. 19 is a diagram of a $V_{in}$ regulation+constant frequency control policy that is of an SC CC phase and that corresponds to a device architecture according to Device Embodiments 1 to 3 of this application.

The control implementation block diagram shown in FIG. 19 mainly includes the following steps:

Step 1901: A controller AP obtains a charging current $I_{chg}$ of a battery Bat and an input voltage $V_{in}$ of a wireless electric energy transmitter that are obtained through measurement.

Step 1902: The controller AP obtains a current difference $I_{err}$ between a target current $I_{target}$ and the charging current $I_{chg}$.

Step 1903: The controller AP regulates a configured input voltage value $V_{in\_set}$ of the wireless electric energy transmitter by multiplying the current difference $I_{err}$ by a preset current adjustment ratio $K_{i\_cc}$ and using a product ($I_{err}*K_{i\_cc}$) as an input voltage regulation amount of the wireless electric energy transmitter.

Specifically, $V_{in\_set}$ is added to the input voltage regulation amount ($I_{err}*K_{i\_cc}$), to update $V_{in\_set}$ to obtain regulated (namely, updated) $V_{in\_set}$.

Step 1904: The controller AP obtains a voltage gain gain by using a configured input voltage value $V_{out\_set}$ of a charger and the regulated configured input voltage value $V_{in\_set}$ of the wireless electric energy transmitter.

Specifically, gain=$V_{out\_set}/V_{in\_set}$.

The following process is described in steps 1905 to 1908:

When it is determined that the voltage gain gain falls outside a preset gain range (in FIG. 19, as an example, the preset gain range is [$gain_{target}$−0.015, $gain_{target}$+0.015]), a configured input voltage value $V_{out\_set}$ of the charger W is regulated.

In this embodiment, the target gain $gain_{target}$ may be a system gain of a fixed frequency of a wireless charging system at a corresponding space location and load. After the regulation in steps 1905 to 1908, the voltage gain gain can approach to the target gain $gain_{target}$, to help keep the wireless charging system working at the fixed frequency.

Specifically, according to steps 1905 and 1906, if it is determined, in step 1905, that a difference between the voltage gain gain and the target gain $gain_{target}$ is less than −0.015, step 1906 is performed, that is, the configured input voltage value $V_{out\_set}$ of the charger W is increased by a first preset voltage step $V_{out\_step}$, to update $V_{out\_set}$.

Specifically, according to steps 1907 and 1908, if it is determined, in step 1907, that a difference between the voltage gain gain and the target gain $gain_{target}$ is greater than 0.015, step 1908 is performed, that is, the configured input voltage value $V_{out\_set}$ of the charger W is decreased by the first preset voltage step $V_{out\_step}$, to update $V_{out\_set}$.

Then, step 1909 and step 1910 are performed.

Step 1909: The controller AP sends a regulated configured input voltage value $V_{out\_set}$ of the charger to a wireless electric energy receiver RXIC.

Step 1910: The controller AP sends the updated configured input voltage value $V_{in\_set}$ of the wireless electric energy transmitter to a transmit end 101, and the transmit end 101 sends $V_{in\_set}$ to a previous-stage DC-DC circuit or an adapter 100.

The wireless electric energy transmitter transmits $V_{in\_set}$ to the previous-stage DC-DC circuit or the adapter 100, to regulate $V_{in}$. In the entire wireless charging system, $V_{out}$ can be further regulated by regulating yin. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that in this embodiment, a relative execution sequence of step 1909 and step 1910 is not limited, and a relative execution sequence of step 1905 and step 1907 is also not limited.

Device Embodiment 18

This embodiment mainly describes a seventh specific implementation in which a controller of a receive end uses a third control policy (Vin regulation+constant frequency) when an open-loop DC-DC converter decreases voltage in a constant current step-down phase.

A control parameter in this embodiment includes an input voltage Vin of a wireless electric energy transmitter.

The controller AP is configured to: when determining that a charging current falls outside an interval corresponding to a target current, regulate a configured input voltage value $V_{out\_set}$ of a charger, and obtain a gain gain by using a regulated configured input voltage value $V_{out\_set}$ of the charger and the input voltage $V_{in}$ of the wireless electric energy transmitter; and when determining that the gain gain falls outside a preset gain range, regulate a configured input voltage value $V_{in\_set}$ of the wireless electric energy transmitter, send a regulated configured input voltage value $V_{in\_set}$ of the wireless electric energy transmitter to a transmit end 101, and send the regulated configured input voltage value $V_{out\_set}$ of the charger to a wireless electric energy receiver RXIC.

Figure 20A:
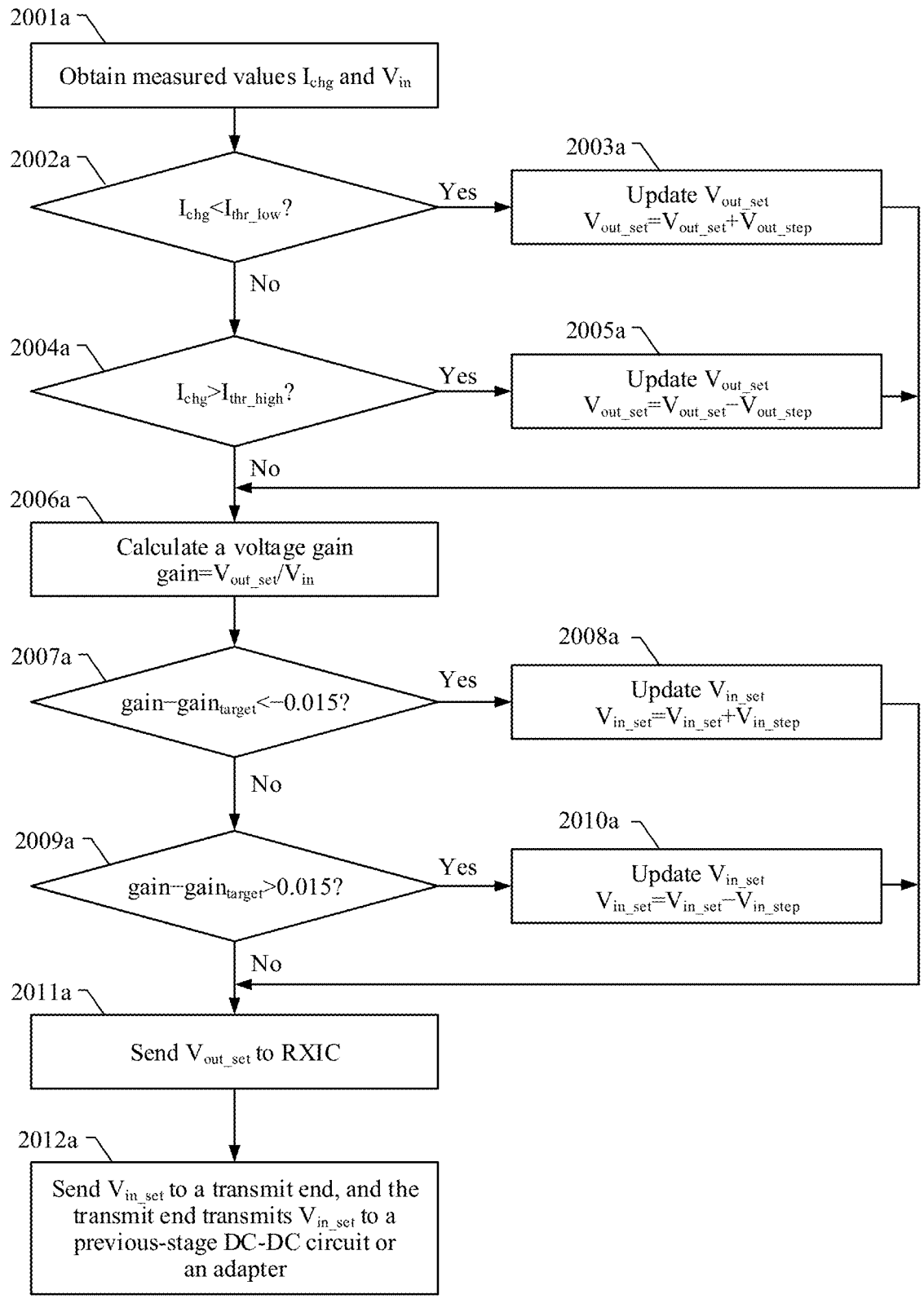
FIG. 20A is a diagram of a $V_{in}$ regulation+constant frequency control policy that is of an SC CC phase and that corresponds to a device architecture according to Device Embodiments 1 to 3 of this application.

FIG. 20A is a diagram of a $V_{in}$ regulation+constant frequency control policy that is of an SC CC phase and that corresponds to a device architecture according to Device Embodiments 1 to 3 of this application.

The control implementation block diagram shown in FIG. 20A mainly includes the following steps:

Step 2001a: A controller AP obtains a charging current $I_{chg}$ of a battery Bat and an input voltage $V_{in}$ of a wireless electric energy transmitter that are obtained through measurement.

Step 2002a: The controller AP compares the charging current $I_{chg}$ with a minimum value $I_{thr\_low}$ of an interval corresponding to a target current, to determine whether $I_{chg}$ is less than $I_{thr\_low}$; and if yes, enters step 2003a; or if $I_{chg}$ is greater than or equal to $I_{thr\_low}$, enters step 2004a.

Step 2003a: Increase an input voltage $V_{out}$ of a charger W by a first preset voltage step $V_{out\_step}$, that is, update $V_{out\_set}$. Before the updating, the input voltage $V_{out}$ is a measured value, and after the updating, the input voltage $V_{out}$ is a value obtained by adding $V_{out\_step}$ to measured $V_{out}$. $V_{out\_set}$ is obtained through updating.

Step 2004a: The controller AP compares the charging current $I_{chg}$ with a maximum value $I_{thr\_high}$ of the interval corresponding to the target current, to determine whether $I_{chg}$ is greater than $I_{thr\_high}$; and if yes, enters step 2005a; or if $I_{chg}$ is less than or equal to $I_{thr\_high}$, enters step 2006a.

Step 2005a: Decrease an input voltage $V_{out}$ of the charger W by the first preset voltage step $V_{out\_step}$, that is, update $V_{out\_set}$. Before the updating, the input voltage $V_{out}$ is a measured value, and after the updating, the input voltage $V_{out}$ is a value obtained by subtracting $V_{out\_step}$ from measured $V_{out}$. $V_{out\_set}$ is obtained through updating.

In an actual application, the charging current $I_{chg}$ can be controlled by updating $V_{out\_set}$. After step 2006a is entered after the foregoing steps, it indicates that the charging current $I_{chg}$ falls within the interval corresponding to the target current, in other words, falls between the minimum value $I_{thr\_low}$ of the interval corresponding to the target current and the maximum value $I_{thr\_high}$ of the interval corresponding to the target current. In this case, a requirement of the charging current $I_{chg}$ is met.

Step 2006a: The controller AP obtains a gain gain by using a regulated configured input voltage value $V_{out\_set}$ of the charger and the input voltage $V_{in}$ of the wireless electric energy transmitter.

Specifically, gain=$V_{out}$_set/$V_{in}$.

The following process is described in steps 2007a to 2010a:

When it is determined that the voltage gain gain falls outside a preset gain range (in FIG. 20A, as an example, the preset gain range is [$gain_{target}$−0.015, $gain_{target}$+0.015]), a configured input voltage value $V_{in\_set}$ of the wireless electric energy transmitter is regulated.

In this embodiment, the target gain $gain_{target}$ may be a system gain of a fixed frequency of a wireless charging system at a corresponding space location and load. After the regulation in steps 2007a to 2010a, the voltage gain gain can approach to the target gain $gain_{target}$, to help keep the wireless charging system working at the fixed frequency.

Specifically, according to steps 2007a and 2008a, if it is determined, in step 2007a, that a difference between the voltage gain gain and the target gain $gain_{target}$ is less than −0.015, step 2008a is performed, that is, the configured input voltage value $V_{in\_set}$ of the wireless electric energy transmitter is increased by a second preset voltage step $V_{in\_step}$, to update $V_{in\_set}$.

Specifically, according to steps 2009a and 2010a, if it is determined, in step 2009a, that a difference between the voltage gain gain and the target gain $gain_{target}$ is greater than 0.015, step 2010a is performed, that is, the configured input voltage value $V_{in\_set}$ of the wireless electric energy transmitter is decreased by the second preset voltage step $V_{in\_step}$, to update $V_{in\_set}$.

Then, step 2011a and step 2012a are performed.

Step 2011a: The controller AP sends the regulated configured input voltage value $V_{out\_set}$ of the charger to a wireless electric energy receiver RXIC.

Step 2012a: The controller AP sends an updated configured input voltage value $V_{in\_set}$ of the wireless electric energy transmitter to a transmit end 101, and the transmit end 101 sends $V_{in\_set}$ to a previous-stage DC-DC circuit or an adapter 100.

The wireless electric energy transmitter transmits $V_{in\_set}$ to the previous-stage DC-DC circuit or the adapter 100, to regulate $V_{in}$. In the entire wireless charging system, $V_{out}$ can be further regulated by regulating $V_{in}$. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that in this embodiment, a relative execution sequence of step 2011a and step 2012a is not limited, a relative execution sequence of step 2002a and step 2004a is also not limited, and a relative execution sequence of step 2007a and step 2009a is also not limited.

The following mainly describes an eighth specific implementation in which a controller of a receive end uses a third control policy (Vin regulation+constant frequency) when an open-loop DC-DC converter decreases voltage in a constant current step-down phase.

A control parameter in this embodiment includes an input voltage $V_{in}$ of a wireless electric energy transmitter.

The controller AP is configured to: when determining that a charging current falls outside an interval corresponding to a target current, regulate a configured input voltage value $V_{in\_set}$ of the wireless electric energy transmitter, and obtain a gain gain by using an input voltage $V_{out}$ of a charger and a regulated configured input voltage value $V_{in\_set}$ of the wireless electric energy transmitter; and when determining that the gain falls outside a preset gain range, regulate a configured input voltage value $V_{out\_set}$ of the charger, send the regulated configured input voltage value $V_{in\_set}$ of the wireless electric energy transmitter to a transmit end, and send a regulated configured input voltage value $V_{out\_set}$ of the charger to a wireless electric energy receiver RXIC.

Figure 20B:
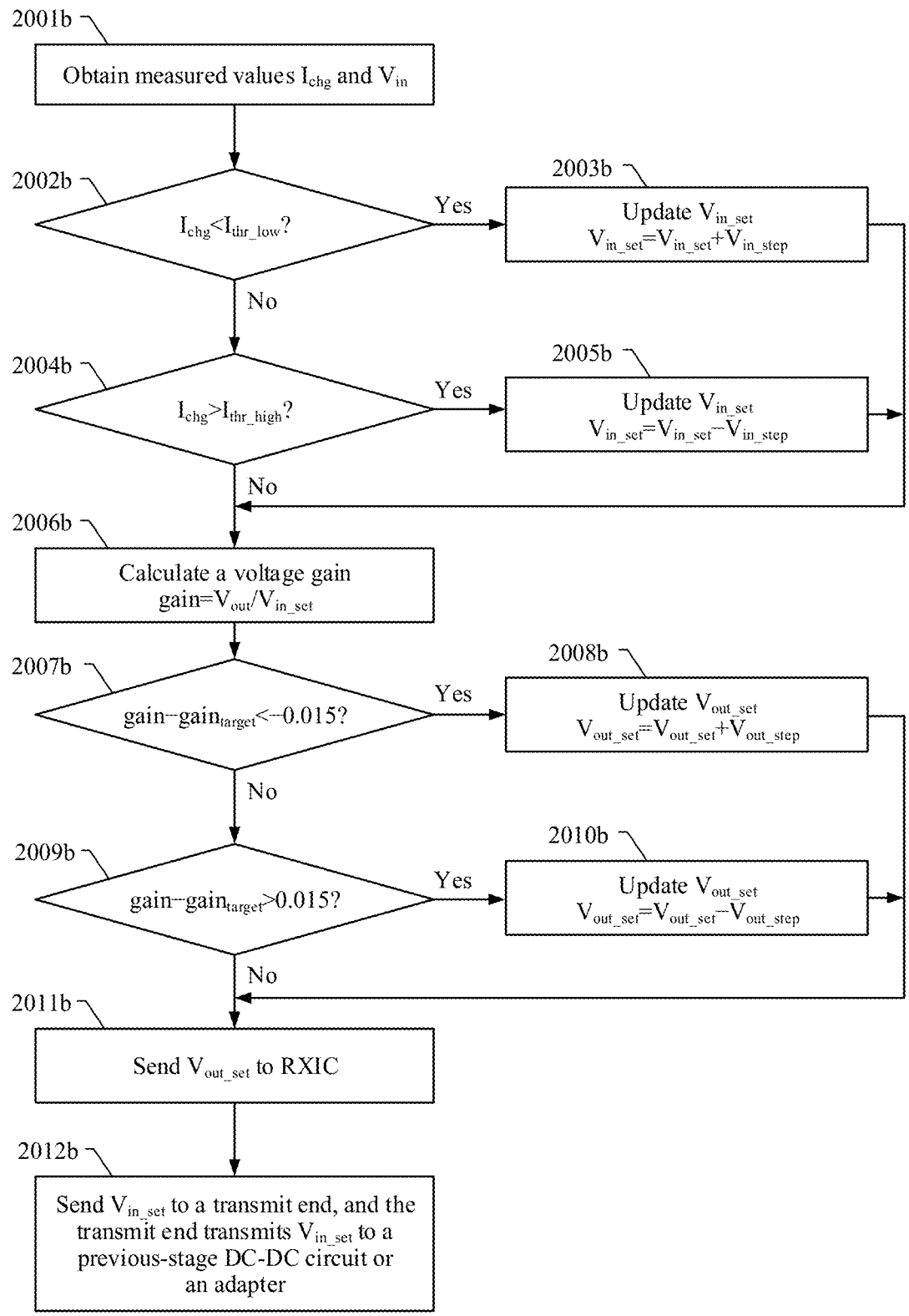
FIG. 20B is a diagram of a $V_{in}$ regulation+constant frequency control policy that is of an SC CC phase and that corresponds to a device architecture according to Device Embodiments 1 to 3 of this application.

FIG. 20B is a diagram of a $V_{in}$ regulation+constant frequency control policy that is of an SC CC phase and that corresponds to a device architecture according to Device Embodiments 1 to 3 of this application.

The control implementation block diagram shown in FIG. 20B mainly includes the following steps:

Step 2001b: A controller AP obtains a charging current $I_{chg}$ of a battery Bat and an input voltage $V_{in}$ of a wireless electric energy transmitter that are obtained through measurement.

Step 2002b: The controller AP compares the charging current $I_{chg}$ with a minimum value $I_{thr\_low}$ of an interval corresponding to a target current, to determine whether $I_{chg}$ is less than $I_{thr\_low}$; and if yes, enters step 2003b; or if $I_{chg}$ is greater than or equal to $I_{thr\_low}$, enters step 2004b.

Step 2003b: Increase the input voltage $V_{in}$ of the wireless electric energy transmitter by a second preset voltage step $V_{in\_step}$, that is, update $V_{in\_set}$. Before the updating, the input voltage $V_{in}$ is a measured value, and after the updating, the input voltage $V_{in}$ is a value obtained by adding $V_{in\_step}$ to measured $V_{in}$. $V_{in\_set}$ is obtained through updating.

Step 2004b: The controller AP compares the charging current $I_{chg}$ with a maximum value $I_{thr\_high}$ of the interval corresponding to the target current, to determine whether $I_{chg}$ is greater than $I_{thr\_high}$; and if yes, enters step 2005b; or if $I_{chg}$ is less than or equal to $I_{thr\_high}$, enters step 2006b.

Step 2005b: Decrease the input voltage $V_{in}$ of the wireless electric energy transmitter by the second preset voltage step $V_{in\_step}$, that is, update $V_{in\_set}$. Before the updating, the input voltage $V_{in}$ is a measured value, and after the updating, the input voltage $V_{in}$ is a value obtained by subtracting $V_{in\_step}$ from measured $V_{in}$. $V_{in\_set}$ is obtained through updating.

In an actual application, the charging current $I_{chg}$ can be controlled by updating $V_{in\_set}$. After step 2006b is entered after the foregoing steps, it indicates that the charging current $I_{chg}$ falls within the interval corresponding to the target current, in other words, falls between the minimum value $I_{thr\_low}$ of the interval corresponding to the target current and the maximum value $I_{thr\_high}$ of the interval corresponding to the target current. In this case, a requirement of the charging current $I_{chg}$ is met.

Step 2006b: The controller AP obtains a gain gain by using an input voltage $V_{out}$ of a charger and a configured input voltage value $V_{in\_set}$ of the wireless electric energy transmitter.

Specifically, $gain = V_{out}/V_{in\_set}$.

The following process is described in steps 2007b to 2010b:

When it is determined that the voltage gain gain falls outside a preset gain range (in FIG. 20B, as an example, the preset gain range is [$gain_{target}$−0.015, $gain_{target}$+0.015]), a configured input voltage value $V_{out\_set}$ of the charger is regulated.

In this embodiment, the target gain $gain_{target}$ may be a system gain of a fixed frequency of a wireless charging system at a corresponding space location and load. After the regulation in steps 2007b to 2010b, the voltage gain gain can approach to the target gain $gain_{target}$, to help keep the wireless charging system working at the fixed frequency.

Specifically, according to steps 2007b and 2008b, if it is determined, in step 2007b, that a difference between the voltage gain gain and the target gain $gain_{target}$ is less than −0.015, step 2008b is performed, that is, the configured input voltage value $V_{out\_set}$ of the charger W is increased by a first preset voltage step $V_{out\_step}$, to update $V_{out\_set}$.

Specifically, according to steps 2009b and 2010b, if it is determined, in step 2009b, that a difference between the voltage gain gain and the target gain $gain_{target}$ is greater than 0.015, step 2010b is performed, that is, the configured input voltage value $V_{out\_set}$ of the charger W is decreased by the first preset voltage step $V_{out\_step}$, to update $V_{out\_set}$.

Then, step 2011b and step 2012b are performed.

Step 2011b: The controller AP sends a regulated configured input voltage value $V_{out\_set}$ of the charger to a wireless electric energy receiver RXIC.

Step 2012b: The controller AP sends the updated configured input voltage value $V_{in\_set}$ of the wireless electric energy transmitter to a transmit end 101, and the transmit end 101 sends $V_{in\_set}$ to a previous-stage DC-DC circuit or an adapter 100.

The wireless electric energy transmitter transmits $V_{in\_set}$ to the previous-stage DC-DC circuit or the adapter 100, to regulate $V_{in}$. In the entire wireless charging system, $V_{out}$ can be further regulated by regulating $V_{in}$. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that in this embodiment, a relative execution sequence of step 2011b and step 2012b is not limited, a relative execution sequence of step 2002b and step 2004b is also not limited, and a relative execution sequence of step 2007b and step 2009b is also not limited.

Second part: Control of a constant voltage step-down phase ("control of an SC CV phase," for short).

Content used by a controller AP for comparison includes a charging parameter and a target parameter. In the constant voltage step-down phase, the charging parameter includes a charging voltage of a battery Bat, and the target parameter includes a target charging voltage. The charging voltage of the battery is represented by $V_{bat}$, and the target charging voltage is represented by $V_{bat\_target}$.

The controller AP is specifically configured to: compare the charging voltage $V_{bat}$ of the battery with the target charging voltage $V_{bat\_target}$, and adjust a control parameter based on a comparison result. During control in the constant voltage step-down phase, the control parameter may be an input voltage $V_{out}$ of a charger W, a working frequency $f_s$ of a wireless charging system, or an input voltage $V_{in}$ of a wireless electric energy transmitter.

In an actual application, when the control parameter is the working frequency $f_s$ of the wireless charging system or the input voltage $V_{in}$ of the wireless electric energy transmitter, the controller AP is further configured to send the control parameter to a transmit end 101. The wireless electric energy transmitter may send the control parameters to an adapter 100 or a DC-DC circuit (referred to as a previous-stage DC-DC circuit of the wireless electric energy transmitter in the following) between the adapter 100 and the wireless electric energy transmitter, thereby facilitating regulation of $V_{in}$ to regulate $V_{out}$.

Device Embodiment 19

This embodiment mainly describes a first specific implementation in which a controller of a receive end uses a first control policy (Vin grading+frequency modulation) when an open-loop DC-DC converter decreases voltage in a constant voltage step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a graded type. That is, $V_{in}$ can work in one of a limited quantity of grades, and $V_{in}$ cannot be regulated when working in a fixed grade. The controller AP is specifically configured to: determine a grade of the input voltage of the wireless electric energy transmitter based on the required charging power, and use a voltage value at the grade as the configured input voltage value of the wireless electric energy transmitter.

Figure 21:
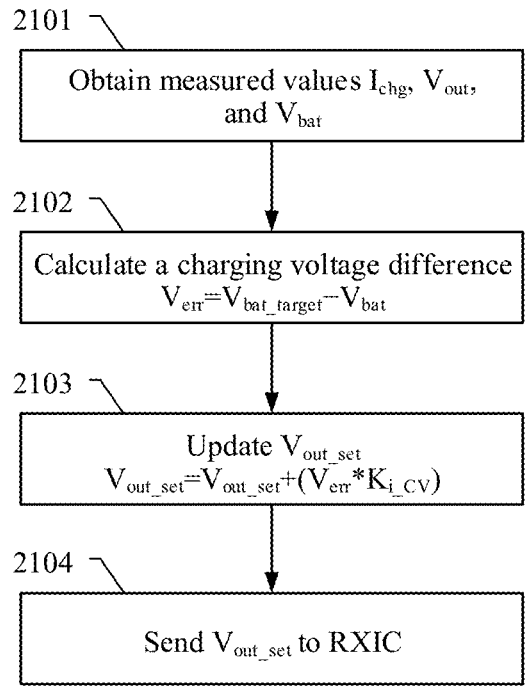
FIG. 21 is a diagram of a $V_{in}$ grading+frequency modulation or $V_{in}$ regulation+constant frequency control policy that is of an SC CV phase and that corresponds to a device architecture according to Device Embodiments 1 to 3 of this application.

FIG. 21 is a diagram of a $V_{in}$ grading+frequency modulation control policy that is of an SC CV phase and that corresponds to a device architecture according to Device Embodiments 1 to 3 of this application.

The control implementation block diagram shown in FIG. 21 mainly includes the following steps:

Step 2101: A controller AP obtains a charging current $I_{chg}$ of a battery Bat, an input voltage $V_{out}$ of a charger W, and a charging voltage $V_{bat}$ of the battery that are obtained through measurement.

Step 2102: The controller AP obtains a voltage difference $V_{err}$ between a target charging voltage $V_{bat\_target}$ and the charging voltage $V_{bat}$ of the battery.

Step 2103: The controller AP regulates a configured input voltage value $V_{out\_set}$ of the charger by multiplying the voltage difference $V_{err}$ by a preset voltage regulation ratio $K_{i\_cv}$ and using a product ($V_{err} * K_{i\_cv}$) as an input voltage regulation amount of the charger. Specifically, $V_{out\_set}$ is added to the input voltage regulation amount ($V_{err} * K_{i\_cv}$), to update $V_{out\_set}$ to obtain regulated (namely, updated) $V_{out\_set}$.

Step 2104: Send the regulated configured input voltage value $V_{out\_set}$ of the charger to a wireless electric energy receiver.

A control parameter in this embodiment includes the input voltage $V_{out}$ of the charger W. After the controller AP sends $V_{out\_set}$ to RXIC, a transmit end 101 can provide, with reference to graded $V_{in\_set}$ by modulating a working frequency of a system, power that matches power required by a receive end 102, to implement adaption and matching between the transmit end 101 and the receive end 102.

It should be noted that, when $V_{out\_set}$ is regulated in step 2103, the preset voltage regulation ratio $K_{i\_cv}$ in the input voltage regulation amount of the charger is related to a wireless charging system architecture, power of the transmit end 101, and required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cv}$ is a preset voltage regulation ratio used in step 2103 when power of a transmit end 101 is greater than a second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end;

and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset voltage regulation ratio used in step 2103 when the required charging power of the receive end 102 is greater than the second power threshold of the receive end and is less than the third power threshold of the receive end is $K_{i\_cv}=K_{i\_cv}1$; and a preset voltage regulation ratio used in step 2103 when the required charging power of the receive end 102 is greater than the third power threshold of the receive end is $K_{i\_cv}=K_{i\_cv}2$. $K_{i\_cv}1$ is not equal to $K_{i\_cv}2$.

Device Embodiment 20

This embodiment mainly describes a second specific implementation in which a controller of a receive end uses a first control policy (Vin grading+frequency modulation) when an open-loop DC-DC converter decreases voltage in a constant voltage step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a graded type. That is, $V_{in}$ can work in one of a limited quantity of grades, and $V_{in}$ cannot be regulated when working in a fixed grade. The controller AP is specifically configured to: determine a grade of the input voltage of the wireless electric energy transmitter based on the required charging power, and use a voltage value at the grade as the configured input voltage value of the wireless electric energy transmitter.

Figure 22:
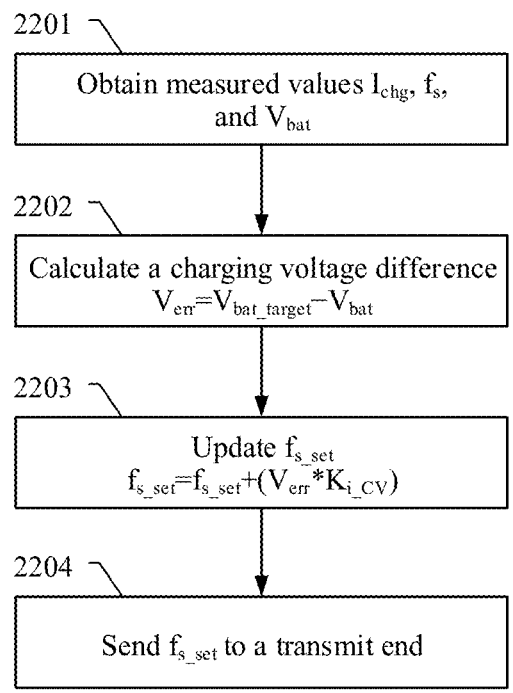
FIG. 22 is a diagram of a $V_{in}$ grading+frequency modulation control policy that is of an SC CV phase and that corresponds to a device architecture according to Device Embodiments 1 to 3 of this application.

FIG. 22 is a diagram of a $V_{in}$ grading+frequency modulation control policy that is of an SC CV phase and that corresponds to a device architecture according to Device Embodiments 1 to 3 of this application.

The control implementation block diagram shown in FIG. 22 mainly includes the following steps:

Step 2201: A controller AP obtains a charging current $I_{chg}$ of a battery Bat, a working frequency $f_s$ of a wireless charging system, and a charging voltage $V_{bat}$ of the battery that are obtained through measurement.

Step 2202: The controller AP obtains a voltage difference $V_{err}$ between a target charging voltage $V_{bat\_target}$ and the charging voltage $V_{bat}$ of the battery.

Step 2203: The controller AP modulates a working frequency setting value of the wireless charging system by multiplying the voltage difference $V_{err}$ by a preset voltage regulation ratio $K_{i\_cv}$ and using a product ($V_{err}*K_{i\_cv}$) as a working frequency modulation amount of the wireless charging system.

Specifically, the frequency value obtained in step 2201 is added to the working frequency modulation amount ($V_{err}*K_{i\_cv}$), to update $f_{s\_set}$ to obtain modulated (namely, updated) $f_{s\_set}$.

Step 2204: Send the modulated working frequency setting value $f_{s\_set}$ to a wireless electric energy transmitter.

This step may be specifically implemented through in-band communication, or may be implemented through out-of-band communication.

A control parameter in this embodiment includes the working frequency $f_s$ of the wireless charging system. For a transmit end 101, the transmit end 101 may modulate the working frequency of the system to $f_{s\_set}$ with reference to graded $V_{in\_set}$ and based on $f_{s\_set}$, to regulate $V_{out}$. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that, when $f_{s\_set}$ is regulated in step 2203, the preset voltage regulation ratio $K_{i\_cv}$ in the working frequency modulation amount of the wireless charging system is related to a wireless charging system architecture, power of the transmit end 101, and required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cv}$ is a preset voltage regulation ratio used in step 2203 when power of a transmit end 101 is greater than a second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end; and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset voltage regulation ratio used in step 2203 when the required charging power of the receive end 102 is greater than the second power threshold of the receive end and is less than the third power threshold of the receive end is $K_{i\_cv}=K_{i\_cv}1$; and a preset voltage regulation ratio used in step 2203 when the required charging power of the receive end 102 is greater than the third power threshold of the receive end is $K_{i\_cv}=K_{i\_cv}2$. $K_{i\_cv}1$ is not equal to $K_{i\_cv}2$.

Device Embodiment 21

This embodiment mainly describes a first specific implementation in which a controller of a receive end uses a second control policy (Vin stepwise regulation+frequency modulation) when an open-loop DC-DC converter decreases voltage in a constant voltage step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a stepwise regulatable type. The controller AP is configured to obtain a voltage coefficient K corresponding to the required charging power, and obtain the configured input voltage value $V_{in\_set}$ of the wireless electric energy transmitter based on the voltage coefficient K and a charging voltage $V_{bat}$ of a battery.

Figure 23:
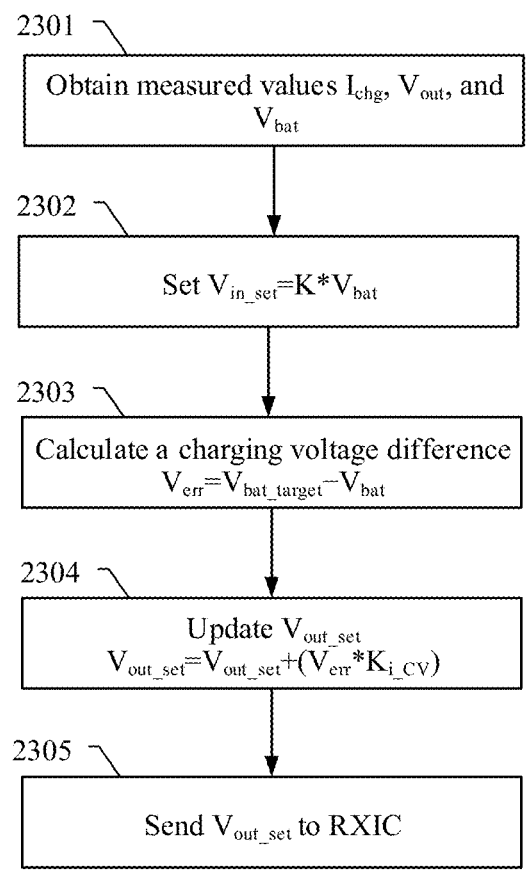
FIG. 23 is a diagram of a $V_{in}$ stepwise regulation+ frequency modulation control policy that is of an SC CV phase and that corresponds to a device architecture according to Device Embodiments 1 to 3 of this application.

FIG. 23 is a diagram of a $V_{in}$ stepwise regulation+frequency modulation control policy that is of an SC CV phase and that corresponds to a device architecture according to Device Embodiments 1 to 3 of this application.

The control implementation block diagram shown in FIG. 23 mainly includes the following steps:

Step 2301: A controller AP obtains a charging current $I_{chg}$ of a battery Bat, an input voltage $V_{out}$ of a charger W, and a charging voltage $V_{bat}$ of the battery that are obtained through measurement.

Step 2302: Set a configured input voltage value $V_{in\_set}$ of a wireless electric energy transmitter by using a voltage coefficient K corresponding to required charging power of a receive end 102 and the charging voltage $V_{bat}$ of the battery. Specifically, $V_{in\_set}=K*V_{bat}$.

Step 2303: The controller AP obtains a voltage difference $V_{err}$ between a target charging voltage $V_{bat\_target}$ and the charging voltage $V_{bat}$ of the battery.

Step 2304: The controller AP regulates a configured input voltage value $V_{out\_set}$ of the charger by multiplying the voltage difference $V_{err}$ by a preset voltage regulation ratio $K_{i\_cv}$ and using a product ($V_{err}*K_{i\_cv}$) as an input voltage regulation amount of the charger. Specifically, $V_{out\_set}$ is added to the input voltage regulation amount ($V_{err}*K_{i\_cv}$), to update $V_{out\_set}$ to obtain regulated (namely, updated) $V_{out\_set}$.

Step 2305: Send the regulated configured input voltage value $V_{out\_set}$ of the charger to a wireless electric energy receiver RXIC.

A control parameter in this embodiment includes the input voltage $V_{out}$ of the charger W. After the controller AP sends $V_{out\_set}$ to RXIC, with reference to $V_{in\_set}$ stepwise regulated based on the voltage coefficient K, a transmit end 101 can provide, by modulating a working frequency of a system, power that matches the power required by the receive end 102, to implement adaption and matching between the transmit end 101 and the receive end 102.

It should be noted that, when $V_{out\_set}$ is regulated in step 2304, the preset voltage regulation ratio $K_{i\_cv}$ in the input voltage regulation amount of the charger is related to a wireless charging system architecture, power of the transmit end 101, and the required charging power of the receive end 102; and the voltage coefficient K is also related to the wireless charging system architecture, the power of the transmit end 101, and the required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cv}$ is a preset voltage regulation ratio used in step 2304 when the power of the transmit end 101 is greater than a second power threshold of the transmit end and the required charging power of the receive end 102 is greater than the second power threshold of the receive end, and the voltage coefficient K is a voltage coefficient used in step 2302 when the power of the transmit end 101 is greater than the second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end; and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset voltage regulation ratio used in step 2304 and a voltage coefficient used in step 2302 when the required charging power of the receive end 102 is greater than the second power threshold of the receive end and is less than the third power threshold of the receive end are $K_{i\_cv}=K_{i\_cv}1$ and K=K1; and a preset voltage regulation ratio used in step 2304 and a voltage coefficient used in step 2302 when the required charging power of the receive end 102 is greater than the third power threshold of the receive end are $K_{i\_cv}=K_{i\_cv}2$ and K=K2. $K_{i\_cc}1$ is not equal to $K_{i\_cc}2$, and K1 is not equal to K2.

Device Embodiment 22

This embodiment mainly describes a second specific implementation in which a controller of a receive end uses a second control policy (Vin stepwise regulation+frequency modulation) when an open-loop DC-DC converter decreases voltage in a constant voltage step-down phase.

In this embodiment, the controller AP is further configured to: obtain a configured input voltage value $V_{in\_set}$ of a wireless electric energy transmitter based on required charging power, and send the configured input voltage value $V_{in\_set}$ of the wireless electric energy transmitter to a transmit end 101, so that an input voltage $V_{in}$ of the wireless electric energy transmitter is regulated to the configured input voltage value $V_{in\_set}$ of the wireless electric energy transmitter.

In this embodiment, the input voltage $V_{in}$ of the wireless electric energy transmitter is of a stepwise regulatable type. The controller AP is configured to obtain a voltage coefficient K corresponding to the required charging power, and obtain the configured input voltage value $V_{in\_set}$ of the wireless electric energy transmitter based on the voltage coefficient K and a charging voltage $V_{bat}$ of a battery.

Figure 24:
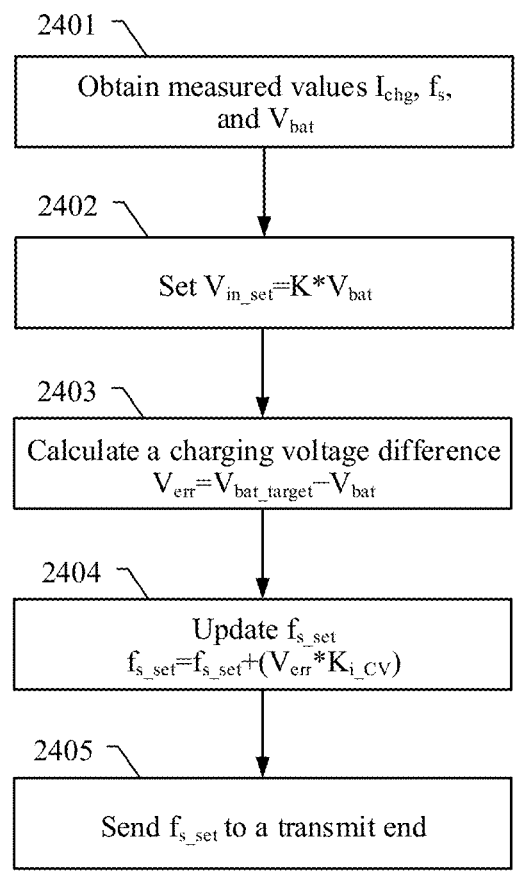
FIG. 24 is a diagram of a $V_{in}$ stepwise regulation+ frequency modulation control policy that is of an SC CV phase and that corresponds to a device architecture according to Device Embodiments 1 to 3 of this application.

FIG. 24 is a schematic diagram of a control policy according to this embodiment.

The control implementation block diagram shown in FIG. 24 mainly includes the following steps:

Step 2401: A controller AP obtains a charging current $I_{chg}$ of a battery Bat, a working frequency $f_s$ of a wireless charging system, and a charging voltage $V_{bat}$ of the battery that are obtained through measurement.

Step 2402: Set a configured input voltage value $V_{in\_set}$ of a wireless electric energy transmitter by using a voltage coefficient K corresponding to required charging power of a receive end 102 and the charging voltage $V_{bat}$ of the battery.

Specifically, $V_{in\_set}=K*V_{bat}$.

Step 2403: The controller AP obtains a voltage difference $V_{err}$ between a target charging voltage $V_{bat\_target}$ and the charging voltage $V_{bat}$ of the battery.

Step 2404: The controller AP modulates a working frequency setting value of the wireless charging system by multiplying the voltage difference $V_{err}$ by a preset voltage regulation ratio $K_{i\_cv}$ and using a product ($V_{err}*K_{i\_cv}$) as a working frequency modulation amount of the wireless charging system.

Specifically, the frequency value obtained in step 2401 is added to the working frequency modulation amount ($V_{err}*K_{i\_cv}$), to update $f_{s\_set}$ to obtain modulated (namely, updated) $f_{s\_set}$.

Step 2405: Send the modulated working frequency setting value $f_{s\_set}$ to a wireless electric energy transmitter.

This step may be specifically implemented through in-band communication, or may be implemented through out-of-band communication.

A control parameter in this embodiment includes the working frequency $f_s$ of the wireless charging system. For a transmit end 101, the transmit end 101 may modulate the working frequency of the system to $f_{s\_set}$ with reference to stepwise regulated $V_{in\_set}$ and based on $f_{s\_set}$, to regulate $V_{out}$. In this embodiment, the entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that, when $f_{s\_set}$ is regulated in step 2404, the preset voltage regulation ratio $K_{i\_cv}$ in the working frequency modulation amount of the wireless charging system is related to a wireless charging system architecture, power of the transmit end 101, and the required charging power of the receive end 102; and the voltage coefficient K is also related to the wireless charging system architecture, the power of the transmit end 101, and the required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cv}$ is a preset voltage regulation ratio used in step 2404 when the power of the transmit end 101 is greater than a second power threshold of the transmit end and the required charging power of the receive end 102 is greater than the second power threshold of the receive end, and the voltage coefficient K is a voltage coefficient used in step 2402 when the power of the transmit end 101 is greater than the second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end; and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset voltage regulation ratio used in step 2404 and a voltage coefficient used in step 2402 when the required charging power of the receive end 102 is greater than the second power threshold of the receive end and is less than the third power threshold of the receive end are $K_{i\_cv}=K_{i\_cv}1$ and K=K1; and a preset voltage regulation ratio used in step 2404 and a voltage coefficient used in step 2402 when the required charging power of the receive end 102 is greater than the third power threshold of the receive end are $K_{i\_cv}=K_{i\_cv}2$ and K=K2. $K_{i\_cc}1$ is not equal to $K_{i\_cc}2$, and K1 is not equal to K2.

Device Embodiment 23

This embodiment mainly describes a first specific implementation in which a controller of a receive end uses a third control policy (Vin regulation+constant frequency) when an open-loop DC-DC converter decreases voltage in a constant voltage step-down phase.

A control parameter in this embodiment includes an input voltage $V_{out}$ of a charger W. For the control policy in this embodiment, refer to FIG. 21. After performing related operations as shown in FIG. 21, the controller AP finally specifically sends updated $V_{out\_set}$ to RXIC.

Compared with the foregoing Device Embodiment 19, a difference in this embodiment lies in that in this embodiment, after the controller AP sends $V_{out\_set}$ to the wireless electric energy receiver RXIC, a transmit end 101 mainly regulates an input voltage $V_{in}$ of a wireless electric energy transmitter to control and regulate a charging voltage of a battery. However, in Device Embodiment 19, the transmit end 101 mainly modulates the working frequency $f_s$ of the wireless charging system to control and regulate the charging voltage of the battery.

Device Embodiment 24

This embodiment mainly describes a second specific implementation in which a controller of a receive end uses a third control policy (Vin regulation+constant frequency) when an open-loop DC-DC converter decreases voltage in a constant voltage step-down phase.

A control parameter in this embodiment includes an input voltage $V_{in}$ of a wireless electric energy transmitter.

Figure 25:
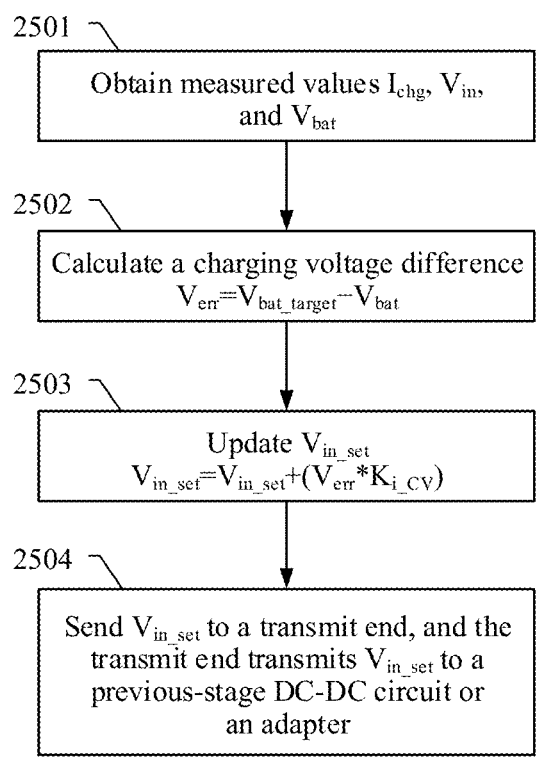
FIG. 25 is a diagram of a $V_{in}$ regulation+constant frequency control policy that is of an SC CV phase and that corresponds to a device architecture according to Device Embodiments 1 to 3 of this application.

FIG. 25 is a diagram of a $V_{in}$ regulation+constant frequency control policy that is of an SC CV phase and that corresponds to a device architecture according to Device Embodiments 1 to 3 of this application.

The control implementation block diagram shown in FIG. 25 mainly includes the following steps:

Step 2501: A controller AP obtains a charging current $I_{chg}$ of a battery Bat, an input voltage $V_{in}$ of a wireless electric energy transmitter, and a charging voltage $V_{bat}$ of the battery that are obtained through measurement.

Step 2502: The controller AP obtains a voltage difference $V_{err}$ between a target charging voltage $V_{bat\_target}$ and the charging voltage $V_{bat}$ of the battery.

Step 2503: The controller AP regulates a configured input voltage value $V_{in\_set}$ of the wireless electric energy transmitter by multiplying the voltage difference $V_{err}$ by a preset voltage regulation ratio $K_{i\_cv}$ and using a product ($V_{err}*K_{i\_cv}$) as an input voltage regulation amount of the wireless electric energy transmitter.

Specifically, $V_{in\_set}$ is added to the input voltage regulation amount ($V_{err}*K_{i\_cv}$) of the wireless electric energy transmitter, to update $V_{in\_set}$ to obtain regulated (namely, updated) $V_{in\_set}$.

Step 2504: The controller AP sends the regulated configured input voltage value $V_{in\_set}$ of the wireless electric energy transmitter to a transmit end 101, and the transmit end 101 transmits $V_{in\_set}$ to a previous-stage DC-DC circuit or an adapter 100, to regulate $V_{in}$.

In an entire wireless charging system, $V_{out}$ can be further regulated by regulating $V_{in}$. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that, when $V_{in\_set}$ is regulated in step 2503, the preset voltage regulation ratio $K_{i\_cv}$ in the input voltage regulation amount of the wireless electric energy transmitter is related to a wireless charging system architecture, power of the transmit end 101, and required charging power of the receive end 102.

For the receive end 102 shown in FIG. 3, only when required charging power of the receive end 102 is greater than a second power threshold of the receive end, a second charger W2 (including an open-loop DC-DC charger) has an opportunity to be controlled by a controller AP in a constant current step-down phase and a constant voltage step-down phase, to perform direct current step-down working. In this case, $K_{i\_cv}$ is a preset voltage regulation ratio used in step 2503 when power of a transmit end 101 is greater than a second power threshold of the transmit end and the required charging power of the receive end 102 is greater than the second power threshold of the receive end.

For the receive end 102 shown in FIG. 6, when required charging power of the receive end 102 is greater than a second power threshold of the receive end, including two cases: the required charging power of the receive end 102 is greater than the second power threshold of the receive end and is less than a third power threshold of the receive end; and the required charging power of the receive end 102 is greater than the third power threshold of the receive end, a second charger W2 (including an open-loop DC-DC charger) has an opportunity to be controlled by a controller AP in a constant current step-down phase and a constant voltage step-down phase, to perform direct current step-down working. A preset voltage regulation ratio used in step 2503 when the required charging power of the receive end 102 is greater than the second power threshold of the receive end and is less than the third power threshold of the receive end is $K_{i\_cv}=K_{i\_cv}1$; and a preset voltage regulation ratio used in step 2503 when the required charging power of the receive end 102 is greater than the third power threshold of the receive end is $K_{i\_cv}=K_{i\_cv}2$. $K_{i\_cv}1$ is not equal to $K_{i\_cv}2$.

Device Embodiment 25

This embodiment mainly describes a third specific implementation in which a controller of a receive end uses a third control policy (Vin regulation+constant frequency) when an open-loop DC-DC converter decreases voltage in a constant voltage step-down phase.

A control parameter in this embodiment includes an input voltage $V_{in}$ of a wireless electric energy transmitter.

Figure 26:
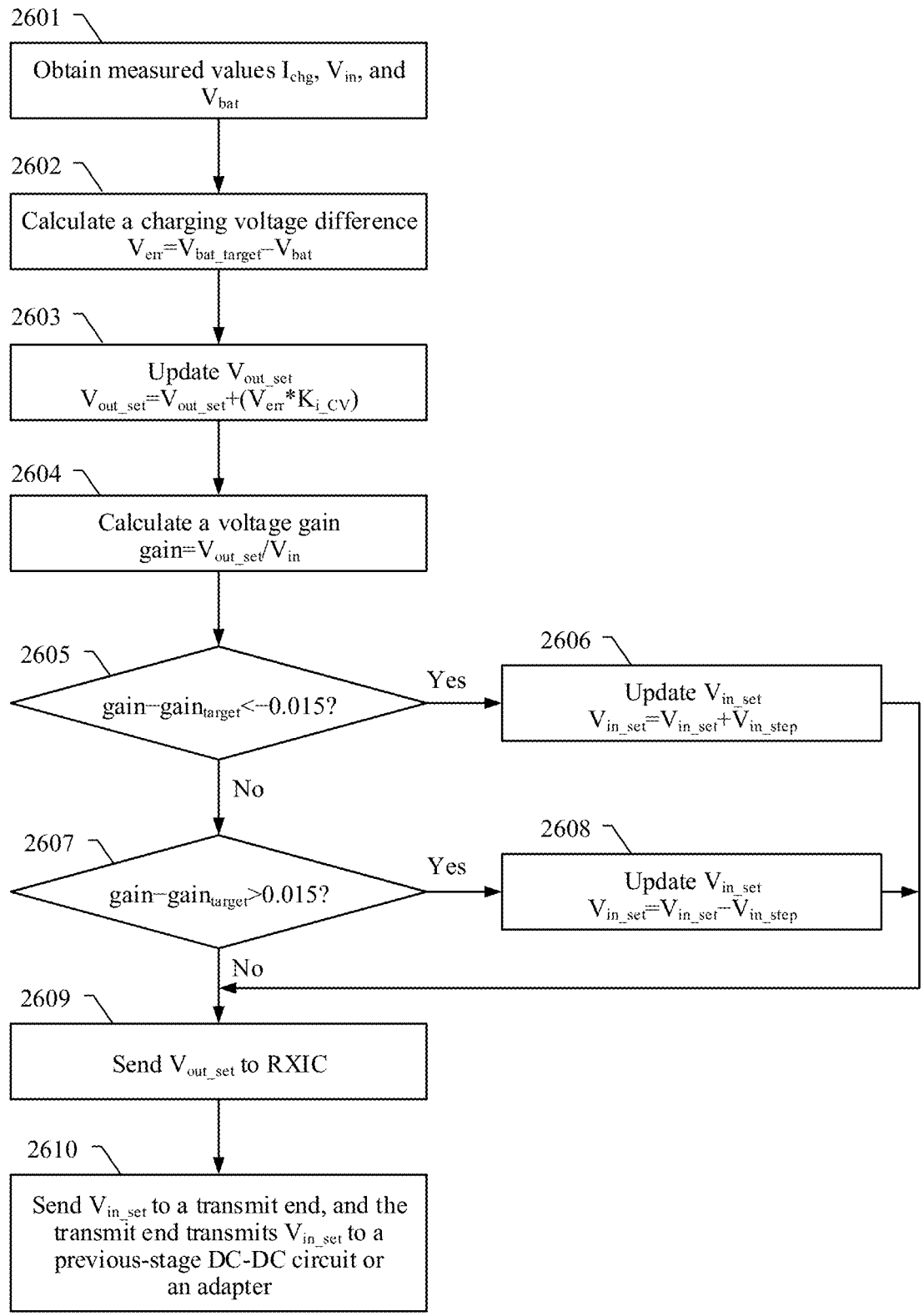
FIG. 26 is a diagram of a $V_{in}$ regulation+constant frequency control policy that is of an SC CV phase and that corresponds to a device architecture according to Device Embodiments 1 to 3 of this application.

FIG. 26 is a diagram of a $V_{in}$ regulation+constant frequency control policy that is of an SC CV phase and that corresponds to a device architecture according to Device Embodiments 1 to 3 of this application.

The control implementation block diagram shown in FIG. 26 mainly includes the following steps:

Step 2601: A controller AP obtains a charging current $I_{chg}$ of a battery Bat, an input voltage $V_{in}$ of a wireless electric energy transmitter, and a charging voltage $V_{bat}$ of the battery that are obtained through measurement.

Step 2602: The controller AP obtains a voltage difference $V_{err}$ between a target charging voltage $V_{bat\_target}$ and the charging voltage $V_{bat}$ of the battery.

Step 2603: The controller AP regulates a configured input voltage value $V_{out\_set}$ of a charger by multiplying the voltage difference $V_{err}$ by a preset voltage regulation ratio $K_{i\_cv}$ and using a product ($V_{err}*K_{i\_cv}$) as an input voltage regulation amount of the charger. Specifically, $V_{out\_set}$ is added to the input voltage regulation amount ($V_{err}*K_{i\_cv}$), to update $V_{out\_set}$ to obtain regulated (namely, updated) $V_{out\_set}$.

Step 2604: The controller obtains a voltage gain gain by using the input voltage $V_{in}$ of the wireless electric energy transmitter and the regulated configured input voltage value $V_{out\_set}$ of the charger.

Specifically, gain=$V_{out\_set}/V_{in}$.

The following process is described in steps 2605 to 2608:

When it is determined that the voltage gain gain falls outside a preset gain range (in FIG. 18, as an example, the preset gain range is [gain$_{target}$−0.015, gain$_{target}$+0.015]), a configured input voltage value $V_{in\_set}$ of the wireless electric energy transmitter is regulated.

In this embodiment, the target gain gain$_{target}$ may be a system gain of a fixed frequency of a wireless charging system at a corresponding space location and load. After the regulation in steps 2605 to 2608, the voltage gain gain can approach to the target gain gain$_{target}$, to help keep the wireless charging system working at the fixed frequency.

Specifically, according to steps 2605 and 2606, if it is determined, in step 2605, that a difference between the voltage gain gain and the target gain gain$_{target}$ is less than −0.015, step 2606 is performed, that is, the configured input voltage value $V_{in\_set}$ of the wireless electric energy transmitter is increased by a second preset voltage step $V_{in\_step}$, to up date $V_{in\_set}$.

Specifically, according to steps 2607 and 2608, if it is determined, in step 2607, that a difference between the voltage gain gain and the target gain gain$_{target}$ is greater than 0.015, step 2608 is performed, that is, the configured input voltage value $V_{in\_set}$ of the wireless electric energy transmitter is decreased by the second preset voltage step $V_{in\_step}$, to up date $V_{in\_set}$.

Then, step 2609 and step 2610 are performed.

Step 2609: The controller AP sends the regulated configured input voltage value $V_{out\_set}$ of the charger to a wireless electric energy receiver RXIC.

Step 2610: The controller AP sends an updated configured input voltage value $V_{in\_set}$ of the wireless electric energy transmitter to a transmit end 101, and the transmit end 101 sends $V_{in\_set}$ to a previous-stage DC-DC circuit or an adapter 100.

The wireless electric energy transmitter transmits $V_{in\_set}$ to the previous-stage DC-DC circuit or the adapter 100, to regulate $V_{in}$. In the entire wireless charging system, $V_{out}$ can be further regulated by regulating yin. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that in this embodiment, a relative execution sequence of step 2609 and step 2610 is not limited, and a relative execution sequence of step 2605 and step 2607 is also not limited.

Device Embodiment 26

This embodiment mainly describes a fourth specific implementation in which a controller of a receive end uses a third control policy (Vin regulation+constant frequency) when an open-loop DC-DC converter decreases voltage in a constant voltage step-down phase.

A control parameter in this embodiment includes an input voltage $V_{in}$ of a wireless electric energy transmitter.

Figure 27:
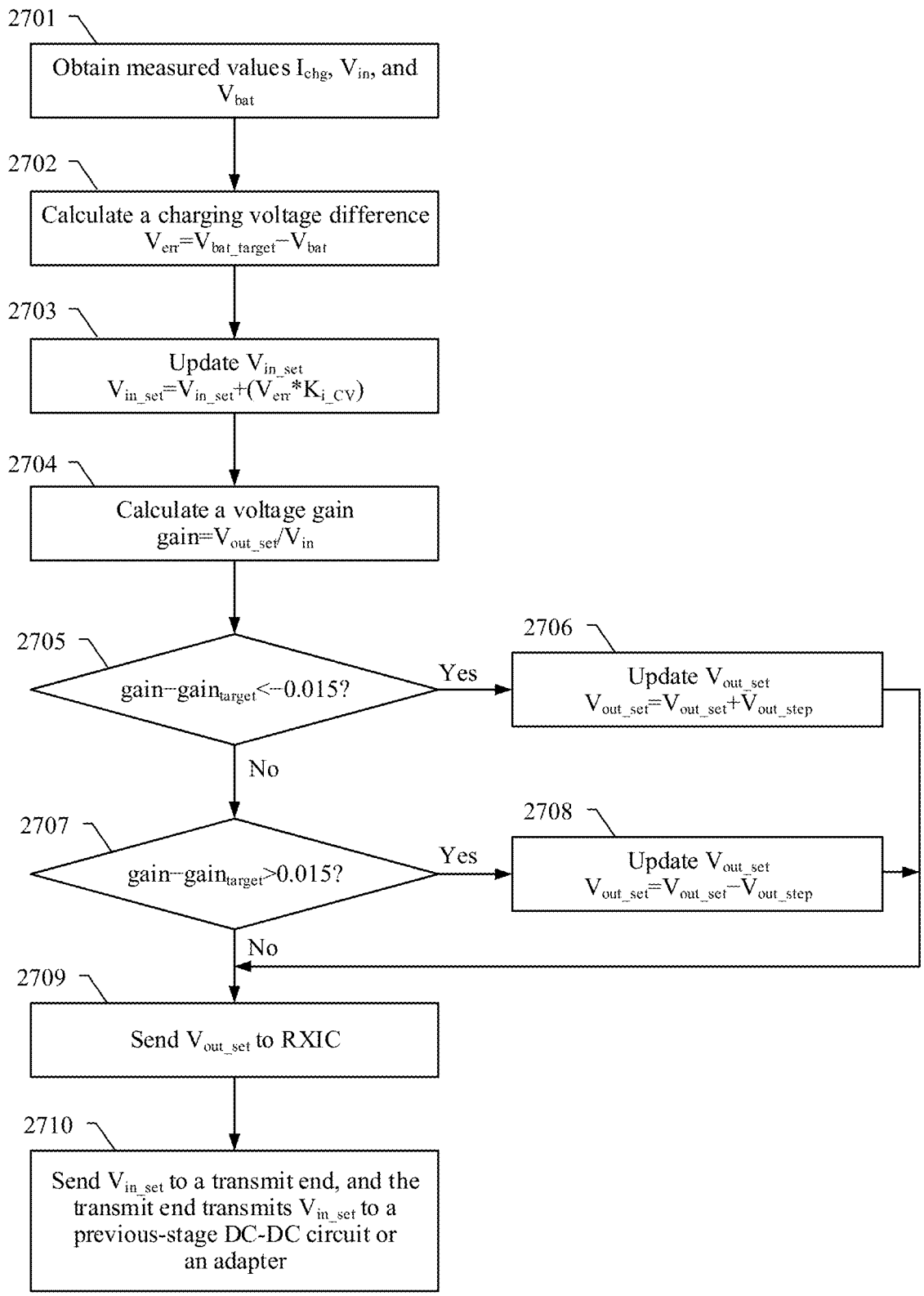
FIG. 27 is a diagram of a $V_{in}$ regulation+constant frequency control policy that is of an SC CV phase and that corresponds to a device architecture according to Device Embodiments 1 to 3 of this application.

FIG. 27 is a diagram of a $V_{in}$ regulation+constant frequency control policy that is of an SC CV phase and that corresponds to a device architecture according to Device Embodiments 1 to 3 of this application.

The control implementation block diagram shown in FIG. 27 mainly includes the following steps:

Step 2701: A controller AP obtains a charging current $I_{chg}$ of a battery Bat, an input voltage $V_{in}$ of a wireless electric energy transmitter, and a charging voltage $V_{bat}$ of the battery that are obtained through measurement.

Step 2702: The controller AP obtains a voltage difference $V_{err}$ between a target charging voltage $V_{bat\_target}$ and the charging voltage $V_{bat}$ of the battery.

Step 2703: The controller AP regulates a configured input voltage value $V_{in\_set}$ of the wireless electric energy transmitter by multiplying the voltage difference $V_{err}$ by a preset voltage regulation ratio $K_{i\_cv}$ and using a product $(V_{err}*K_{i\_cv})$ as an input voltage regulation amount of the wireless electric energy transmitter.

Specifically, $V_{in\_set}$ is added to the input voltage regulation amount $(V_{err}*K_{i\_cv})$, to update $V_{in\_set}$ to obtain regulated (namely, updated) $V_{in\_set}$.

Step 2704: The controller AP obtains a voltage gain gain by using a configured input voltage value $V_{out\_set}$ of a charger and the regulated configured input voltage value $V_{in\_set}$ of the wireless electric energy transmitter.

Specifically, gain=$V_{out\_set}/V_{in\_set}$.

The following process is described in steps 2705 to 2708:

When it is determined that the voltage gain gain falls outside a preset gain range (in FIG. 27, as an example, the preset gain range is [$gain_{target}$−0.015, $gain_{target}$+0.015]), the configured input voltage value $V_{out\_set}$ of the charger W is regulated.

In this embodiment, the target gain $gain_{target}$ may be a system gain of a fixed frequency of a wireless charging system at a corresponding space location and load. After the regulation in steps 2705 to 2708, the voltage gain gain can approach to the target gain $gain_{target}$, to help keep the wireless charging system working at the fixed frequency.

Specifically, according to steps 2705 and 2706, if it is determined, in step 2705, that a difference between the voltage gain gain and the target gain $gain_{target}$ is less than −0.015, step 2706 is performed, that is, the configured input voltage value $V_{out\_set}$ of the charger W is increased by a first preset voltage step $V_{out\_step}$, to update $V_{out\_set}$.

Specifically, according to steps 2707 and 2708, if it is determined, in step 2707, that a difference between the voltage gain gain and the target gain $gain_{target}$ is greater than 0.015, step 2708 is performed, that is, the configured input voltage value $V_{out\_set}$ of the charger W is decreased by the first preset voltage step $V_{out\_step}$, to update $V_{out\_set}$.

Then, step 2709 and step 2710 are performed.

Step 2709: The controller AP sends a regulated configured input voltage value $V_{out\_set}$ of the charger to a wireless electric energy receiver RXIC.

Step 2710: The controller AP sends the updated configured input voltage value $V_{in\_set}$ of the wireless electric energy transmitter to a transmit end 101, and the transmit end 101 sends $V_{in\_set}$ to a previous-stage DC-DC circuit or an adapter 100.

The wireless electric energy transmitter transmits $V_{in\_set}$ to the previous-stage DC-DC circuit or the adapter 100, to regulate $V_{in}$. In the entire wireless charging system, $V_{out}$ can be further regulated by regulating yin. In this embodiment, an entire receive end 102 is used as a control object to implement large closed-loop control from the battery Bat to the transmit end 101. Matching between the receive end 102 and the transmit end 101 in a wireless charging process is improved through large closed-loop control, to improve working efficiency of the transmit end 101, and improve wireless charging efficiency in a fast charging phase.

It should be noted that in this embodiment, a relative execution sequence of step 2709 and step 2710 is not limited, and a relative execution sequence of step 2705 and step 2707 is also not limited.

In this application, the current adjustment ratios $K_{i\_cc}$ described in the embodiments may have a same dimension, or may have different dimensions. A specific dimension and unit meet a requirement of a formula to which the current adjustment ratio belongs. For example, in FIG. 9, a unit of $I_{err}*K_{i\_cc}$ is the same as a unit of the configured input voltage value $V_{out\_set}$ of the charger. For example, in FIG. 11, a unit of $I_{err}*K_{i\_cc}$ is the same as a unit of the working frequency of the system. In addition, the voltage regulation ratios $K_{i\_cv}$ described in the embodiments may have a same dimension, or may have different dimensions. A specific dimension and unit meet a requirement of a formula to which the voltage regulation ratio belongs. For example, in FIG. 21, a unit of $V_{err}*K_{i\_cv}$ is the same as a unit of the configured input voltage value $V_{out\_set}$ of the charger. For example, in FIG. 22, a unit of $V_{err}*K_{i\_cv}$ is the same as a unit of the working frequency of the system.

It can be learned from the foregoing embodiments that, in the wirelessly charged electronic device (that is, the receive end 102) provided in this application, the battery Bat of the electronic device 102 is wirelessly fast charged only when both the power of the transmit end 101 and the required charging power of the receive end 102 meet set requirements. Therefore, both actual statues of the transmit end 101 and the receive end 102 are considered, so that implementation of fast charging can be better controlled. A better charging effect may be provided for the receive end 102, and charging efficiency of the transmit end 102 may be considered, so that organic combination of the transmit end 101 and the receive end 102 is essentially implemented.

In an actual application, the electronic device 102 may be charged by using a plurality of charging control policies. Power capabilities that can be provided by different transmit ends 101 may be different. During specific implementation, according to the electronic device 102 provided in the device embodiments of this application, a proper charging control policy may be selected based on a real-time charging power requirement of the receive end 102 and a power capability that can be provided by the transmit end 101, to charge the electronic device 102. Therefore, the electronic device 102 provided in the embodiments of this application can match a plurality of transmit ends 101 of different power types, and can be charged at a stable charging current or a stable charging voltage in a fast charging phase.

The foregoing charging control policies may be stored in a memory (not shown in the accompanying drawings of this application) of the wirelessly charged electronic device 102 in a program form, and the controller AP may select different charging control policies based on different charging requirements, to implement fast charging.

Based on the wirelessly charged electronic device provided in the foregoing embodiments, the embodiments of this application further provide a wireless charging method, applied to wirelessly charging the electronic device provided in the foregoing embodiments. For a schematic diagram of the electronic device, refer to the accompanying drawings corresponding to the foregoing embodiments. The following describes the method in detail with reference to an accompanying drawing.

Method Embodiment

Figure 28:
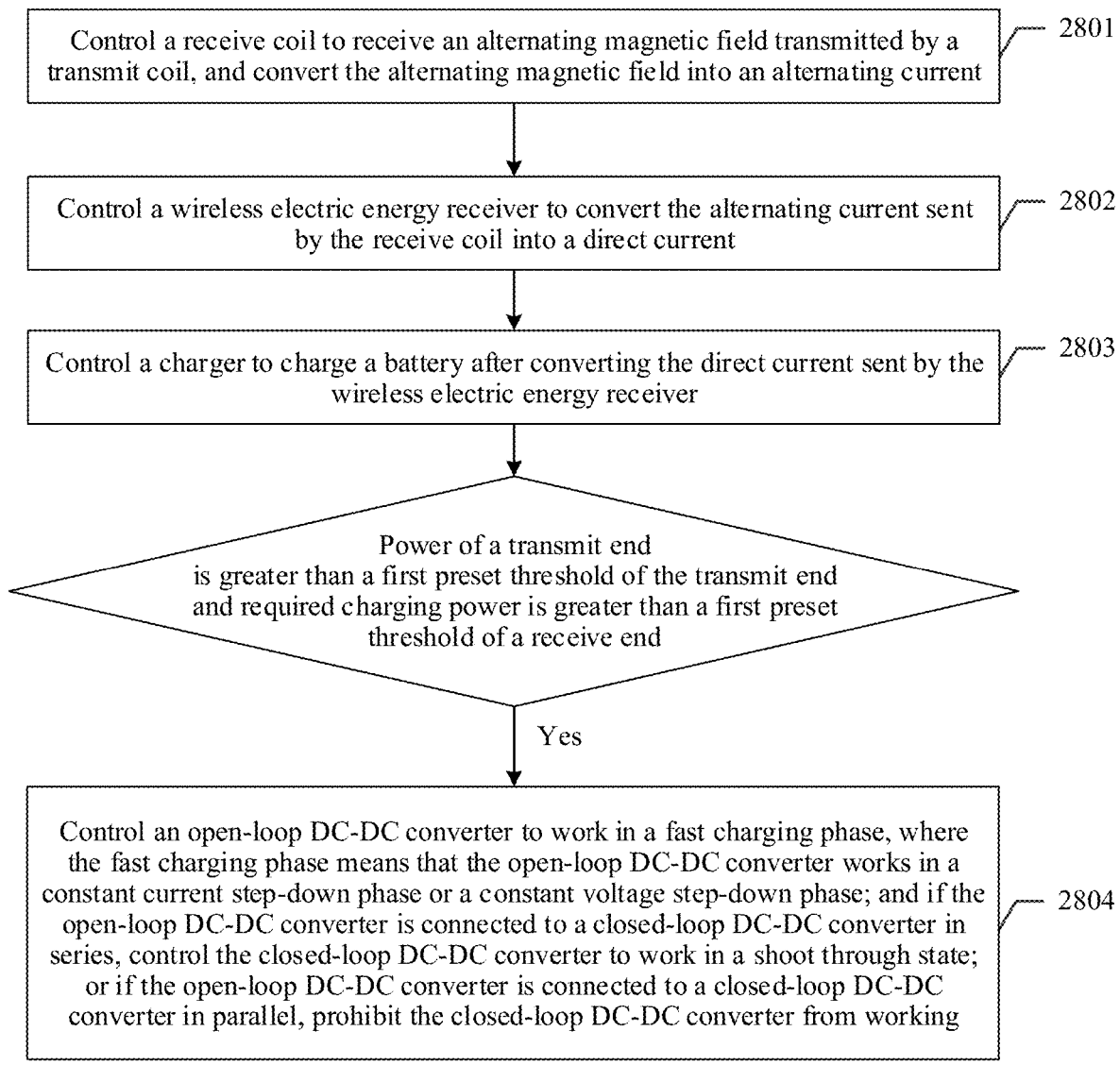
FIG. 28 is a flowchart of a wireless charging method according to a method embodiment of this application.

FIG. 28 is a flowchart of a wireless charging method according to an embodiment of this application.

It should be noted that any method provided in this embodiment of this application is applied to the electronic device described in the foregoing embodiments, and the method is executed by a controller in the electronic device. A charger included in the electronic device includes both an open-loop DC-DC converter and a closed-loop DC-DC converter. In addition, the open-loop DC-DC converter and the closed-loop DC-DC converter may be connected in series or in parallel. This embodiment of this application describes only a process of fast charging the electronic device by using the method, and does not include a slow charging process or a trickle charging process.

The wireless charging method provided in this embodiment is applied to wirelessly charging the electronic device, and includes the following steps:

Step 2801: Control a receive coil to receive an alternating magnetic field transmitted by a transmit coil, and convert the alternating magnetic field into an alternating current.

Step 2802: Control a wireless electric energy receiver to convert the alternating current sent by the receive coil into a direct current.

Step 2803: Control the charger to charge a battery after converting the direct current sent by the wireless electric energy receiver.

Step 2804: When power of a transmit end is greater than a first preset threshold of the transmit end and required charging power is greater than a first preset threshold of a receive end, control the open-loop DC-DC converter to work in a fast charging phase, including: controlling the open-loop DC-DC converter to work in a constant current step-down phase to charge the battery at a constant current, or controlling the open-loop DC-DC converter to work in a constant voltage step-down phase to charge the battery at a constant voltage.

During specific implementation of step 2804, a charging parameter of the open-loop DC-DC converter may be compared with a target parameter to obtain a control parameter, and the open-loop DC-DC converter may be controlled, based on the control parameter, to work in the constant current step-down phase or the constant voltage step-down phase.

When the power of the transmit end is greater than the first preset threshold of the transmit end and the required charging power is greater than the first preset threshold of the receive end, it indicates that the receive end needs to be fast charged. Therefore, regardless of whether the open-loop DC-DC converter is connected to the closed-loop DC-DC converter in series or the open-loop DC-DC converter is connected to the closed-loop DC-DC converter in parallel, the open-loop DC-DC converter works in a step-down phase.

For the receive end structure described in the foregoing Device Embodiment 1, the open-loop DC-DC converter is connected to the closed-loop DC-DC converter in series, and in the method in this embodiment, in the fast charging phase, the closed-loop DC-DC converter is controlled to work in a shoot through state.

For the receive end structures described in the foregoing Device Embodiment 2 and Device Embodiment 3, the open-loop DC-DC converter is connected to the closed-loop DC-DC converter in parallel, and in the method in this embodiment, in the fast charging phase, the closed-loop DC-DC converter is prohibited from working.

The fast charging phase includes the constant voltage step-down phase and the constant current step-down phase. The charging parameter of the open-loop DC-DC converter is a voltage in the constant voltage step-down phase, and is a current in the constant current step-down phase.

In the method provided in this embodiment of this application, for the constant current step-down phase, the controller AP can control, based on the control parameter at power that can be provided by the transmit end 101, the open-loop DC-DC converter to perform constant current step-down to charge the battery Bat of the receive end 102; and for the constant voltage step-down phase, the controller AP can control, based on the control parameter at power that can be provided by the transmit end 101, the open-loop DC-DC converter to perform constant voltage step-down to charge the battery Bat of the receive end 102. It can be learned that, in the technical solution of this application, working efficiency of the transmit end 101 is improved, and a degree of cooperation between the receive end 102 and the transmit end 101 is improved, thereby effectively improving wireless charging efficiency of the receive end 102.

The following separately describes a charging method in the constant current step-down phase and a charging method in the constant voltage step-down phase.

First, the charging method in the constant current step-down phase is described.

This embodiment provides a plurality of charging methods in the constant current step-down phase, and different charging manners may be selected based on the power of the transmit end and the required power of the receive end. For example, when an adjustment manner of the transmit end is frequency modulation, the receive end may implement constant current charging in a frequency modulation manner. When an adjustment manner of the transmit end is voltage regulation, the receive end may implement constant current charging in a voltage regulation manner. When an adjustment manner of the transmit end may be frequency modulation and voltage regulation, the receive end may implement constant current charging through frequency modulation and voltage regulation. In addition, the voltage regulation may be classified into two types: graded regulation and stepwise regulation, and the graded regulation means that a voltage can be regulated only in several fixed grades, such as 5 V, 9 V, and 12 V. The stepwise voltage regulation means that a voltage can be regulated based on a proportional coefficient, and there are more regulation grades and more regulatable voltages, so that linear regulation is basically implemented.

The following first describes graded voltage regulation+ frequency modulation and stepwise voltage regulation+frequency modulation. Because the graded voltage regulation and the stepwise voltage regulation differ only in a voltage regulation manner, and have same other steps, the following combines the two regulation manners together for description. For details, refer to the descriptions of the electronic device embodiments.

When the open-loop DC-DC converter works in the constant current step-down phase, the charging parameter is a charging current, and the target parameter is a target circuit;

the comparing a charging parameter of the open-loop DC-DC converter with a target parameter to obtain a control parameter specifically includes:

comparing the charging current with the target current, and adjusting the control parameter based on a comparison result, where the control parameter is an input voltage of the charger, a working frequency of a wireless charging system, or an input voltage of a wireless electric energy transmitter; and when the control parameter is the working frequency of the wireless charging system or the input voltage of the wireless electric energy transmitter, the method further includes: sending the control parameter to the transmit end, where the transmit end includes the wireless electric energy transmitter and the transmit coil.

The method further includes: obtaining a configured input voltage value of the wireless electric energy transmitter based on the required charging power, and sending the configured input voltage value of the wireless electric energy transmitter to the transmit end, so that the input voltage of the wireless electric energy transmitter is regulated to the configured input voltage value of the wireless electric energy transmitter.

When the input voltage of the wireless electric energy transmitter is of a stepwise regulatable type, the method further includes: obtaining a voltage coefficient corresponding to the required charging power, and obtaining the configured input voltage value of the wireless electric energy transmitter based on the voltage coefficient and a charging voltage of the battery.

First Method:

The comparing the charging current with the target current, and adjusting the control parameter based on a comparison result specifically includes:

when determining that the charging current is less than a minimum value of an interval corresponding to the target current, increasing the input voltage of the charger by a first preset voltage step; or when determining that the charging current is greater than a maximum value of the interval corresponding to the target current, decreasing the input voltage of the charger by the first preset voltage step, until the charging current falls between the minimum value of the interval corresponding to the target current and the maximum value of the interval corresponding to the target current.

Second Method:

The comparing the charging current with the target current, and adjusting the control parameter based on a comparison result specifically includes:

obtaining a current difference between the target current and the charging current, regulating a configured input voltage value of the charger by multiplying the current difference by a preset current adjustment ratio and using a product as an input voltage regulation amount of the charger, and sending a regulated configured input voltage value of the charger to the wireless electric energy receiver.

Third Method:

The comparing the charging current with the target current, and adjusting the control parameter based on a comparison result specifically includes:

when determining that the charging current is less than a minimum value of an interval corresponding to the target current, increasing the working frequency of the wireless charging system by a preset frequency step; or when determining that the charging current is greater than a maximum value of the interval corresponding to the target current, decreasing the working frequency of the wireless charging system by the preset frequency step, until the charging current falls between the minimum value of the interval corresponding to the target current and the maximum value of the interval corresponding to the target current.

Fourth Method:

The comparing the charging current with the target current, and adjusting the control parameter based on a comparison result specifically includes:

obtaining a current difference between the target current and the charging current, modulating a working frequency setting value of the wireless charging system by multiplying the current difference by a preset current adjustment ratio and using a product as a working frequency modulation amount of the wireless charging system, and sending a modulated working frequency setting value to the transmit end.

The foregoing describes voltage regulation+frequency modulation. The following describes voltage regulation+ constant frequency, that is, only voltage regulation is performed, and frequency modulation is not performed.

First Method:

The comparing the charging current with the target current, and adjusting the control parameter based on a comparison result specifically includes:

when determining that the charging current is less than a minimum value of an interval corresponding to the target current, increasing a configured input voltage value of the wireless electric energy transmitter by a second preset voltage step; or when determining that the charging current is greater than a maximum value of the interval corresponding to the target current, decreasing a configured input voltage value of the wireless electric energy transmitter by the second preset voltage step, until the charging current falls between the minimum value of the interval corresponding to the target current and the maximum value of the interval corresponding to the target current.

Second Method:

The comparing the charging current with the target current, and adjusting the control parameter based on a comparison result specifically includes:

obtaining a current difference between the target current and the charging current, regulating a configured input voltage value of the wireless electric energy transmitter by multiplying the current difference by a preset current adjustment ratio and using a product as an input voltage regulation amount of the wireless electric energy transmitter, and sending a regulated configured input voltage value of the wireless electric energy transmitter to the transmit end.

Third Method:

The comparing the charging current with the target current, and adjusting the control parameter based on a comparison result specifically includes:

obtaining a current difference between the target current and the charging current, and regulating a configured input voltage value of the charger by multiplying the current difference by a preset current adjustment ratio and using a product as an input voltage regulation amount of the charger; obtaining a voltage gain by using the input voltage of the wireless electric energy transmitter and a regulated configured input voltage value of the charger; and when determining that the voltage gain falls outside a preset gain range, regulating a configured input voltage value of the wireless electric energy transmitter, sending a regulated configured input voltage value of the wireless electric energy transmitter to the transmit end, and sending the regulated configured input voltage value of the charger to the wireless electric energy receiver.

Fourth Method:

The comparing the charging current with the target current, and adjusting the control parameter based on a comparison result specifically includes:

obtaining a current difference between the target current and the charging current, and regulating a configured input voltage value of the wireless electric energy transmitter by multiplying the current difference by a preset current adjustment ratio and using a product as an input voltage regulation amount of the wireless electric energy transmitter; obtaining a voltage gain by using the input voltage of the charger and a regulated configured input voltage value of the wireless electric energy transmitter; and when determining that the voltage gain falls outside a preset gain range, regulating a configured input voltage value of the charger, sending a regulated configured input voltage value of the charger to the wireless electric energy receiver, and send the regulated configured input voltage value of the wireless electric energy transmitter to the transmit end.

Fifth Method:

The comparing the charging current with the target current, and adjusting the control parameter based on a comparison result specifically includes:

when determining that the charging current falls outside an interval corresponding to the target current, regulating a configured input voltage value of the charger, and obtaining a gain by using a regulated configured input voltage value of the charger and the input voltage of the wireless electric energy transmitter; and when determining that the gain falls outside a preset gain range, regulating a configured input voltage value of the wireless electric energy transmitter, sending a regulated configured input voltage value of the wireless electric energy transmitter to the transmit end, and sending the regulated configured input voltage value of the charger to the wireless electric energy receiver.

Sixth Method:

The comparing the charging current with the target current, and adjusting the control parameter based on a comparison result specifically includes:

when determining that the charging current falls outside an interval corresponding to the target current, regulating a configured input voltage value of the wireless electric energy transmitter, and obtaining a gain by using the input voltage of the charger and a regulated configured input voltage value of the wireless electric energy transmitter; and when determining that the gain falls outside a preset gain range, regulating a configured input voltage value of the charger, sending the regulated configured input voltage value of the wireless electric energy transmitter to the transmit end, and sending a regulated configured input voltage value of the charger to the wireless electric energy receiver.

The following describes a control method for implementing constant voltage charging.

When the open-loop DC-DC converter works in the constant voltage step-down phase, the charging parameter is a charging voltage of the battery, and the target parameter is a target charging voltage;

the comparing a charging parameter of the open-loop DC-DC converter with a target parameter to obtain a control parameter specifically includes:

comparing the charging voltage of the battery with the target charging voltage, and adjusting the control parameter based on a comparison result, where the control parameter is an input voltage of the charger, a working frequency of a wireless charging system, or an input voltage of a wireless electric energy transmitter; and when the control parameter is the working frequency of the wireless charging system or the input voltage of the wireless electric energy transmitter, the method further includes: sending the control parameter to the transmit end.

First, voltage regulation+frequency modulation is described. Similar to constant current step-down control, the voltage regulation is classified into graded voltage regulation and stepwise voltage regulation, and the two types of voltage regulation correspond to same frequency modulation. The following combines the two manners together for description. For details, refer to the details in the electronic device embodiments.

First Method:

The comparing the charging voltage of the battery with the target charging voltage, and adjusting the control parameter based on a comparison result specifically includes:

obtaining a configured input voltage value of the wireless electric energy transmitter based on the required charging power, and sending the configured input voltage value of the wireless electric energy transmitter to the transmit end, so that the input voltage of the wireless electric energy transmitter is regulated to the configured input voltage value of the wireless electric energy transmitter.

The method further includes: obtaining a configured input voltage value of the wireless electric energy transmitter based on the required charging power, and sending the configured input voltage value of the wireless electric energy transmitter to the transmit end, so that the input voltage of the wireless electric energy transmitter is regulated to the configured input voltage value of the wireless electric energy transmitter.

The method further includes: when the input voltage of the wireless electric energy transmitter is of a graded type, determining a grade of the input voltage of the wireless electric energy transmitter based on the required charging power, and using a voltage value at the grade as the configured input voltage value.

The method further includes: when the input voltage of the wireless electric energy transmitter is of a stepwise regulatable type, obtaining a voltage coefficient corresponding to the required charging power, and obtaining the configured input voltage value of the wireless electric energy transmitter based on the voltage coefficient and the charging voltage of the battery.

Second Method:

The comparing the charging voltage of the battery with the target charging voltage, and adjusting the control parameter based on a comparison result specifically includes:

obtaining a voltage difference between the target charging voltage and the charging voltage of the battery, regulating a configured input voltage value of the charger by multiplying the voltage difference by a preset voltage regulation ratio and using a product as an input voltage regulation amount of the charger, and sending a regulated configured input voltage value of the charger to the wireless electric energy receiver.

Third Method:

The comparing the charging voltage of the battery with the target charging voltage, and adjusting the control parameter based on a comparison result specifically includes:

obtaining a voltage difference between the target charging voltage and the charging voltage of the battery, modulating a working frequency setting value of the wireless charging system by multiplying the voltage difference by a preset voltage regulation ratio and using a product as a working frequency modulation amount of the wireless charging system, and sending a modulated working frequency setting value to the transmit end.

Fourth Method:

The comparing the charging voltage of the battery with the target charging voltage, and adjusting the control parameter based on a comparison result specifically includes:

obtaining a voltage difference between the target charging voltage and the charging voltage of the battery, regulating a configured input voltage value of the wireless electric energy transmitter by multiplying the voltage difference by a preset voltage regulation ratio and using a product as an input voltage regulation amount of the wireless electric energy transmitter, and sending a regulated configured input voltage value of the wireless electric energy transmitter to the transmit end.

Fifth Method:

The comparing the charging voltage of the battery with the target charging voltage, and adjusting the control parameter based on a comparison result specifically includes:

obtaining a voltage difference between the target charging voltage and the charging voltage of the battery, and regulating a configured input voltage value of the charger by multiplying the voltage difference by a preset voltage regulation ratio and using a product as an input voltage regulation amount of the charger; obtaining a voltage gain by using the input voltage of the wireless electric energy transmitter and a regulated configured input voltage value of the charger; and when determining that the voltage gain falls outside a preset gain range, regulating a configured input voltage value of the wireless electric energy transmitter, sending a regulated configured input voltage value of the wireless electric energy transmitter to the transmit end, and sending the regulated configured input voltage value of the charger to the wireless electric energy receiver.

Sixth Method:

The comparing the charging voltage of the battery with the target charging voltage, and adjusting the control parameter based on a comparison result specifically includes:

obtaining a voltage difference between the target charging voltage and the charging voltage of the battery, and regulating a configured input voltage value of the wireless electric energy transmitter by multiplying the voltage difference by a preset voltage regulation ratio and using a product as an input voltage regulation amount of the wireless electric energy transmitter; obtaining a voltage gain by using the input voltage of the charger and a regulated configured input voltage value of the wireless electric energy transmitter; and when determining that the voltage gain falls outside a preset gain range, regulating a configured input voltage value of the charger, sending a regulated configured input voltage value of the charger to the wireless electric energy receiver, and sending the regulated configured input voltage value of the wireless electric energy transmitter to the wireless electric energy transmit end.

The foregoing embodiment provides the wireless charging method, applicable to a charger type in which an open-loop DC-DC converter is connected to a closed-loop DC-DC converter in parallel, and also applicable to a charger type in which an open-loop DC-DC converter is connected to a closed-loop DC-DC converter in series. In addition, regardless of whether the open-loop DC-DC converter is connected to the closed-loop DC-DC converter in series or in parallel, another stage of DC-DC circuit may be further included. For example, when the open-loop DC-DC converter is connected to the closed-loop DC-DC converter in series, one more stage of DC-DC circuit is included, that is, three stages of DC-DC circuits are connected together in serials, where the one more stage of DC-DC circuit may be an open-loop DC-DC circuit or a closed-loop DC-DC circuit. In any one of the foregoing methods, step-down control is performed on the open-loop DC-DC converter in the charger. For control of the closed-loop DC-DC converter, the closed-loop DC-DC converter is only controlled to work in a shoot through mode or a step-down mode. When the closed-loop DC-DC converter is connected in series in the charger, the closed-loop DC-DC converter is controlled to work in the shoot through mode; or when the closed-loop DC-DC converter is connected in parallel in the charger, the closed-loop DC-DC converter is controlled to stop working.

Based on the wirelessly charged electronic device and the wireless charging method provided in the foregoing embodiments, the embodiments of this application further provide a wireless charging system, applied to wirelessly charging the electronic device. For a schematic diagram of the electronic device, refer to the accompanying drawings corresponding to the foregoing device embodiments. The following describes the system in detail with reference to accompanying drawings.

System Embodiment

Figure 29:
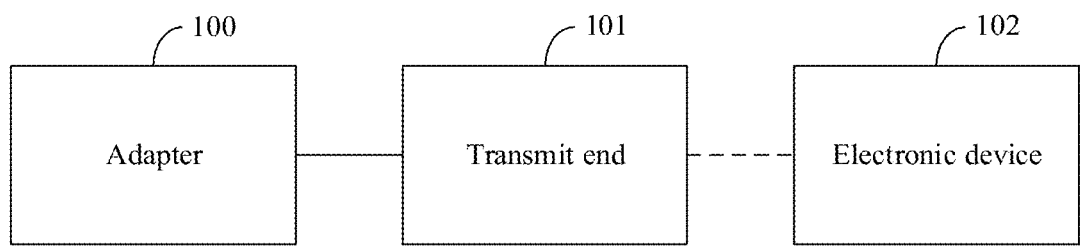
FIG. 29 is a schematic structural diagram of a wireless charging system according to a system embodiment of this application.

FIG. 29 is a schematic diagram of a wireless charging system according to an embodiment of this application.

Figure 30:
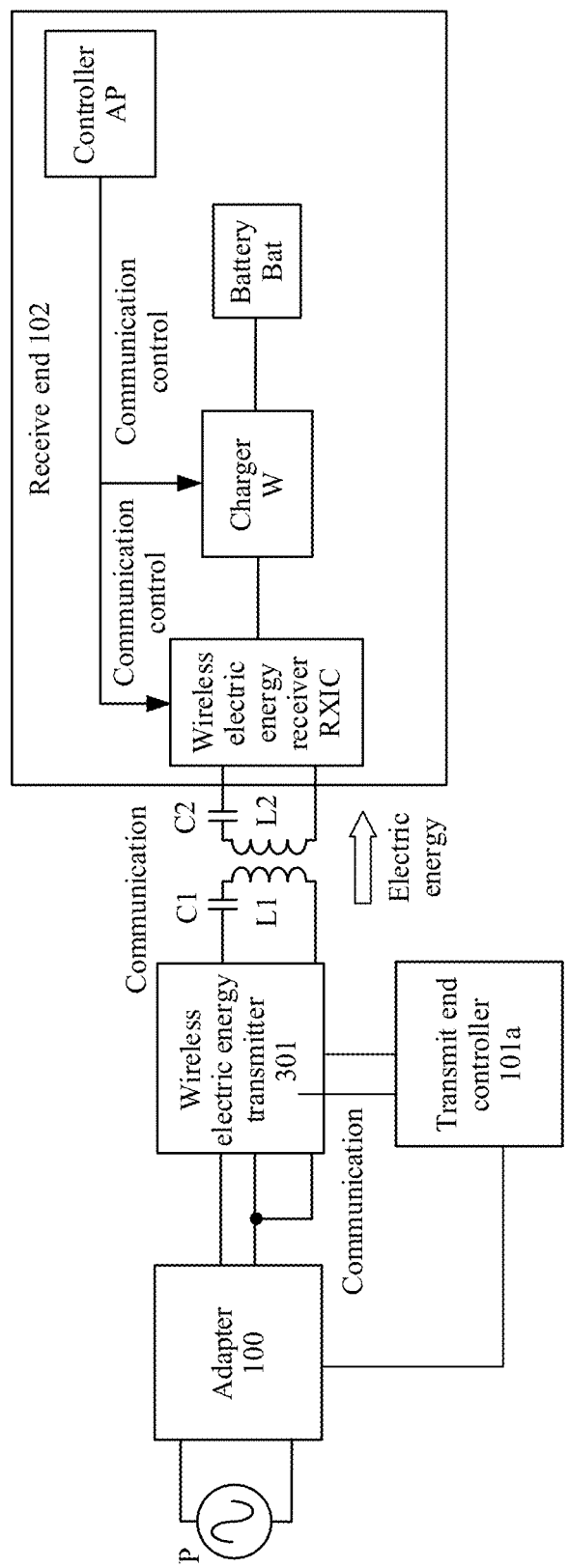
FIG. 30 is a schematic diagram of architecture of a wireless charging system according to a system embodiment of this application.

The wireless charging system provided in this embodiment includes an adapter 100, a transmit end 101, and the electronic device 102 described in the foregoing embodiments. For a specific structure of the transmit end 101, refer to FIG. 30. The specific structure of the transmit end 101 includes a wireless electric energy transmitter 301, a transmit coil L1, and a transmit end controller 101a. The transmit coil L1 and a capacitor C1 constitute a resonant network of the transmit end.

The adapter 100 is configured to convert an alternating current received from an alternating current power supply into a direct current.

The wireless electric energy transmitter 301 is configured to: invert the direct current sent by the adapter 100 into an alternating current, and send the alternating current to the transmit coil L1.

The transmit coil L1 is configured to transmit, in a form of an alternating magnetic field, the alternating current sent by the wireless electric energy transmitter.

The transmit end controller 101a is configured to: obtain power of the transmit end, and send the power of the transmit end to a controller AP of the electronic device.

In the transmit end 101, the wireless electric energy transmitter 301 and the transmit end controller 101a may be integrated together.

In the wireless charging system provided in this embodiment of this application, a battery of the electronic device needs to be wirelessly fast charged only when both the power of the transmit end and required charging power of the receive end meet set requirements. Therefore, both actual statues of the transmit end and the receive end are considered, so that implementation of fast charging can be better controlled. A better charging effect may be provided for the receive end, and charging efficiency of the transmit end may be considered, so that organic combination of the transmit end and the receive end is essentially implemented.

The fast charging includes constant current step-down fast charging and constant voltage step-down fast charging. Both the constant current fast charging and the constant voltage fast charging may be implemented through frequency modulation, or may be implemented through voltage regulation.

The voltage regulation may be regulating an input voltage of a charger, or may be regulating an input voltage of the wireless electric energy transmitter. When the input voltage of the wireless electric energy transmitter is regulated, large closed-loop control from the receive end to the transmit end is implemented.

Specifically, the transmit end controller is further configured to control an output voltage of the adapter based on a configured input voltage value that is of the wireless electric energy transmitter and that is sent by the controller of the electronic device, so that the input voltage of the wireless electric energy transmitter reaches the configured input voltage value of the wireless electric energy transmitter.

In addition, the frequency modulation is modulating a working frequency of the wireless charging system, and the modulation needs to be implemented by the transmit end controller.

Specifically, the transmit end controller is further configured to control, based on a working frequency setting value sent by the controller of the electronic device, the wireless charging system to work at the working frequency setting value.

In addition, because different types of transmit ends may correspond to different voltage regulation types, the controller of the electronic device is further configured to communicate with the transmit end controller to obtain a regulatable type of the input voltage of the wireless electric energy transmitter, where the regulatable type of the input voltage of the wireless electric energy transmitter includes a graded voltage regulation type and a stepwise regulatable type.

The electronic device includes a plurality of fast charging manners, and the controller of the electronic device can identify a type of the transmit end, so that a fast charging manner that matches the type of the transmit end may be selected based on the type of the transmit end, and the wireless charging system can be fully controlled to work in a better charging mode, thereby improving overall charging efficiency.

The charger in the wireless charging system described in the foregoing embodiment may be any one of the chargers in the electronic device embodiments. This is not specifically limited in this embodiment of this application.

It should be understood that, in this application, "at least one" means one or more, and "a plurality of" means two or more. The term "and/or" is used to describe an association relationship between associated objects, and represents that three relationships may exist. For example, "A and/or B" may represent three cases: Only A exists, only B exists, and both A and B exist, where A and B may be singular or plural. The character "/" generally indicates an "or" relationship between the associated objects. The term "at least one of the following items" or a similar expression means any combination of these items, including any combination of singular items or plural items. For example, at least one of a, b, or c may indicate a, b, c, "a and b", "a and c", "b and c", or "a, b, and c", where a, b, and c may be singular or plural.

The foregoing descriptions are merely example embodiments of this application, but are not intended to constitute any form limitation to this application. Although this application is disclosed above by using the example embodiments, the embodiments are not intended to limit this application. By using the method and the technical content disclosed above, any person skilled in the art can make many possible changes and modifications on the technical solutions of this application, or amend the technical solutions of this application to embodiments with equal effects through equivalent variations without departing from the scope of the technical solutions of this application. Therefore, any simple amendments, equivalent variations, and modifications made on the above embodiments according to the technical essence of this application without departing from the content of the technical solutions of this application shall fall within the protection scope of the technical solutions of this application.

What is claimed is:

1. An electronic device, comprising:
   a receive coil;
   a wireless electric energy receiver;
   a charger;
   a controller; and
   a battery,
   wherein the receive coil is configured to: receive an alternating magnetic field transmitted by a transmit coil, and convert the alternating magnetic field into an alternating current;
   wherein the wireless electric energy receiver is configured to convert the alternating current received by the receive coil into a direct current;
   wherein an input end of the charger is connected to an output end of the wireless electric energy receiver, and an output end of the charger is connected to the battery and is configured to charge the battery after converting the direct current received from the wireless electric energy receiver;
   wherein the charger comprises an open-loop DC-DC (direct current-to-direct current) converter and a closed-loop DC-DC converter, and the open-loop DC-DC converter is connected to the closed-loop DC-DC converter in series or in parallel;
   wherein the controller is configured to: in response to power of a transmit end being greater than a first preset threshold of the transmit end and required charging power being greater than a first preset threshold of a receive end, control the open-loop DC-DC converter to work in a fast charging phase, which includes:
     controlling the open-loop DC-DC converter to work in a constant current step-down phase to charge the battery at a constant current, or
     controlling the open-loop DC-DC converter to work in a constant voltage step-down phase to charge the battery at a constant voltage; and
   wherein the controller is further configured to:
     compare a charging parameter of the open-loop DC-DC converter with a target parameter to obtain a control parameter; and
     control, based on the control parameter, the open-loop DC-DC converter to work in the fast charging phase.

2. The electronic device according to claim 1, wherein in response to the open-loop DC-DC converter working in the constant current step-down phase, the charging parameter is a charging current, and the target parameter is a target current;

wherein the controller is configured to: compare the charging current with the target current to produce a comparison result, and adjust the control parameter based on the comparison result, wherein the control parameter is an input voltage of the charger, a working frequency of a wireless charging system, or an input voltage of a wireless electric energy transmitter; and in response to the control parameter being the working frequency of the wireless charging system or the input voltage of the wireless electric energy transmitter, the controller is further configured to send the control parameter to the transmit end, wherein the transmit end comprises the wireless electric energy transmitter and the transmit coil.

3. The electronic device according to claim 2, wherein the controller is further configured to:

obtain a configured input voltage value of the wireless electric energy transmitter based on the required charging power; and send the configured input voltage value of the wireless electric energy transmitter to the transmit end, so that the input voltage of the wireless electric energy transmitter is regulated to the configured input voltage value of the wireless electric energy transmitter.

4. The electronic device according to claim 3, wherein in response to the input voltage of the wireless electric energy transmitter being of a graded type, the controller is further configured to:

determine a grade of the input voltage of the wireless electric energy transmitter based on the required charging power; and use a voltage value at the grade as the configured input voltage value of the wireless electric energy transmitter.

5. The electronic device according to claim 3, wherein in response to the input voltage of the wireless electric energy transmitter being of a stepwise regulatable type, the controller is further configured to:

obtain a voltage coefficient corresponding to the required charging power; and obtain the configured input voltage value of the wireless electric energy transmitter based on the voltage coefficient and a charging voltage of the battery.

6. The electronic device according to claim 2, wherein the controller is further configured to:

in response to determining that the charging current is less than a minimum value of an interval corresponding to the target current, increase the input voltage of the charger by a first preset voltage step; or in response to determining that the charging current is greater than a maximum value of the interval corresponding to the target current, decrease the input voltage of the charger by the first preset voltage step, until the charging current falls between the minimum value of the interval corresponding to the target current and the maximum value of the interval corresponding to the target current.

7. The electronic device according to claim 2, wherein the controller is further configured to:

obtain a current difference between the target current and the charging current;

regulate a configured input voltage value of the charger by multiplying the current difference by a preset current adjustment ratio and using a product as an input voltage regulation amount of the charger; and send a regulated configured input voltage value of the charger to the wireless electric energy receiver.

8. The electronic device according to claim 2, wherein the controller is further configured to:

in response to determining that the charging current is less than a minimum value of the target current, increase the working frequency of the wireless charging system by a preset frequency step; or in response to determining that the charging current is greater than a maximum value of the target current, decrease the working frequency of the wireless charging system by the preset frequency step, until the charging current falls between the minimum value of the target current and the maximum value of the target current.

9. The electronic device according to claim 2, wherein the controller is further configured to:

obtain a current difference between the target current and the charging current;

modulate a working frequency setting value of the wireless charging system by multiplying the current difference by a preset current adjustment ratio and using a product as a working frequency modulation amount of the wireless charging system; and send a modulated working frequency setting value to the transmit end.

10. The electronic device according to claim 2, wherein the controller is further configured to:

in response to determining that the charging current is less than a minimum value of the target current, increase a configured input voltage value of the wireless electric energy transmitter by a second preset voltage step; or in response to determining that the charging current is greater than a maximum value of the target current, decrease a configured input voltage value of the wireless electric energy transmitter by the second preset voltage step, until the charging current falls between the minimum value of the target current and the maximum value of the target current.

11. The electronic device according to claim 2, wherein the controller is further configured to:

obtain a current difference between the target current and the charging current;

regulate a configured input voltage value of the wireless electric energy transmitter by multiplying the current difference by a preset current adjustment ratio and using a product as an input voltage regulation amount of the wireless electric energy transmitter; and send a regulated configured input voltage value of the wireless electric energy transmitter to the transmit end.

12. The electronic device according to claim 2, wherein the controller is further configured to:

obtain a current difference between the target current and the charging current, and regulate a configured input voltage value of the charger by multiplying the current difference by a preset current adjustment ratio and using a product as an input voltage regulation amount of the charger;

obtain a voltage gain by using the input voltage of the wireless electric energy transmitter and a regulated configured input voltage value of the charger; and in response to determining that the voltage gain falls outside a preset gain range, regulate a configured input voltage value of the wireless electric energy transmitter, send a regulated configured input voltage value of the wireless electric energy transmitter to the transmit end, and send the regulated configured input voltage value of the charger to the wireless electric energy receiver.

13. The electronic device according to claim 2, wherein the controller is further configured to:
    obtain a current difference between the target current and the charging current, and regulate a configured input voltage value of the wireless electric energy transmitter by multiplying the current difference by a preset current adjustment ratio and using a product as an input voltage regulation amount of the wireless electric energy transmitter;
    obtain a voltage gain by using the input voltage of the charger and a regulated configured input voltage value of the wireless electric energy transmitter; and
    in response to determining that the voltage gain falls outside a preset gain range, regulate a configured input voltage value of the charger, send a regulated configured input voltage value of the charger to the wireless electric energy receiver, and send the regulated configured input voltage value of the wireless electric energy transmitter to the transmit end.

14. The electronic device according to claim 2, wherein the controller is further configured to:
    in response to determining that the charging current falls outside an interval corresponding to the target current, regulate a configured input voltage value of the charger, and obtain a gain by using a regulated configured input voltage value of the charger and the input voltage of the wireless electric energy transmitter; and
    in response to determining that the gain falls outside a preset gain range, regulate a configured input voltage value of the wireless electric energy transmitter, send a regulated configured input voltage value of the wireless electric energy transmitter to the transmit end, and send the regulated configured input voltage value of the charger to the wireless electric energy receiver.

15. The electronic device according to claim 2, wherein the controller is further configured to:
    in response to determining that the charging current falls outside an interval corresponding to the target current, regulate a configured input voltage value of the wireless electric energy transmitter, and obtain a gain by using the input voltage of the charger and a regulated configured input voltage value of the wireless electric energy transmitter; and
    in response to determining that the gain falls outside a preset gain range, regulate a configured input voltage value of the charger, send the regulated configured input voltage value of the wireless electric energy transmitter to the transmit end, and send a regulated configured input voltage value of the charger to the wireless electric energy receiver.

16. The electronic device according to claim 1,
    wherein in response to the open-loop DC-DC converter workings in the constant voltage step-down phase, the charging parameter is a charging voltage of the battery, and the target parameter is a target charging voltage;
    wherein the controller is further configured to: compare the charging voltage of the battery with the target charging voltage, and adjust the control parameter based on a comparison result, wherein the control parameter is an input voltage of the charger, a working frequency of a wireless charging system, or an input voltage of a wireless electric energy transmitter; and
    in response to the control parameter is-being the working frequency of the wireless charging system or the input voltage of the wireless electric energy transmitter, the controller is further configured to send the control parameter to the transmit end, wherein the transmit end comprises the wireless electric energy transmitter and the transmit coil.

17. The electronic device according to claim 16, wherein the controller is further configured to:
    obtain a configured input voltage value of the wireless electric energy transmitter based on the required charging power, and send the configured input voltage value of the wireless electric energy transmitter to the transmit end, so that the input voltage of the wireless electric energy transmitter is regulated to the configured input voltage value of the wireless electric energy transmitter.

18. The electronic device according to claim 17, wherein in response to the input voltage of the wireless electric energy transmitter being of a graded type, the controller is further configured to:
    determine a grade of the input voltage of the wireless electric energy transmitter based on the required charging power; and
    use a voltage value at the grade as the configured input voltage value.

19. A wireless charging system, comprising:
    an adapter;
    a transmit end comprising a wireless electric energy transmitter, a transmit coil, and a transmit end controller; and
    an electronic device comprising a receive coil, a wireless electric energy receiver, a charger, a controller, and a battery,
    wherein:
    the adapter is configured to convert an alternating current received from an alternating current power supply into a direct current and provide the direct current to the wireless electric energy transmitter;
    the wireless electric energy transmitter is configured to: invert the direct current provided by the adapter into an alternating current, and send the alternating current to the transmit coil;
    the transmit coil is configured to transmit, in a form of an alternating magnetic field, the alternating current received from the wireless electric energy transmitter;
    the transmit end controller is configured to: obtain power of the transmit end, and send the power of the transmit end to a controller of the electronic device;
    the receive coil of the electronic device is configured to: receive an alternating magnetic field transmitted by a transmit coil, and convert the alternating magnetic field into an alternating current;
    the wireless electric energy receiver is configured to convert the alternating current received from the receive coil into a direct current;
    an input end of the charger is connected to an output end of the wireless electric energy receiver, and an output end of the charger is connected to the battery and is configured to charge the battery after converting the direct current received from the wireless electric energy receiver;
    the charger comprises an open-loop DC-DC (direct current-to-direct current) converter and a closed-loop DC-DC converter, and the open-loop DC-DC converter is connected to the closed-loop DC-DC converter in series or in parallel;
    the controller is configured to: in response to power of a transmit end being greater than a first preset threshold of the transmit end and required charging power being greater than a first preset threshold of a receive end, control the open-loop DC-DC converter to work in a fast charging phase, which includes:
   controlling the open-loop DC-DC converter to work in a constant current step-down phase to charge the battery at a constant current, or
   controlling the open-loop DC-DC converter to work in a constant voltage step-down phase to charge the battery at a constant voltage; and
the controller is further configured to:
   compare a charging parameter of the open-loop DC-DC converter with a target parameter to obtain a control parameter; and
   control, based on the control parameter, the open-loop DC-DC converter to work in the fast charging phase.

* * * * *

UNITED STATES PATENT AND TRADEMARK OFFICE
CERTIFICATE OF CORRECTION

PATENT NO. : 11,637,442 B2
APPLICATION NO. : 17/535356
DATED : April 25, 2023
INVENTOR(S) : Wu et al.

It is certified that error appears in the above-identified patent and that said Letters Patent is hereby corrected as shown below:

In the Claims

Claim 16: Column 73, Line 56: "workings" should read -- working --.

Claim 16: Column 73, Line 66: "in response to the control parameter is-being the working" should read -- in response to the control parameter being the working --.

Signed and Sealed this
Twenty-second Day of August, 2023

Katherine Kelly Vidal
*Director of the United States Patent and Trademark Office*